United States Patent
Yamasaki

(10) Patent No.: US 7,573,525 B2
(45) Date of Patent: Aug. 11, 2009

(54) CAMERA AND PHOTOGRAPHING METHOD FOR SETTING FOCAL DISTANCE OF PHOTOGRAPHING OPTICAL SYSTEM SO AS TO CORRESPOND TO INFORMATION THAT INDICATES PHOTOGRAPHIC RANGE INPUTTED VIA AN OPERATION SECTION

(75) Inventor: Masafumi Yamasaki, Hachioji (JP)

(73) Assignee: Olympus Corporation (JP)

( * ) Notice: Subject to any disclaimer, the term of this patent is extended or adjusted under 35 U.S.C. 154(b) by 880 days.

(21) Appl. No.: 11/052,729

(22) Filed: Feb. 7, 2005

(65) Prior Publication Data

US 2005/0174470 A1 Aug. 11, 2005

(30) Foreign Application Priority Data

Feb. 6, 2004 (JP) .............................. 2004-031275

(51) Int. Cl.
*G03B 13/00* (2006.01)
*H04N 5/232* (2006.01)
(52) U.S. Cl. ................... 348/345; 348/333.03; 348/373; 348/115
(58) Field of Classification Search ................. 348/341, 348/345, 333.03, 373–375, 115, 333.02, 348/333.04, 333.09, 333.12, 346, 348
See application file for complete search history.

(56) References Cited

U.S. PATENT DOCUMENTS

| | | | |
|---|---|---|---|
| 4,516,157 A | 5/1985 | Campbell | |
| 5,610,678 A * | 3/1997 | Tsuboi et al. | 348/375 |
| 5,777,715 A | 7/1998 | Kruegle et al. | |
| 6,549,231 B1 * | 4/2003 | Matsui | 348/61 |
| 6,558,050 B1 * | 5/2003 | Ishibashi | 348/333.03 |
| 7,105,796 B2 * | 9/2006 | Lewis et al. | 250/208.1 |

(Continued)

FOREIGN PATENT DOCUMENTS

| | | |
|---|---|---|
| DE | 199 27 712 A1 | 6/2000 |
| JP | 07-240889 | 9/1995 |
| JP | 08-331433 | 12/1996 |
| JP | 09-022045 | 1/1997 |
| JP | 11-164186 | 6/1999 |

(Continued)

OTHER PUBLICATIONS

Communication from the European Patent Office on Jun. 13, 2005 in connection with corresponding European Application No. 05002033.8-2217.

(Continued)

*Primary Examiner*—Lin Ye
*Assistant Examiner*—Gevell Selby
(74) *Attorney, Agent, or Firm*—Ostrolenk, Faber, LLP

(57) ABSTRACT

A head-mounted camera of the present invention includes the following elements. A first image pickup device includes a first photographing optical system that can change the focal distance and a CCD for converting a subject image formed by the first photographing optical system into an image signal. A see-through image display portion displays a photographic frame indicating the photographic range as a virtual image so that it is superimposed on a subject substantially directly observed by a photographer. A remote controller includes a second operation switch for setting the visual angle of the photographic frame when viewed from the photographer. A controller/recorder includes a first CPU for setting the focal distance of the first photographing optical system so that the visual angle of the photographic frame set by the second operation switch coincides with the field angle of the first image pickup device.

16 Claims, 28 Drawing Sheets

U.S. PATENT DOCUMENTS

| | | | |
|---|---|---|---|
| 2001/0028482 | A1 | 10/2001 | Nishioka |
| 2002/0085843 | A1* | 7/2002 | Mann ........................ 396/374 |
| 2003/0103156 | A1* | 6/2003 | Brake et al. ............ 348/333.01 |
| 2006/0034603 | A1* | 2/2006 | Homma ...................... 396/296 |
| 2006/0244677 | A1* | 11/2006 | Dempski ....................... 345/8 |
| 2008/0018754 | A1* | 1/2008 | Ejima et al. .............. 348/240.3 |

FOREIGN PATENT DOCUMENTS

| | | |
|---|---|---|
| JP | 2000 101898 | 4/2000 |
| JP | 2000-101898 | 4/2000 |

OTHER PUBLICATIONS

Search Report issued by the European Patent Office on Jun. 6, 2006 in connection with corresponding European application No. 05 02 7950.

*Leica MP, The Photographer's Tool*, Anonymous [retrieved from Internet May 5, 2006]; technical data p. 10; XP002379987; www.leica-camera.com/imperial/md/content/pdf/msystem/mp/2.pdf.

English Translation of Abstract for Japanese Patent Application No. 11-164186 (Jun. 1999) provided by Patents Abstracts of Japan Aug. 1, 2006.

Office Action issued by the Chinese Patent Office on Aug. 24, 2007 in connection with corresponding Chinese Patent Application No. 200510005244X.

Translation of the Office Action issued by the Chinese Patent Office on Aug. 24, 2007 in connection with corresponding Chinese Patent Application No. 200510005244X.

Leica Camera AG, LEICA M6 TTL Manual, 21 pages, 2000.

Leica Camera AG, LEICA M7 Instructions, pages including 90-93.

Leica Camera AG, LEICA M8 Instructions, pages including 102-103.

Office Action issued by the Japanese Patent Office on Dec. 16, 2008 in connection with corresponding Japanese Patent Application No. 2004-031275.

\* cited by examiner

FIG.43A
FIG.43B
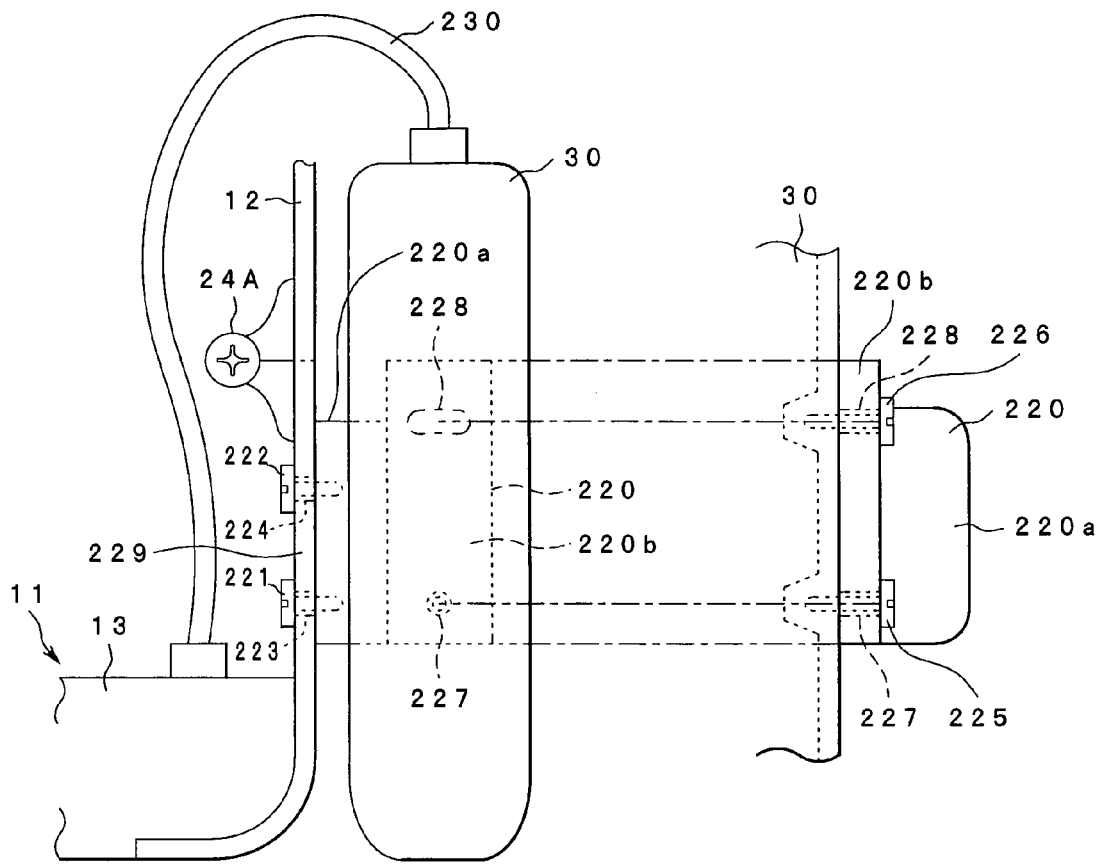
FIG.44
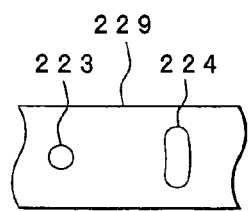

CAMERA AND PHOTOGRAPHING METHOD FOR SETTING FOCAL DISTANCE OF PHOTOGRAPHING OPTICAL SYSTEM SO AS TO CORRESPOND TO INFORMATION THAT INDICATES PHOTOGRAPHIC RANGE INPUTTED VIA AN OPERATION SECTION

This application claims benefit of Japanese Application No. 2004-31275 filed in Japan on Feb. 6, 2004, the contents of which are incorporated by this reference.

BACKGROUND OF THE INVENTION

1. Field of the Invention

The present invention relates to head-mounted cameras, and more particularly, to a head-mounted camera which is worn on a head in a manner almost the same as a pair of spectacles.

2. Description of the Related Art

Hitherto, display devices which are worn on the head to observe images and photographic devices which are worn on the head to perform photographing operations are known. Devices having both a display function and a photographic function are also known.

For example, in the head-mounted display device disclosed in Japanese Unexamined Patent Application Publication No. 7-240889, a user can perform a photographing operation by using a television camera while observing images photographed by the television camera and displayed on the display device worn on his/her head, and can also selectively obtain external light via the display device by operating a control switch provided for the television camera.

In an image recording apparatus disclosed in Japanese Unexamined Patent Application Publication No. 11-164186, an image pickup device is provided on spectacle-type frames, and the photographic lens of the image pickup device faces the same direction as a photographer, thereby allowing the photographer to photograph a subject disposed in the same direction which the photographer is facing. The invention in that publication also discloses the following configuration. An image pickup device is provided on a goggle-type personal liquid crystal projector equipped with a light transmissive casing, and an image photographed by the image pickup device is superimposed on a subject exposed to external light.

In the display device disclosed in Japanese Unexamined Patent Application Publication No. 7-240889, however, the user has to concentrate on the photographing operation while observing photographed images on the display device. Accordingly, when performing photographing at various events, such as sporting events or festivals, the user cannot enjoy himself/herself, unlike when he/she performs a photographing operation while observing actual subjects with his/her eyes. It has also been found experimentally that it is tiring to observe digital images in a closed space for a long time, unlike when the user observes real subjects with his/her eyes.

In the image recording apparatus disclosed in Japanese Unexamined Patent Application Publication No. 11-164186, an image pickup device is provided on the spectacle-type frames. However, this does not allow a user to observe a subject and check a photographic range at the same time, and the user has to turn away from the subject to check the image display unit provided for a camera separately provided from the spectacle-type frame. In the configuration in which an image pickup device is provided on the personal liquid crystal projector, even though a displayed image and a transmitted subject can be viewed at the same time, it is still difficult for a photographer to enjoy himself/herself at an event since he/she has to concentrate on a displayed image during the photographing operation.

Thus, according to the above-described related art, it is difficult for a photographer to behave as naturally as other people during a photographing operation, and he/she feels bothered since his/her actions are restricted by the photographing operation.

SUMMARY OF THE INVENTION

Accordingly, it is an object of the present invention to provide a head-mounted camera which allows a user to easily perform a photographing operation without feeling bothered.

In order to achieve the above object, the present invention provides a head-mounted camera including image pickup element containing a photographing optical system in which a focal distance is changeable and an image pickup element for converting an optical subject image formed by the photographing optical system into an electric image signal, display element for displaying a photographic frame indicating the photographic range as a virtual image so that the photographic frame is superimposed on a subject substantially directly observed by a photographer, photographic-frame setting element for setting a visual angle of the photographic frame displayed by the display element as the virtual image and observed from the photographer, and focal-distance setting element for setting the focal distance of the photographing optical system so that the visual angle of the photographic frame set by the photographic-frame setting element coincides with the field angle of the image pickup device.

The above and other objects, features, and advantages of the invention will become more clearly understood from the following description referring to the accompanying drawings.

BRIEF DESCRIPTION OF THE DRAWINGS

FIGS. 43A and 43B are a plan view and a right side view, respectively, illustrating the configuration in which the first image pickup device is attached to the side surface of the frame in the first embodiment;

FIG. 44 is a right side view illustrating the configuration of holes formed in the frame for attaching the first image pickup device in the first embodiment;

DETAILED DESCRIPTION OF THE PREFERRED EMBODIMENTS

The embodiments of the present invention are described in detail below with reference to the accompanying drawings.

First Embodiment

Figure 1:
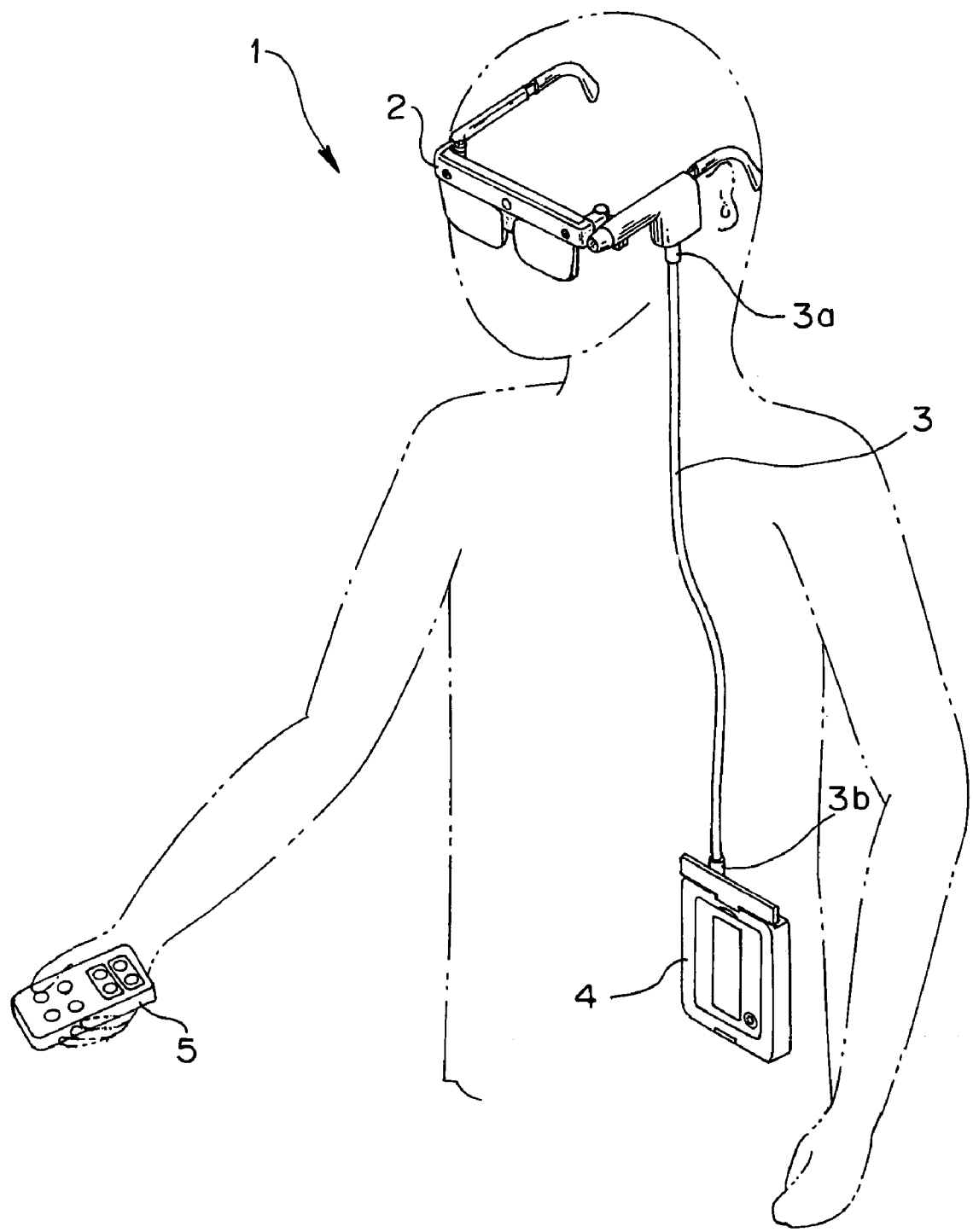
FIG. 1 is a perspective view illustrating a state in which a head-mounted camera constructed in accordance with a first embodiment is used.

FIGS. 1 through 46 illustrate a first embodiment of the present invention. FIG. 1 is a perspective view illustrating a state in which a head-mounted camera 1 is used.

The head-mounted camera (hereinafter simply referred to as the "camera") 1 includes, as shown in FIG. 1, a head-mounted unit 2 formed substantially in the shape of a pair of spectacles, a controller/recorder 4, which serves as the main body of the camera 1, connected to the head-mounted unit 2 via connecting element, such as a cable 3, and a remote controller 5 for remotely performing input operations for the camera 1.

The head-mounted unit 2 allows a user to observe a subject substantially directly in a see-through display mode and also to pick up an image of the subject. The head-mounted unit 2 can be worn on the head in a manner similar to ordinary eyesight-correcting spectacles, as is seen from the shape of the head-mounted unit 2. The head-mounted unit 2 is light and small so that the weight and the size thereof can be as close as possible to those of actual spectacles.

A connecting terminal 3a provided at one end of the cable 3 is connected to a cable connecting terminal 21 (see FIG. 2) of the head-mounted unit 2, and a connecting terminal 3b provided at the other end of the cable 3 is connected to a cable connecting terminal 49 (see FIG. 7) of the controller/recorder 4, thereby connecting the head-mounted unit 2 with the controller/recorder 4. As element for electrically connecting the head-mounted unit 2 with the controller/recorder 4, although wired element such as the cable 3 is used, wireless element for wirelessly connecting the two elements may be used.

The controller/recorder 4 controls the entire camera 1 and also records images picked up by the head-mounted unit 2. The controller/recorder 4 is also formed to be as light and small as possible so that it can be used under various conditions. For example, it can be attached to a belt at the user's waist or it can be stored in an inner pocket of a jacket. The controller/recorder 4 can also be stored in a bag by using a long cable 3.

The remote controller 5 allows a photographer to remotely control with a photographer's hand, operations that are comparatively frequently performed, such as controlling the see-through display operation and photographing operations performed by the head-mounted unit 2. Accordingly, the remote controller 5 is formed to be light and small so that it can be held in the palm of the hand, and wirelessly communicates with the controller/recorder 4.

In this embodiment, the head-mounted unit 2, the controller/recorder 4, and the remote controller 5 are separately provided from each other. This makes the user comfortable when wearing the head-mounted unit 2, which is formed light and small, and also allows the user to easily operate this camera 1 by using the remote controller 5.

The external appearance and the overview of the head-mounted unit 2 are described below with reference to FIGS. 2 through 5. FIGS. 2, 3, 4, and 5 are a front view, a plan view, a right side view, and a perspective view, respectively, illustrating the head-mounted unit 2.

The head-mounted unit 2 includes a front portion 11 corresponding to lens, rims, a bridge, and joint portions of regular spectacles and temples 12 extended from the left and right sides of the front portion 11 in the backward direction (opposite to the subject) and foldable with respect to the front portion 11.

The front portion 11 includes a frame 13 and transparent optical members 14 and 15, which serve as optical waveguide members, attached to the frame 13 in association with the left and right eyes.

The frame 13 is provided substantially at the center with a projector light-emitting portion 16, which serves as distance-measurement element used for ranging the distance to a subject. The frame 13 is also provided at the left and right ends with a first microphone 17 and a second microphone 18 for collecting stereo sound from a subject. At the center of the frame 13, nose pads 19 for placing the head-mounted unit 2 against the ridge of the nose and a bridge 20 formed between the transparent optical members 14 and 15 are also provided. At the right side of the frame 13, screws 22 and 23 for an adjusting mechanism (adjusting element) of an adjusting device for adjusting the mounting position of a first image pickup device 30 (also serving as the above-described distance-measurement element), which is described below, are exposed to be operable. The adjusting device is used for adjusting the camera 1 by using the adjusting method for the camera 1.

The temples 12 are connected to the front portion 11 by using hinges 24 and 25 so that they are foldable against the front portion 11. That is, when the head-mounted unit 2 is not used, the temples 12 are folded toward the center of the front portion 11, i.e., they can be folded along the front portion 11, thereby making the head-mounted unit 2 easy to store and carry. End covers 26 and 27 for placing the head-mounted unit 2 on the ears are provided at the distal ends of the left and right temples 12.

At the left-side (i.e., the right side in FIG. 2 or 3) temple 12, the first image pickup device 30, which serves as image pickup element for picking up an image of a subject, is integrally provided for the temple 12. Thus, when the temple 12 is folded, the first image pickup device 30 is also folded. The cable connecting terminal 21 connected to the connecting terminal 3a, which is one end of the cable 3, is provided at the bottom of the first image pickup device 30. The right-side temple 12 is also provided with the above-described adjusting mechanism (adjusting element). The adjusting mechanism adjusts the optical axis and the visual axis of a first photographing optical system 31 (see FIG. 12), which is described below, contained in the first image pickup device 30 by adjusting the relative angle between the front portion 11 and the first image pickup device 30. The head of an angle adjusting bis 32 contained in this adjusting mechanism is exposed to allow the user to externally rotate the bis 32.

A box 33 is disposed between the right side of the front portion 11 and the hinge 24. In the box 33, a flexible printed board for connecting the individual circuits of the front portion 11 to the individual circuits of the first image pickup device 30 is stored in a manner described below.

Figure 6:
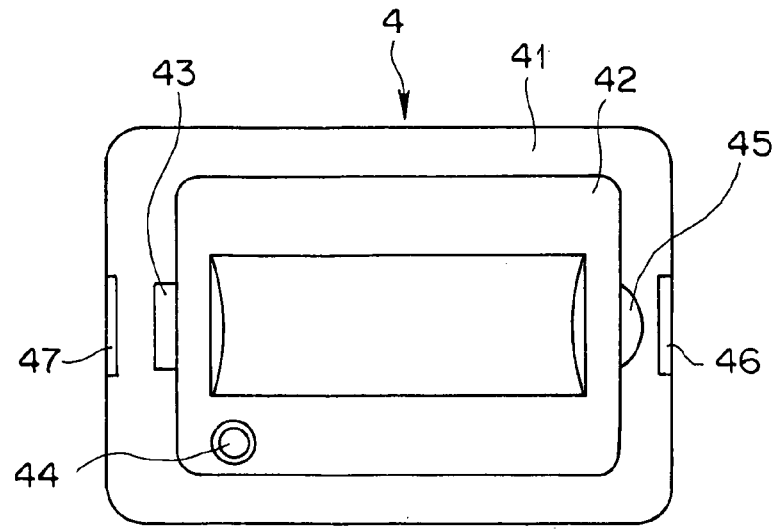
FIG. 6 is a plan view illustrating a controller/recorder when an operation panel is closed in the first embodiment.
Figure 7:
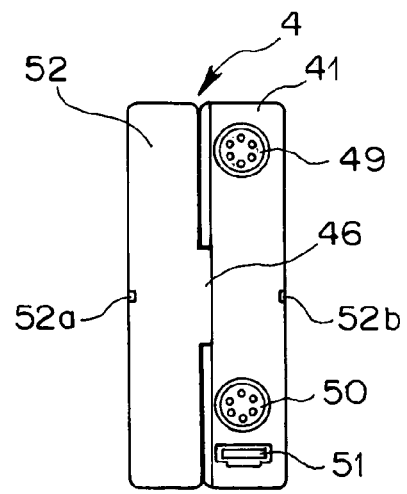
FIG. 7 is a right side view illustrating the controller/recorder when the operation panel is closed in the first embodiment.
Figure 8:
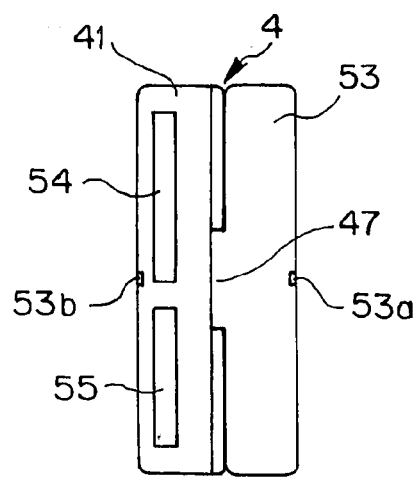
FIG. 8 is a left side view illustrating the controller/recorder when the operation panel is closed in the first embodiment.
Figure 9:
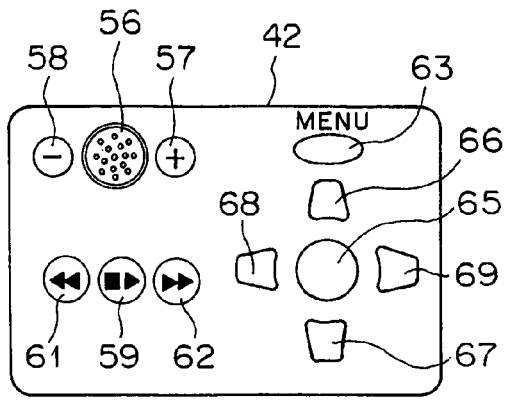
FIG. 9 is a plan view illustrating operation switches disposed on the operation panel in the first embodiment.
Figure 10:
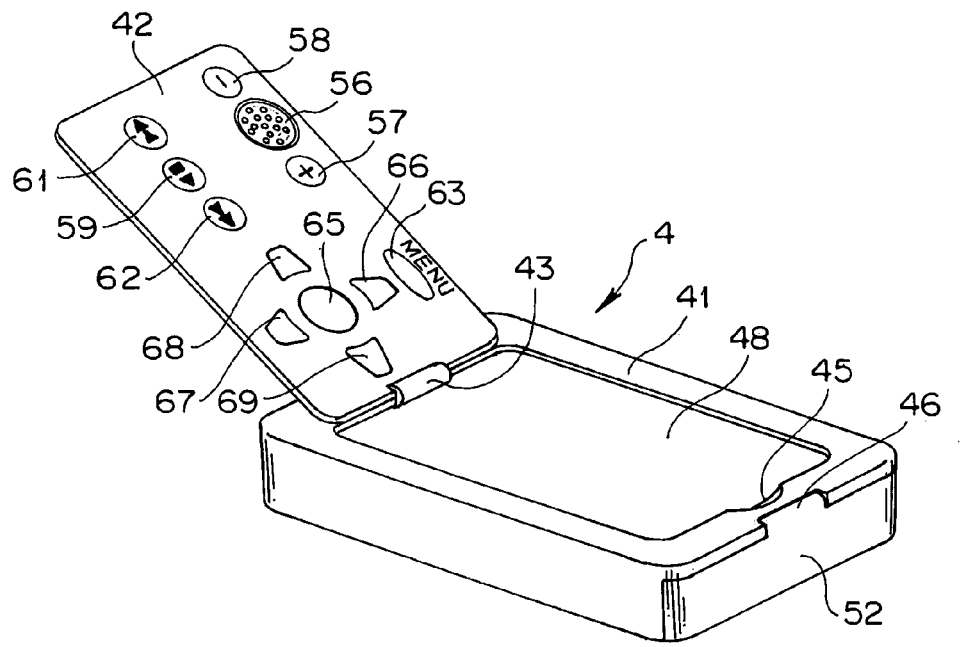
FIG. 10 is a perspective view illustrating the controller/recorder when the operation panel is opened in the first embodiment.

The external appearance and the overview of the controller/recorder 4 are described below with reference to FIGS. 6 through 10. FIGS. 6, 7, and 8 are a plan view, a right side view, and a left side view, respectively, illustrating the controller/recorder 4 when an operation panel 42 is closed. FIG. 9 is a plan view illustrating operation switches disposed on the operation panel. FIG. 10 is a perspective view illustrating the controller/recorder 4 when the operation panel is opened.

The controller/recorder 4 is formed of a controller/recorder main unit 41 and the operation panel 42 provided for the controller/recorder main unit 41 via a hinge 43 so that it can be opened and closed.

The controller/recorder main unit 41 has built-in circuits, which are described below, and also includes a liquid crystal display device (hereinafter simply referred to as the "LCD") 48, which serves as an LCD monitor, such that the user can check the LCD 48 when the operation panel 42 is opened. The LCD 48 is used for displaying images during a playback operation and also for displaying menu screens for setting various modes. A recess 45 is also formed so that the user can place a finger when opening or closing the operation panel 42.

At the right side of the controller/recorder main unit 41, as shown in FIG. 7, a lid 52 that can be opened and closed with respect to the controller/recorder main unit 41 via a hinge 46 is provided. By allowing an engagement portion 52a of the lid 52 to engage with a mating engagement portion 52b provided for the controller/recorder main unit 41, the controller/recorder main unit 41 can remain closed. When the lid 52 is opened, as shown in FIG. 7, the cable connecting terminal 49 to be connected with the cable connecting terminal 21 of the head-mounted unit 2 via the cable 3, an AV/S connecting terminal 50 for connecting the controller/recorder 4 with a television set, and a PC connecting terminal 51 for connecting the controller/recorder 4 with a personal computer (PC) are exposed. In this manner, cords can be connected together at the right side surface of the controller/recorder main unit 41 without being extended from the other surfaces, thereby reducing a troublesome operation for arranging the cords.

Also at the left side of the controller/recorder main unit 41, as shown in FIG. 8, a lid 53 that can be opened and closed with respect to the controller/recorder main unit 41 via a hinge 47 is provided. By allowing an engagement portion 53a of the lid 53 to engage with a mating engagement portion 53b provided for the recorder/controller main unit 41, the controller/recorder main unit 41 can remain closed. When the lid 53 is opened, as shown in FIG. 8, a recording memory insertion slot 54 for inserting a recording memory 120 (see FIG. 12), which serves as detachable recording element, for example, a card memory, and a battery insertion slot 55 for detachably inserting batteries for supplying power are exposed.

On the outer surface of the operation panel 42, as shown in FIG. 6, a power switch 44 which is exposed even when the operation panel 42 is closed is provided. On the inner surface of the operation panel 42, various operation switches shown in FIG. 9 which are exposed only when the operation panel 42 is opened are disposed.

More specifically, on the inner surface of the operation panel 42, there are provided a speaker 56 for playing back sound, a switch 57 for increasing the volume of sound generated from the speaker 56, a switch 58 for decreasing the volume, a playback start/stop switch 59 for starting or pausing playing back image information recorded on the image memory 120, a switch 61 for fast-forwarding and searching images in the backward direction, a switch 62 for fast-forwarding and searching images in the forward direction, a menu button 63 for displaying menu screens for setting various functions and dates concerning the camera 1 on the LCD 48, menu selection switches 66, 67, 68, and 69 for moving an item to be selected or scrolling information displayed on the menu screens in the up, down, left, and right directions, and a setting switch 65 for setting the selected item.

The switches disposed on the operation panel 42 are switches mainly for setting items of information which are not frequently changed.

The external appearance and the overview of the remote controller 5 are described below with reference to the plan view of FIG. 11.

As stated above, switches which are relatively frequently changed during a photographing operation are disposed on the remote controller 5. More specifically, the following switches are provided, as shown in FIG. 11. An A/M switch 71, which serves as switching element, switches between an auto mode (A mode) and a manual mode (M mode) for a telephotographing operation having a focal distance exceeding a predetermined distance. More specifically, the A/M switch 71 is switched during a telephotographing operation in which a photographic image corresponding to a photographic frame indicating a photographic range is enlarged and see-through displayed as an electronic view. An F/V switch 72, which serves as switching element, is used for the see-through display, which is described below, in the transparent optical member 14 (and/or transparent optical member 15 (various configurations, which are described below, can be employed according to whether images are displayed with only one eye or both eyes). More specifically, the F/V switch 72 switches between the photographic frame (F) indicating the photographic range and the photographic image (V) (electronic view) output from the first image pickup device 30 for implementing the see-through display. A release switch (REL) 73 is used for starting photographing still images, which have higher definition than moving pictures. A record switch (REC) 74 switches between a recording start operation and a recording end operation for moving pictures, which can be switched every time the record switch 74 is pressed. A zoom switch 75, which serves as photographic-frame setting element, includes a tele switch 75a and a wide switch 75b for switching the zoom (optical zoom and/or electronic zoom) of the first image pickup device 30 containing the first photographing optical system 31 to the tele (T) mode and to the wide (W) mode, respectively. An exposure correction switch 76 includes an exposure-decreasing correction switch 76a and an exposure-increasing correction switch 76b for respectively decreasing and increasing the exposure of an image to be photographed.

The zoom operation performed by the first photographing optical system 31 and changing of the visual angle of a photographic frame observed from a photographer, who is also an observer, are performed in cooperation with each other. From this point of view, it can be said that the zoom switch 75 includes the tele switch 75a and the wide switch 75b for respectively reducing and enlarging the visual angle of the photographic frame observed from the photographer.

Figure 12:
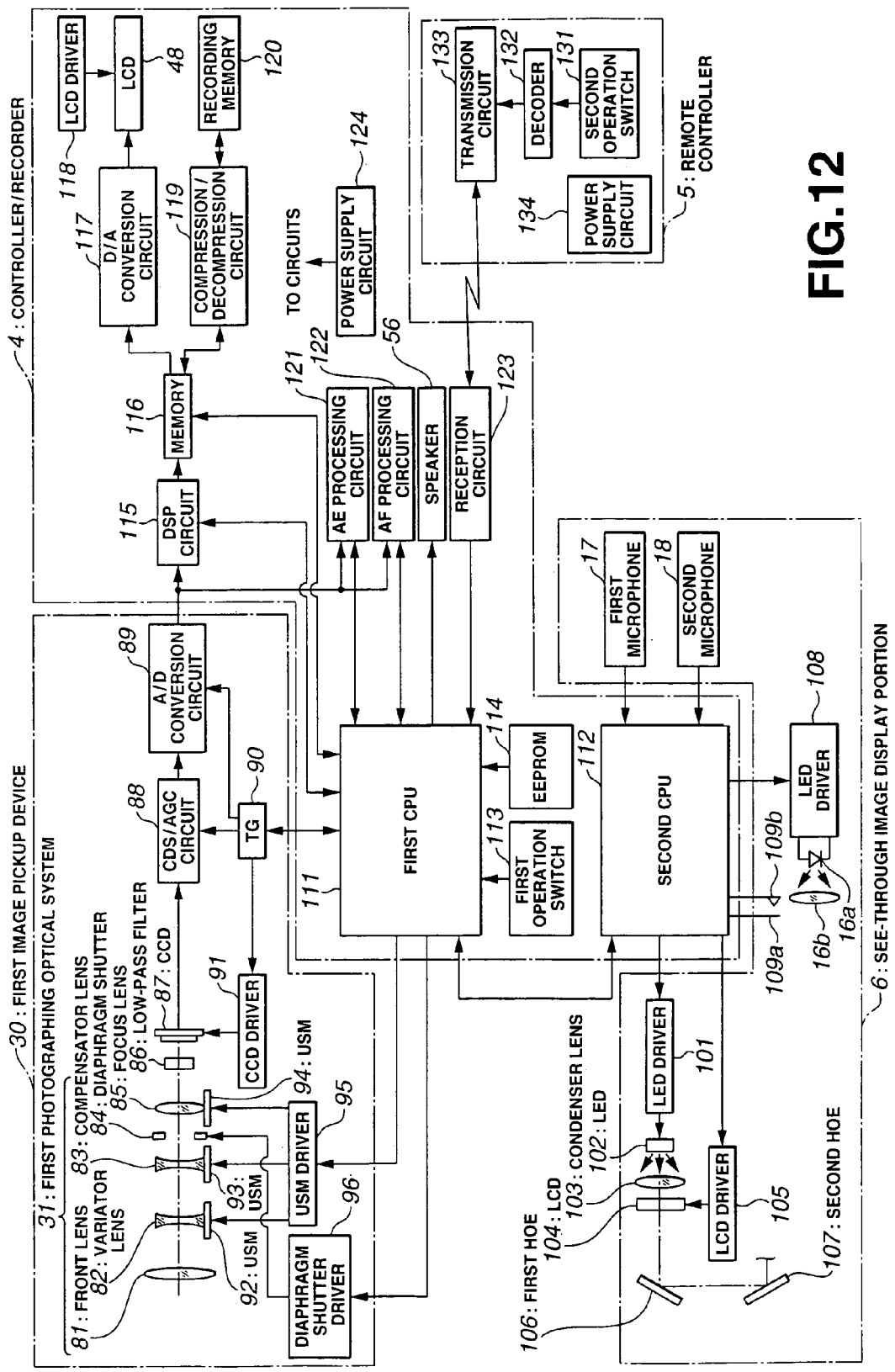
FIG. 12 is a block diagram illustrating the configuration of an electronic circuit of the head-mounted camera of the first embodiment.

FIG. 12 is a block diagram illustrating the configuration of, mainly, an electronic circuit of the camera 1 shown in FIG. 1.

The camera 1 is largely divided into the head-mounted unit 2, the controller/recorder 4, and the remote controller 5, as described above. The head-mounted unit 2 is further divided into the first image pickup device 30, which serves as image pickup element, and a see-through image display portion 6, which serves as display element mainly for displaying images in a see-through manner. Both the first image pickup device 30 and the see-through image display portion 6 are connected to the controller/recorder 4 via the cable 3.

The first image pickup device 30 includes the following elements. The first photographing optical system 31 is used for forming an optical subject image and is formed as a zoom optical system that can change the focal distance. A low-pass filter 86 removes undesired high frequency components from light passing through the first photographing optical system 31. A charge-coupled device (CCD) 87, which serves as an image pickup device, converts the optical subject image formed by the first photographing optical system 31 via the low-pass filter 86 into an electric signal and outputs it. A correlated double sampling (CDS)/automatic gain control (AGC) circuit 88, which serves as signal processing element, performs processing, such as noise elimination and amplification, which are described below, on the signal output from the CCD 87. An analog-to-digital (A/D) conversion circuit 89, which serves as signal processing element, converts an analog image signal output from the CDS/AGC circuit 88 into a digital image signal. A CCD driver 91 controls the driving of the CCD 87. A timing generator (TG) 90 supplies timing signals to the CDS/AGC circuit 88, the A/D conversion circuit 89, and the CCD driver 91. A diaphragm shutter driver 96, which serves as a drive circuit, controls the driving of a diaphragm shutter 84, which is described below, contained in the first photographing optical system 31. An ultra sonic motor (USM) driver 95, which serves as a drive circuit, selectively drives USMs 92, 93, and 94, which are described below, contained in the first photographing optical system 31.

More specifically, the first photographing optical system 31 includes a front lens 81, a variator lens 82 for changing the focal distance, a compensator lens 83 for correcting a deviation of the focus position in accordance with a change in the focal distance, the diaphragm shutter 84 serving as both a diaphragm function and a shutter function, a focus lens 85 for adjusting the focus, and the USMs 92, 93, and 94 for driving the variator lens 82, the compensator lens 83, and the focus lens 85.

The operation of the above-described first image pickup device 30 is as follows.

Light passing through the first photographing optical system 31 forms an image on the image forming plane of the CCD 87 via the low-pass filter 86.

In response to an instruction from the remote controller 5 to photograph a still image by the operation of the release switch 73 or an instruction from the remote controller 5 to photograph a moving picture by the operation of the record switch 74, photoelectric conversion is performed by the CCD 87 under the control of the controller/recorder 4, thereby outputting an analog image signal.

The signal output from the CCD 87 is input into the CDS/AGC circuit 88. Then, the signal is subjected to known correlated double sampling by the CDS circuit of the CDS/AGC circuit 88 so as to remove reset noise, and the resulting signal is then amplified into a predetermined signal level by the AGC circuit of the CDS/AGC circuit 88.

The analog image signal output from the CDS/AGC circuit 88 is converted into a digital image signal (image data) by the A/D conversion circuit 89. In this embodiment, the output signal from the A/D conversion circuit 89 is referred to as "raw image data". The raw image data in this embodiment is defined as digital data obtained immediately after conducting A/D conversion on the analog output signal from the CCD 87 and before being subjected to other digital signal processing.

A timing signal generated by the timing generator 90 is input into the CDS/AGC circuit 88 and the A/D conversion circuit 89, and a timing signal from the timing generator 90 is also input into the CCD driver 91. The timing generator 90, the USM driver 95, and the diaphragm shutter driver 96 are controlled by a first central processing unit (CPU) 111, which is described below, provided for the controller/recorder 4.

As described above, in the first image pickup device 30, an image signal generated in the CCD 87 is subjected to analog signal processing and is then converted into a digital signal. Accordingly, analog signals are not output from the first image pickup device 30. The first image pickup device 30 is thus resistant to external noise that may influence an image signal transmitted via the cable 3.

The first image pickup device 30 outputs raw image data, which eliminates the need to provide a signal processing circuit for performing signal processing, such as color separation and white balance control, in the first image pickup device 30. With this configuration, the head-mounted unit 2 provided with the first image pickup device 30 can be lighter and smaller.

The digital image signal output from the A/D conversion circuit 89 of the first image pickup device 30 is processed by the controller/recorder 4 connected with the head-mounted unit 2 via the cable 3 and is recorded.

The controller/recorder 4 includes the following elements. A digital signal processor (DSP) circuit 115 performs predetermined digital signal processing on a signal output from the A/D conversion circuit 89. A memory 116, such as a frame buffer, temporarily stores the signal from the DSP circuit 115. A digital-to-analog (D/A) conversion circuit 117 converts the digital signal stored in the memory 116 into an analog signal. The LCD 48 (see FIG. 10) displays the image based on the analog image signal converted by the D/A conversion circuit 117. An LCD driver 118 controls the driving of the LCD 48. A compression/decompression circuit 119 compresses the digital signal stored in the memory 116 and decompresses a compressed digital signal read from the recording memory 120, which is described below. The recording memory 120 records the digital signal compressed by the compression/decompression circuit 119. An auto exposure processing circuit (hereinafter referred to as the "AE processing circuit") 121 conducts calculations for exposure control based on the digital image signal from the A/D conversion circuit 89. An auto focus processing circuit (hereinafter referred to as the "AF processing circuit") 122 conducts calculations for auto focus (AF) control based on the digital image signal from the A/D conversion circuit 89. The speaker 56 (see FIG. 9) plays back sound or issues alarming sound while playing back images under the control of the first CPU 111. A reception circuit 123 receives a signal from a transmission circuit 133, which is described below, of the remote controller 5. A first operation switch 113 includes various switches, such as those shown in FIG. 9, and is used for inputting various operations concerning the camera 1. An electrically erasable programmable read-only memory (EEPROM) 114 records various data used in the camera 1. A power supply circuit 124 includes detachable batteries and supplies power not only to the controller/recorder 4, but also to the first image pickup device 30 and the see-through image display portion 6. A second CPU 112, which serves as control element, controls mainly the see-through image display portion 6. The first CPU 111, which serves as synthetic control element for the camera 1 and also serves as alarming and switching element, controls the individual circuits of the controller/recorder 4 and the individual circuits of the first image pickup device 30, and also communicates with the second CPU 112 to control the see-through image display portion 6 via the second CPU 112.

The operation of the above-described controller/recorder 4 is as follows.

The DSP circuit 115 performs predetermined image processing computation on the image data output from the A/D conversion circuit 89, and also performs auto white balance processing on the image data based on the obtained computation result.

The image data processed by the DSP circuit 115 is temporarily stored in the memory 116.

The image data stored in the memory 116 is compressed in the compression circuit of the compression/decompression circuit 119, and is then stored in the recording memory 120.

When a recorded image is selected by operating the menu button 63, the menu selection switch 66, 67, 68, or 69, or the setting switch 65, and when a playback instruction is given by operating the playback start/stop switch 59, compressed data stored in the recording memory 120 is decompressed by the decompression circuit of the compression/decompression circuit 119, and the decompressed data is temporarily stored in the memory 116. This image data is converted into an analog image signal by the D/A conversion circuit 117, and the analog image signal is then displayed on the LCD 48. In this case, the operation of the LCD 48 is controlled by a signal generated by the LCD driver 118.

Meanwhile, the digital image data output from the A/D conversion circuit 89 is transmitted to the controller/recorder 4 via the cable 3 and is then input into the AE processing circuit 121 and the AF processing circuit 122.

The AE processing circuit 121 calculates the luminance of the image data for one frame and adds the luminance values by weighting them so as to compute an AE evaluation value corresponding to the brightness of the subject, and outputs the computation result to the first CPU 111.

The AF processing circuit 122 extracts high frequency components from the luminance components of the image data for one frame by using a high-pass filter, and calculates the accumulative values of the extracted high frequency components so as to compute an AF evaluation value corresponding to the contour components at the high frequency side, and outputs a computation result to the first CPU 111. In the first embodiment, the first CPU 111 detects the focal point based on the AF evaluation value calculated by the AF processing circuit 122.

In the EEPROM 114, various correction data required for, for example, exposure control or auto focus processing, are recorded when the camera 1 is manufactured. The first CPU 111 executes various types of computation by reading the correction data from the EEPROM 114 if necessary.

The second CPU 112 is, as stated above, used for controlling the see-through image display portion 6. The second CPU 112 is connected to the first CPU 111 so that it performs predetermined operations in cooperation with the first CPU 111. The second CPU 112 is electrically connected to contacts 109a and 109b, details of which are described below, for detecting whether the opening angle of the temple 12 equipped with the first photographing optical system 31 is sufficiently large.

The see-through image display portion 6 projects a photographic frame indicating the photographic range or an image which is being picked up by the first image pickup device 30 by using a holographic optical element (hereinafter referred to as a "HOE"), which serves as a reflection-type combiner, and displays the projected image in front of the viewing direction of a photographer as a virtual image. The "photographic frame" is an index of the range of a subject photographed by the first image pickup device 30 (see FIG. 17).

The see-through image display portion 6 includes the following elements. A light-emitting diode (LED) driver 101 controls an LED 102, which is described below, to emit light under the control of the second CPU 112. The LED 102 serves as a light-emitting source for emitting light by being driven by the LED driver 101 and also forms projection element (horizontal projection element). A condenser lens 103 condenses light emitted from the LED 102 and also forms the projection element (horizontal projection element). An LCD 104 displays photographic frames or photographed images, and serves as transmissive LCD element illuminated from backward by light emitted from the LED 102 via the condenser lens 103. The LCD 104 also forms the projection element (horizontal projection element). An LCD driver 105 drives the LCD 104 to display photographic frames and the like under the control of the second CPU 112, and also serves as correction element for correcting the parallax, which is described below. A first HOE 106, which serves as a reflective optical member for reflecting light emitted from the LCD 104 vertically downward (see FIG. 14) while correcting the aberration, which is described below. A second HOE 107, which serves as a combiner, reflects and diffracts the light from the first HOE 106 toward the photographer's eyes so as to project a photographic frame displayed on the LCD 104 to allow the photographer to observe the frame and also to transmit external light toward the photographer's eyes. A projector LED 16a contained in the projector light-emitting portion 16 performs distance measurement. An LED driver 108 drives the projector LED 16a under the control of the second CPU 112.

A condenser lens 16b projects the distance-measurement light emitted from the projector LED 16a toward a subject. The first microphone 17 and the second microphone 18 collect stereo sound from the subject and outputs it to the second CPU 112.

Figure 11:
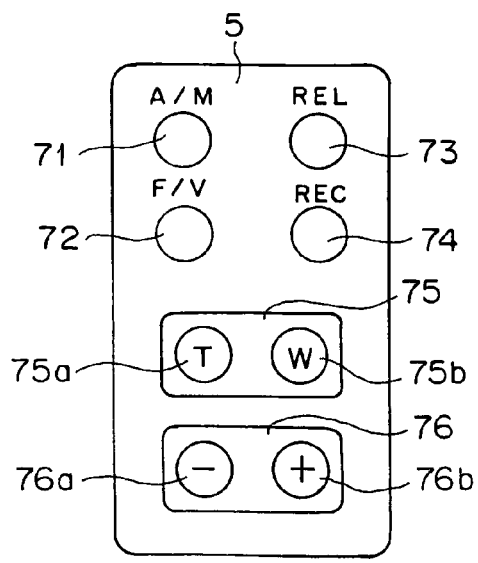
FIG. 11 is a plan view illustrating the configuration of a remote controller in the first embodiment.

The remote controller 5 includes a second operation switch 131 containing switches, such as those shown in FIG. 11, a decoder 132 for converting an operation input from the second operation switch 131 into a wireless transmitting signal, the transmission circuit 133 for transmitting the signal converted by the decoder 132 to the controller/recorder 4, and a power supply circuit 134 containing batteries to supply power to the individual circuits of the remote controller 5.

Figure 13:
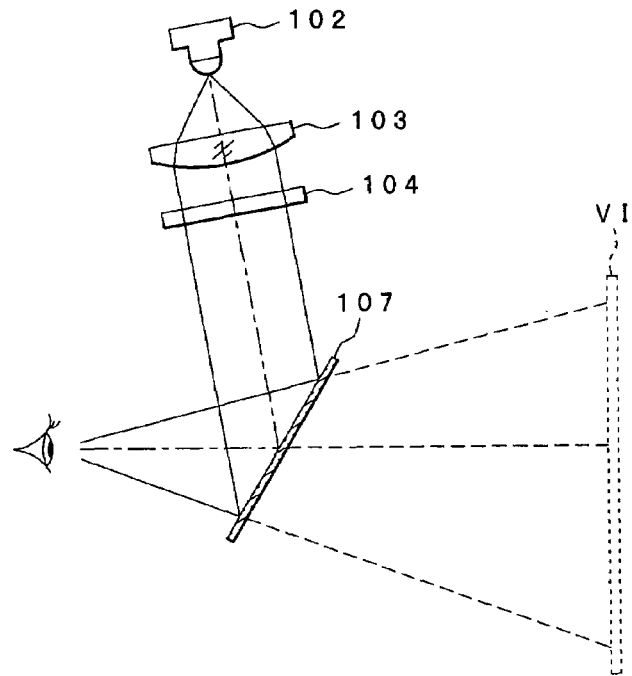
FIG. 13 illustrates the principle of an optical system of a see-through image display portion in the first embodiment.
Figure 14:
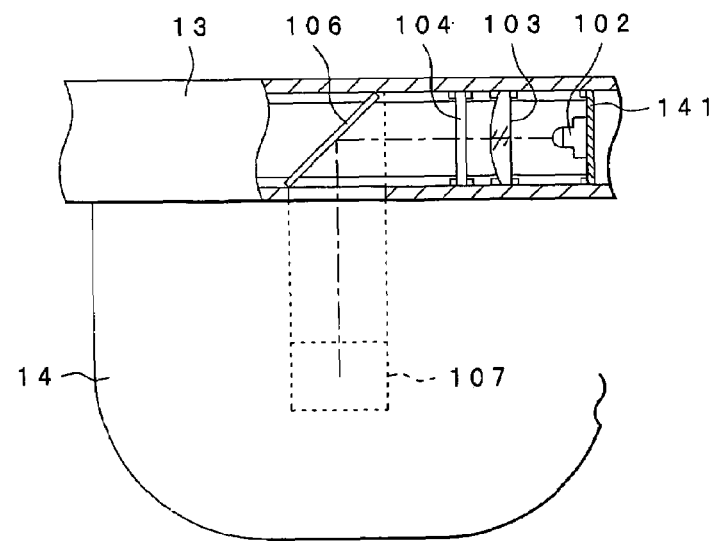
FIG. 14 is a front view, partially in section, illustrating the optical system of the see-through image display portion in the first embodiment.
Figure 15A:
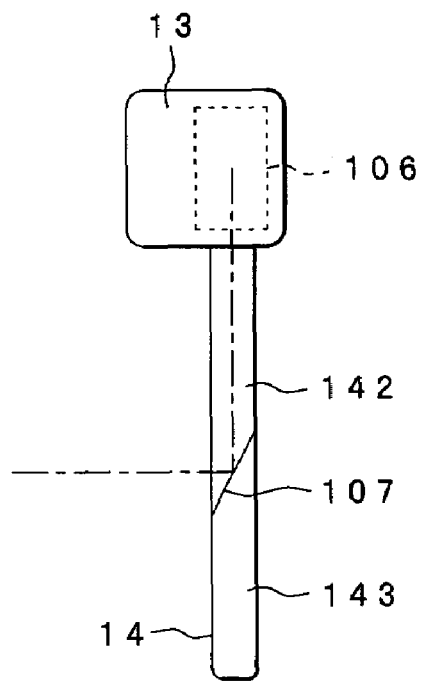
FIGS. 15A and 15B are left side views illustrating examples of the configuration of the optical system of the see-through image display portion in the first embodiment.
Figure 15B:
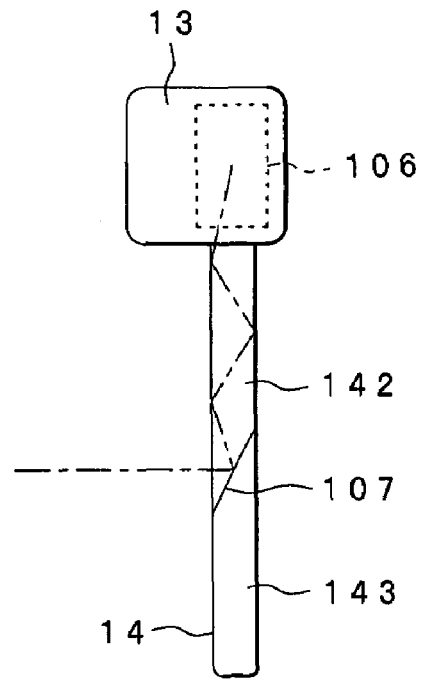
Figure 16:
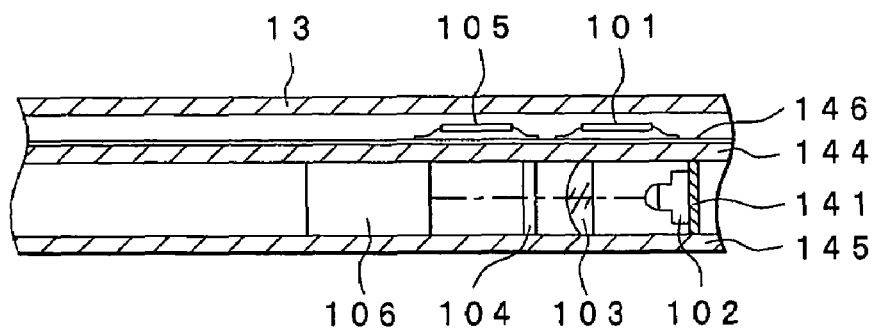
FIG. 16 is a sectional plan view illustrating the configuration of the optical system of the see-through image display portion in the first embodiment.

The optical structure of the see-through image display portion 6 is described below with reference to FIGS. 13 through 16. FIG. 13 illustrates the principle of the optical system of the see-through image display portion 6. FIG. 14 is a front view, partially in section, illustrating the configuration of the optical system of the see-through image display portion 6. FIGS. 15A and 15B are left side views illustrating examples of the configuration of the optical system of the see-through image display portion 6. FIG. 16 is a sectional plan view illustrating the configuration of the optical system of the see-through image display portion 6.

In the see-through image display portion 6, a photographic frame indicating a photographic range can be superimposed as a virtual image on a subject substantially directly observed by the photographer. Such a display mode is referred to as the "see-through display". The term "substantially directly observing/observed" includes not only a case where the photographer observes the subject directly with his/her eyes, but also a case where the photographer observes the subject through a generally planar transparent member formed of, for example, glass or plastic, or a case where the photographer observes the subject through an eyesight-correcting lens.

The principle of displaying see-through images by the optical system of the see-through image display portion 6 (hereinafter referred to as the "see-through image display optical system") in the first embodiment is described below with reference to FIG. 13.

Light emitted from the LED 102 is condensed by the condenser lens 103 and illuminates the LCD 104 from backward. The LED 102 includes diodes that can emit red (R), green (G), and blue (B) light, and when a photographic frame is displayed, for example, only the G diode is allowed to emit light.

The second CPU 112 generates a signal corresponding to the photographic frame indicating the photographic range and outputs it to the LCD driver 105. The LCD driver 105 drives the LCD 104 based on this signal to allow the LCD 104 to display the photographic frame.

The photographic frame image output from the LCD 104 is reflected by the second HOE 107 and is guided to the photographer's eyes. Then, the photographer can observe the photographic frame indicating the photographic range as a virtual image VI. The first HOE 106 is not shown since only the principle is illustrated in FIG. 13.

The second HOE 107 is a volume-phase holographic optical element using a photosensitive material, such as photopolymer, and is designed to reflect light having R, G, and B wavelengths emitted from the LED 102 with the maximum reflectivity. Accordingly, when emitting G light to display a photographic frame, the green photographic frame is clearly displayed as a virtual image. The HOE exhibits excellent wavelength selectivity, and more specifically, the HOE exhibits high reflection characteristics for the R, G, and B wavelength light with extremely narrow wavelength intervals and exhibits high transmission characteristics for the other wavelength light. Accordingly, external light having the same wavelength range as the display light is diffracted and reflected and does not reach the photographer's eyes, but external light having the other wavelength ranges reaches the photographer's eyes. Generally, since visible light has a wide wavelength interval, an external image can be observed without any problem even if light having very narrow wavelength intervals including the R, G, and B wavelengths does not reach the photographer's eyes.

In the see-through image display portion 6, an image picked up by the first image pickup device 30 can be see-through displayed as a color image. In this case, the captured image is displayed on the LCD 104, and also, the LED 102 is controlled to emit three R, G, and B types of light. This allows the captured image to reach the photographer's eyes through the second HOE 107 as a virtual image.

The first HOE 106 reflects light from the LCD 104 toward the second HOE 107, and also has a function of correcting the curvature of field. Although in this embodiment the first HOE 106 is used, a free-form optical element may be used. Although the free-form optical element is light and small, it can correct the complicated aberration, and thus, clear images with small aberration can be displayed without increasing the weight of the head-mounted unit 2.

Specific arrangements of the see-through image display optical system are described below with reference to FIGS. 14 through 16.

In the portion inside the frame 13 and closer to a subject and above the transparent optical member 14 (and/or the transparent optical member 15), the LED 102, the condenser lens 103, the LCD 104, and the first HOE 106 are disposed in the order shown in FIG. 14. Those elements are fixed, as shown in FIG. 16, by being sandwiched between support frames 144 and 145. In this case, the LED 102 is fixed by the support frames 144 and 145 while being mounted on an electronic circuit board 141. The first HOE 106 is inclined so that it can reflect light from the LED 102 vertically downward.

The transparent optical member 14 (and/or the transparent optical member 15) includes, as shown in FIGS. 15A and 15B, optical waveguide members 142 and 143 formed of transparent glass or plastic to have a predetermined thickness and the second HOE 107 inclined between the optical waveguide members 142 and 143 to reflect light backward. With this configuration, light reflected by the first HOE 106 propagates the inside of the optical waveguide member 142 disposed above the second HOE 107 and reaches the second HOE 107. The propagation of light inside the optical waveguide member 142 may be only the transmission, as shown in FIG. 15A, or a combination of the transmission and internal total reflection, as shown in FIG. 15B. If the optical system is designed as shown in FIG. 15B, the transparent optical member 14 (and/or transparent optical member 15) can be thin-walled, thereby further reducing the weight of the head-mounted unit 2.

In the portion inside the frame 13 and closer to the photographer's head (opposite to the subject), an electronic circuit board 146 for mounting the LED driver 101 and the LCD driver 105 is disposed, as shown in FIG. 16, opposite to the see-through image display optical system across the support frame 144.

Among the above-described elements, the see-through image display optical system includes the LED 102, the condenser lens 103, the LCD 104, the first HOE 106, the second HOE 107, and the optical waveguide members 142 and 143.

As the arrangement of the see-through image display portion 6 to observe a subject with the two eyes of a photographer, the following two examples can be considered.

In a first example, only the portion corresponding to one eye is formed of a see-through image display optical system, such as that shown in FIG. 14, and the portion corresponding to the other eye is formed of merely a transparent optical member without a see-through image display function. In this case, it is preferable that the luminous transmittance characteristic of the transparent optical member without a see-through image display function is the same as that of the transparent optical member 14 (or transparent optical member 15), thereby reducing the eyestrain of the photographer even over a long use.

In a second example, a see-through image display optical system, such as that shown in FIG. 14, is formed for both the eyes. By the use of a pair of see-through image display optical systems, the eyestrain can further be reduced, and images that should be observed three-dimensionally can also be displayed.

Display examples of images by the see-through image display portion 6 are described below with reference to FIGS. 17 through 26.

Figure 17:
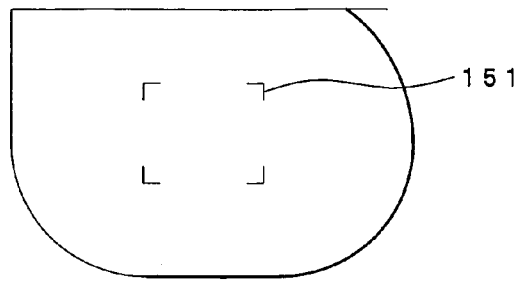
FIG. 17 illustrates a display example of the see-through display initial state in the first embodiment.

FIG. 17 illustrates a display example in the see-through display initial state. When the camera 1 is powered on or when the system is reset, the see-through image display portion 6 displays a screen, such as that shown in FIG. 17. In this case, as shown in FIG. 17, a photographic frame 151 indicating a photographic range corresponding to a standard lens (for example, having a field angle of 50°) is displayed in a see-through manner. That is, the photographic frame 151 having a visual angle of 50° when viewed from a photographer is displayed in a see-through manner.

Figure 18:
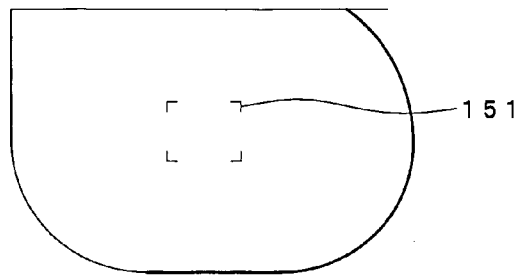
FIG. 18 illustrates a display example when the zoom is changed to the telephotographing mode in the first embodiment.

FIG. 18 illustrates a display example when the zoom is changed to the tele (T) mode, and the photographic frame 151 shown in FIG. 18 indicates a photographic range corresponding to the telephotographing operation. As stated above, the photographic frame 151 can be changed by the operation of the zoom switch 75, and in this case, the focal distance of the first photographing optical system 31 is changed so that the field angle of the first image pickup device 30 coincides with the visual angle of the photographic frame 151. More specifically, the photographic range corresponding to the focal distance of the standard lens shown in FIG. 17 is shifted to the photographic range corresponding to the tele (T) mode shown in FIG. 18 by the operation of the tele switch 75a of the zoom lens 75.

Figure 19:
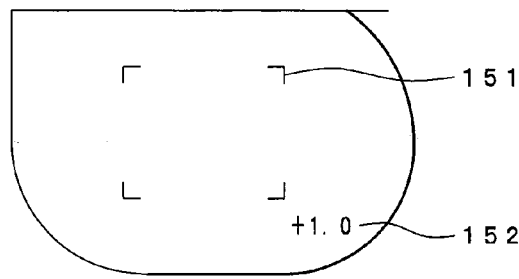
FIG. 19 illustrates a display example when the zoom is changed to the wide mode and when exposure correction is conducted in the first embodiment.

FIG. 19 illustrates a display example when the zoom is changed to the wide (W) mode and when the exposure correction is conducted. The photographic frame 151 shown in FIG. 19 indicates a photographic range corresponding to the wide (W) mode, and the corrected exposure is indicated at the bottom right of the photographic frame 151 as information 152. In this example, the exposure was corrected to +1.0 by the operation of the exposure correction switch 76. The information 152 concerning the exposure correction can be indicated by other than numerical values, such as a bar graph or an index. The photographic range corresponding to the focal distance of the standard lens shown in FIG. 17 is shifted to the photographic range of the photographic frame 151 shown in FIG. 19 by the operation of the wide switch 75b of the zoom switch 75.

Figure 20:
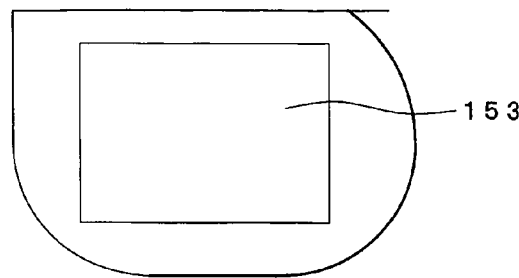
FIG. 20 illustrates a display example when an image is displayed as an electronic view in the first embodiment.

FIG. 20 illustrates a display example when an image is displayed as an electronic view. When the electronic view display (V) is selected by the F/V switch 72, an electronic image 153 picked up by the first image pickup device 30 is projected on the photographer's eyes as a virtual image. The size of the image displayed as an electronic view can be set according to the resolution of the image, and when the resolution is low, the image can be displayed with a small size.

Figure 21:
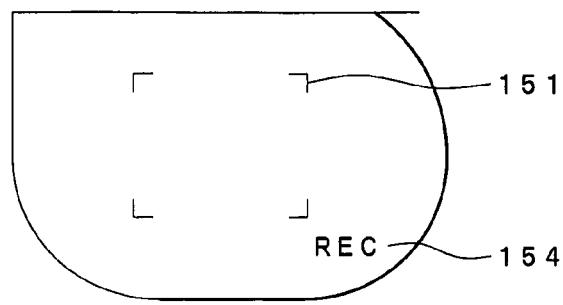
FIG. 21 illustrates a display example when a moving picture is being recorded in the first embodiment.

FIG. 21 illustrates a display example when a moving picture is being recorded. When the record switch 74 is operated to start recording, the photographic frame 151 indicating the photographic range is displayed, as shown in FIG. 21, and also, information 154 indicating that a recording operation is in progress is indicated as "REC" at the bottom right of the photographic frame 151. The information 154 may be other than characters.

Figure 22:
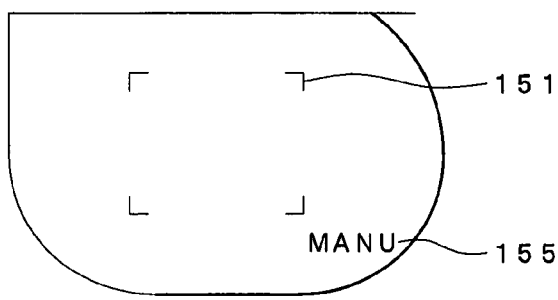
FIG. 22 is a display example in a manual mode in the first embodiment.

FIG. 22 illustrates a display example in a manual mode. When the manual mode (M) is set by the operation of the A/M switch 71, information 155 indicating the manual mode (M) is displayed as "MANU" at the bottom right of the photographic frame 151. When the information 155 indicating "MANU" is not displayed, the camera 1 is in the auto (A) mode.

Figure 23:
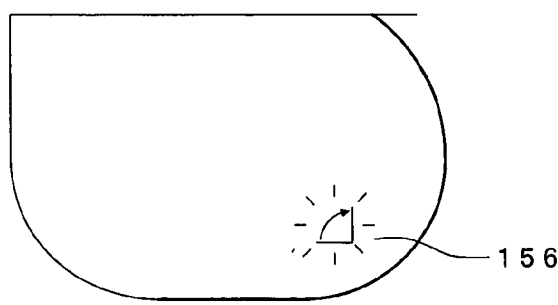
FIG. 23 illustrates a display example of alarm information when the opening angle of a temple with respect to a front portion is not sufficient in the first embodiment.

FIG. 23 illustrates a display example of alarm information 156 when the opening angle of the temple 12 with respect to the front portion 11 is not sufficient. If the temple 12 is not opened to a predetermined position, a deviation of the angle is generated between the first image pickup device 30 and the visual axis. Accordingly, such a deviation is detected and an alarm is issued by a configuration described below.

Figure 24:
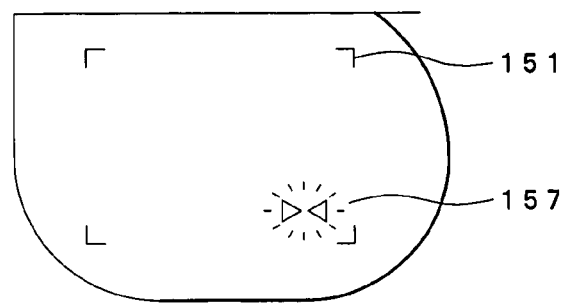
FIG. 24 illustrates a display example of alarm information indicated in a see-through manner in the first embodiment when the focal distance of a first photographing optical system is to be further reduced even when it has reached the adjustable lower limit.

FIG. 24 illustrates a display example of alarm information 157 indicated in a see-through manner when the focal distance f of the first photographing optical system 31 is to be further reduced even if it has reached the adjustable lower limit k1. That is, when the zoom operation is further continued to decrease the focal distance f in the wide mode even if the zoom has reached the limit of the wide mode, the alarm information 157 is displayed together with the photographic frame 151 indicating the photographic range.

Figure 25:
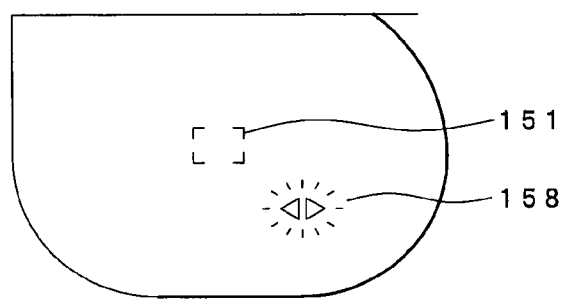
FIG. 25 illustrates a display example of alarm information indicated in a see-through manner in the first embodiment when the focal distance of the first photographing optical system is to be further increased even when it has reached the adjustable upper limit.

FIG. 25 illustrates a display example of alarm information 158 indicated in a see-through manner when the focal distance f of the first photographing optical system 31 is to be further increased even if it has reached the adjustable upper limit k2. That is, when the zoom operation is further continued to increase the focal distance f in the tele mode even if the zoom has reached the limit of the tele mode, the alarm information 158 is displayed together with the photographic frame 151 indicating the photographic range.

Figure 26:
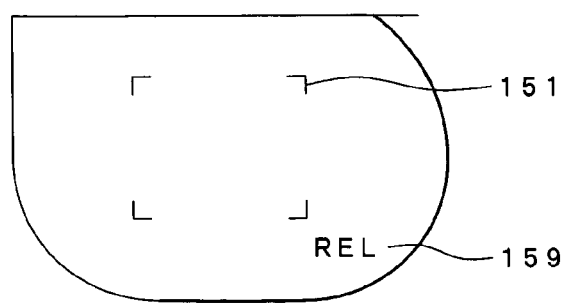
FIG. 26 illustrates a display example when a photographing operation for a still image is performed in the first embodiment.

FIG. 26 illustrates a display example when a photographing operation for a still image is performed. In this case, the photographic frame 151 indicating the photographic range is displayed, and also, information 159 indicating that a still image has been recorded is indicated as "REL" at the bottom right of the photographic frame 151. The information 159 is not restricted to characters.

In the above-described display examples, the regular information is displayed by allowing, for example, the green (G) diode of the LED 102, to emit light, and the alarm information is displayed by allowing, for example, the red (R) diode of the LED 102, to emit light.

Figure 27:
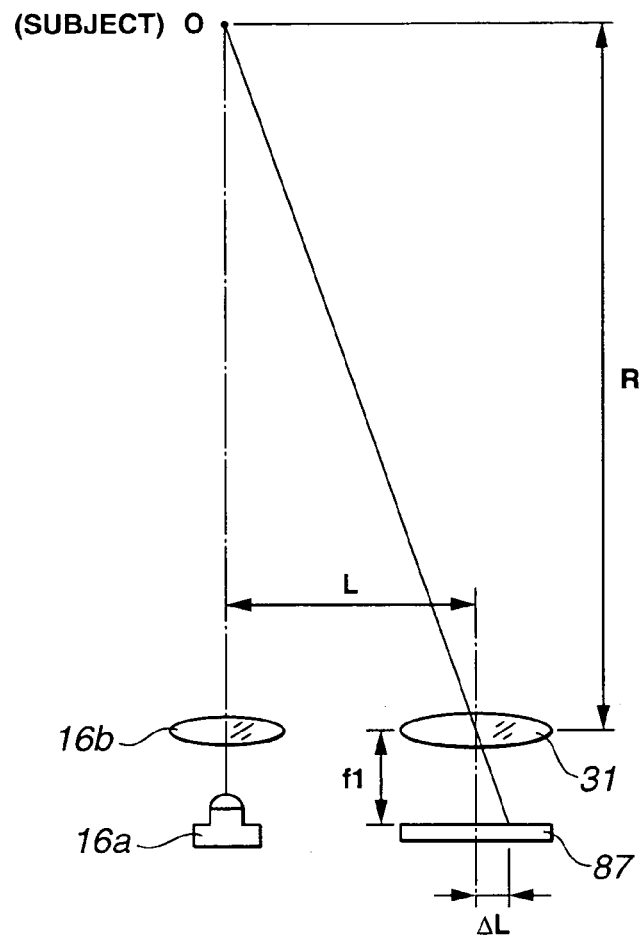
FIG. 27 illustrates the principle of distance measurement in the first embodiment.

FIG. 27 illustrates the principle of distance measurement.

A distance-measurement projector optical system including the projector LED 16a and the condenser lens 16b of the projector light-emitting portion 16 and an image pickup system including the first photographing optical system 31 and the CCD 87 are disposed such that the optical axes of the two systems are separated from each other by a predetermined distance (L).

With this configuration, light emitted from the projector LED 16a is output from the condenser lens 16b almost in the form of parallel light, and is applied to a subject O. The light is reflected by the subject O and is incident on the image pickup plane of the CCD 87 via the first photographing optical system 31.

In this case, when the distance between the optical axis of the condenser lens 16b and the optical axis of the first photographing optical system 31 is indicated by L, when the distance from the principal point of the first photographing optical system 31 to the image pickup plane of the CCD 87 is represented by f1, and when the distance between the image forming position of the reflected light from the subject O on the image pickup plane of the CCD 87 and the optical axis of the first photographing optical system 31 is indicated by DL, the distance R from the principal point of the first photographing optical system 31 to the subject O can be determined by the following equation.

$$R = \frac{L}{\Delta L} \cdot f1 \tag{1}$$

Figure 28:
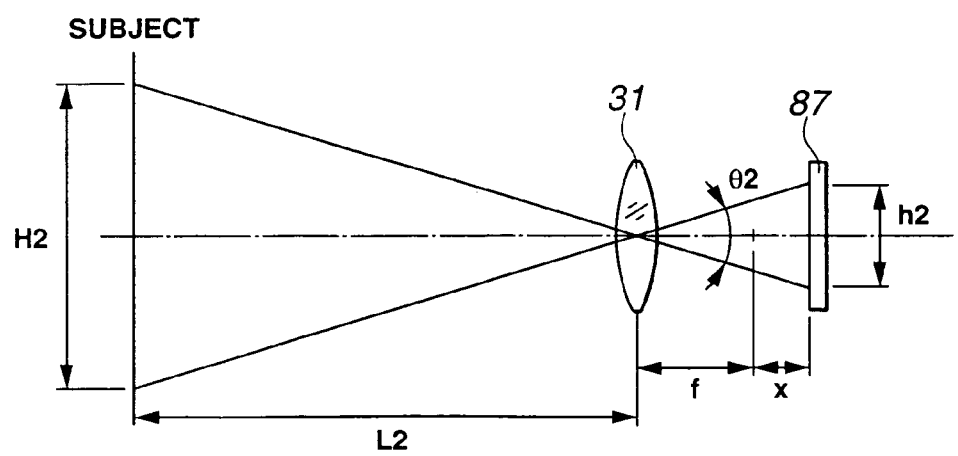
FIG. 28 illustrates the optical relationship between a subject to the first photographing optical system and a charge-coupled device (CCD) in the first embodiment.
Figure 29:
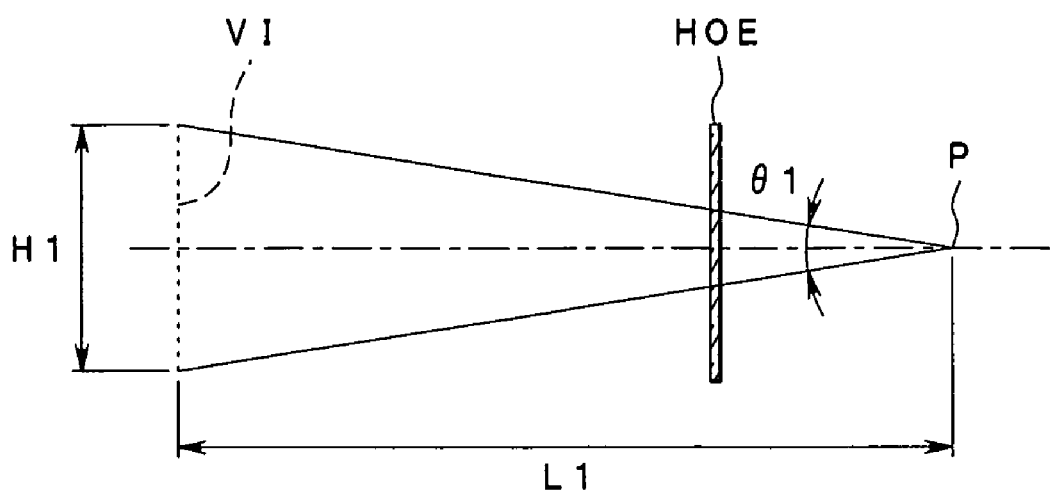
FIG. 29 illustrates the optical relationship of a holographic optical element (HOE) to an eye and a virtual image formed by the HOE in the first embodiment.
Figure 30:
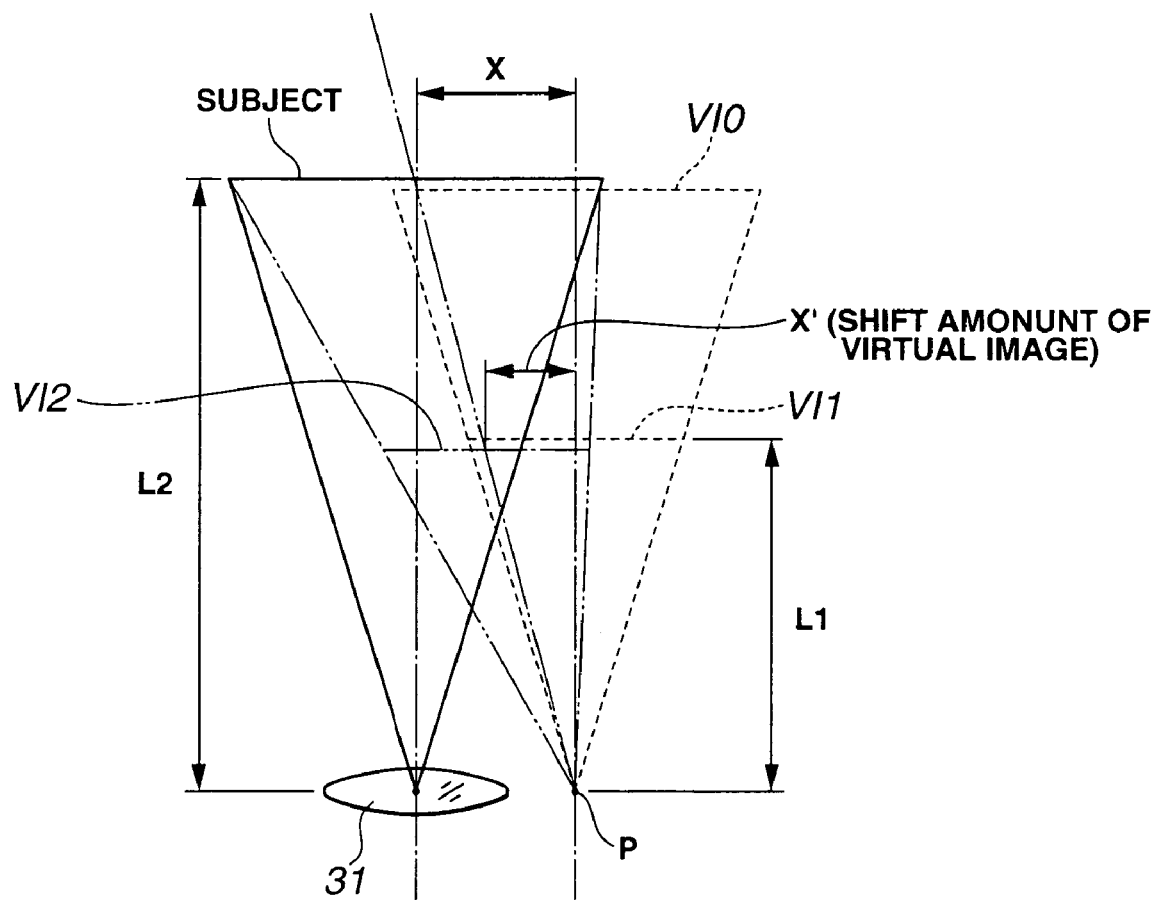
FIG. 30 illustrates the amount by which the virtual image is shifted for correcting the parallax in the first embodiment.

The principle of the correction for the parallax based on the distance to the subject is described below with reference to FIGS. 28 through 30. FIG. 28 illustrates the optical relationship of the subject to the first photographing optical system 31 and the CCD 87. FIG. 29 illustrates the optical relationship of a HOE to the eye and a virtual image formed by the HOE. FIG. 30 illustrates the amount by which the virtual image is shifted for correcting the parallax.

As shown in FIG. 28, when the horizontal size of the image pickup area of the CCD 87 is indicated by h2, when the focal distance of the first photographing optical system 31 is represented by f, when the distance from the principal point of the first photographing optical system 31 to the CCD 87 is designated by f+x, when the distance from the principal point of the first photographing optical system 31 to the subject is indicated by L2, when the horizontal length of the subject picked up by the CCD 87 is represented by H2, and when the photographic field angle in the horizontal direction is indicated by q2, the following equation holds true.

$$\tan\left(\frac{\theta 2}{2}\right) = \frac{\frac{h2}{2}}{(f+x)} \tag{2}$$

As shown in FIG. 29, when the distance from the pupil P of the photographer to the position of the photographic frame (virtual image VI) indicating the photographic range is indicated by L1, when the horizontal length of the photographic frame is represented by H1, and when the angle (visual angle) of the horizontal length H1 of the photographic frame from the position of the pupil P is designated by q1, the following equation hold true.

$$\tan\left(\frac{\theta 1}{2}\right) = \frac{\frac{H1}{2}}{L1} \tag{3}$$

In order to perform a photographing operation in the photographic range set by the photographer, it is necessary that the photographic field angle and the visual angle be equal to each other, i.e., q2=q1. Under the condition of q2=q1, the right side of equation (2) and the right side of equation (3) should be equal to each other. To satisfy this requirement, the focal distance f of the first photographing optical system 31 can be determined by the following equation.

$$f = \frac{L1}{H1} \cdot h2 - x \tag{4}$$

From the principle of the image formation using a lens, the following equation holds true.

$$\frac{1}{L2} + \frac{1}{f+x} = \frac{1}{f} \tag{5}$$

By eliminating x from equation (4) and equation (5), the following equation (6) can be derived.

$$f = \frac{h2}{\frac{h2}{L2} + \frac{H1}{L1}} \tag{6}$$

If the subject distance L2 is found from equation (6), the focal distance t can be determined.

To establish the relationship of h2/L2<<H1/L1 in an ordinary subject, when it is desired that calculations are simplified or when element for determining the distance to a subject is not provided, the approximation can be obtained by the following equation.

$$f \cong \frac{L1}{H1} \cdot h2 \tag{7}$$

The principle of the parallax correction is described below with reference to FIG. 30.

To describe the principle of the parallax correction, it is assumed that the optical axis of the first photographing optical system 31 and the visual axis of the photographer are perpendicular to the photographer's face and that the optical axis and the visual axis are disposed separately from each other by the distance X. The parallax is caused by the fact that the optical axis and the visual axis are separated from each other by the distance X. If the optical axis and the visual axis are relatively tilted, a large parallax may occur, and it is thus necessary to adjust them to be in parallel. A method for adjusting the optical axis and the visual axis is described in detail below.

As indicated by the solid lines and the broken lines in FIG. 30, if the distance to a virtual image VI0, which is a photographic frame indicating the photographic range, is equal to the distance to a subject, a deviation (parallax) between the range observed by the photographer and the range picked up by the first image pickup device 30 is a constant value X. In actuality, however, the distance L1 from the pupil P of the photographer to a virtual image VI1 is different from the distance L2 from the principal point of the first photographing optical system 31 to the subject. The amount X' by which the parallax is corrected (hereinafter referred to as the "parallax correction amount X'") which allows the photographic frame as the virtual image to match the actual image pickup range is expressed by the following equation.

$$X' = \frac{L1}{L2} \cdot X \tag{8}$$

When the reciprocal of the magnification (i.e., the ratio of the size of the virtual image to the size of the image displayed on the LCD 104) of the virtual image VI1 of the photographic frame is represented by b, the amount SP by which the image displayed on the LCD 104 is shifted (hereinafter referred to as the "shift amount SP") for correcting the parallax is expressed by the following equation.

$$SP = \beta \cdot X' = \frac{L1}{L2} \cdot \beta \cdot X \tag{9}$$

Accordingly, the second CPU 112 controls the LCD driver 105 to shift the image displayed on the LCD 104 by the shift amount SP expressed by equation (9). Then, the position of the virtual image VI1 is shifted to the position of a virtual image VI2 by the distance X', and as indicated by the two-dot-chain lines in FIG. 30, the range indicated by the photographic frame of the virtual image coincides with the actual image pickup range.

As described above, the shift amount SP for conducting the parallax correction is determined by the subject distance L2, and basically, the parallax correction should be performed every time the subject distance L2 is changed.

However, when, for example, b=1/100, L1=2 m, L2=2 m, X=4 cm, the shift amount SP is calculated to be 0.4 mm. This parallax correction amount can be converted into the visual angle Sq by using the following equation.

$$S\theta = \tan^{-1}\left(\frac{X}{L2}\right) \tag{10}$$

According to equation (10), the visual angle Sq is calculated to be about 1 degree, which is not a very large parallax. Accordingly, it can be said that the parallax correction is not necessary in most cases when regular photographing is conducted. On the other hand, since the element in the parentheses of the right side of equation (10) is proportional to the reciprocal of the subject distance L2, the visual angle Sq is increased and the parallax correction using equation (9) is required when the subject distance L2 is small, i.e., when short-distance photographing is performed.

Figure 31:
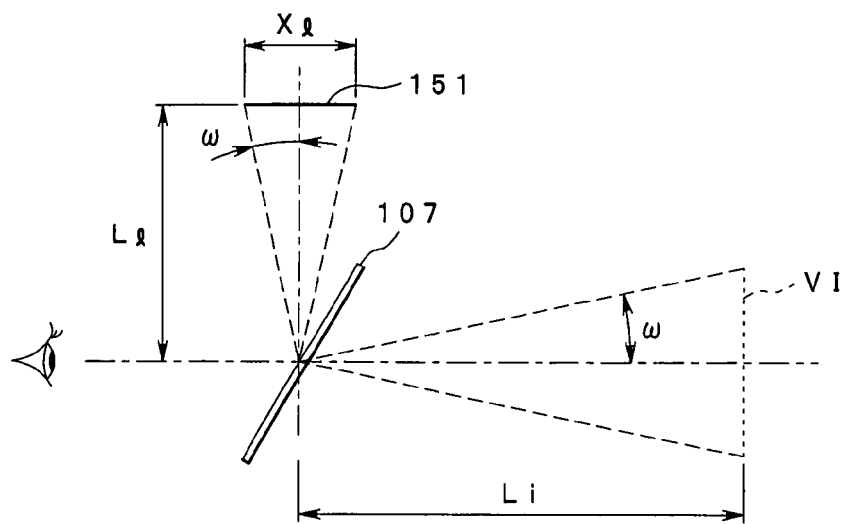
FIG. 31 illustrates the principle of changing the distance from the eye to the virtual image in the first embodiment.
Figure 32:
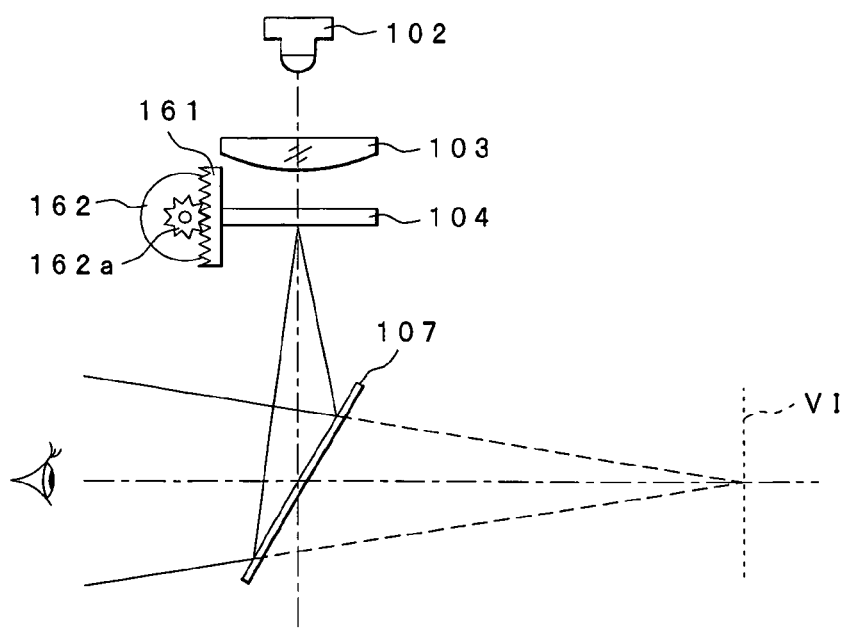
FIG. 32 illustrates an example of the configuration in which a liquid crystal display (LCD) is driven in the optical axis direction by an actuator in the first embodiment.
Figure 33:
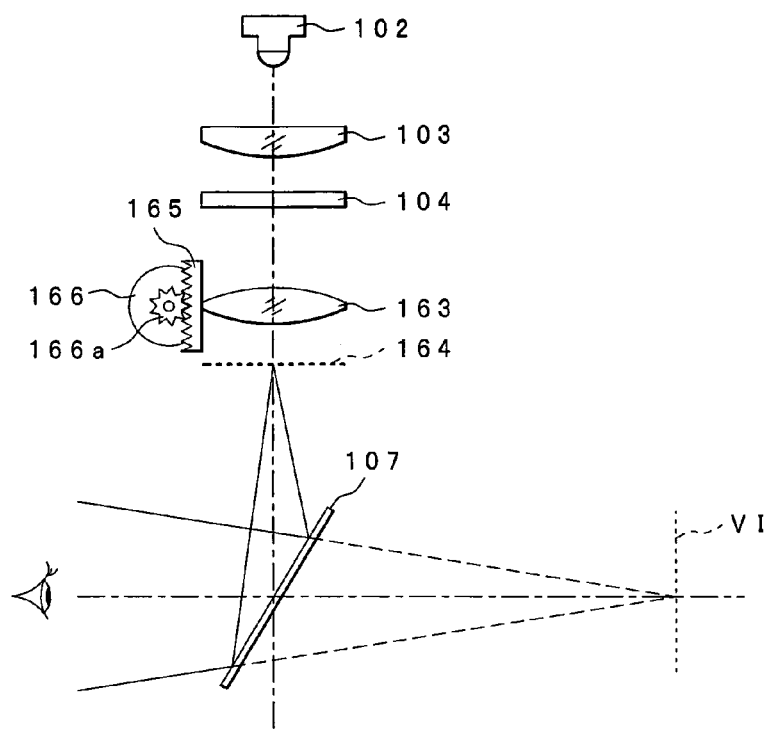
FIG. 33 illustrates an example of the configuration in which an image of the LCD is firstly formed and the position of the linear image is changed in the optical axis direction in the first embodiment.

A description is now given, with reference to FIGS. 31 through 33, of a configuration in which a photographer can clearly observe a subject and a virtual image such that that they can be in focus at the same time.

If there is a large difference between the distance from the eye to a virtual image in the photographic frame and the distance from the eye to a subject, it is difficult to adjust both the photographic frame and the subject in focus, and thus, the photographer cannot clearly observe the photographic frame and the subject at the same time.

Accordingly, a description is given below of the configuration in which the distance from the eye to the virtual image in the photographic frame is set to be equal to the distance from the eye to the subject so as to allow the photographer to clearly observe the photographic frame and the subject at the same time.

FIG. 31 illustrates the principle of changing the distance from the eye to the virtual image. In FIG. 31, since only a simple description of the principle is given without referring to details of the individual members, the first HOE 106 is not shown or a description thereof is omitted.

When the focal distance of the second HOE 107 is indicated by f, when the distance from the position of the photographic frame 151 displayed on the LCD 104 to the second HOE 107 is represented by L1, when the distance from the second HOE 107 to the virtual image VI is designated by Li, when the angle (visual angle) of the virtual image on the diagonal line of the photographic frame 151 when viewed from the photographer is indicated by 2w, and when the length of the diagonal line of the photographic frame 151 displayed on the LCD 104 is represented by X1, the following equations hold true.

$$L1 = \frac{1}{\frac{1}{f} - \frac{1}{Li}} \quad (11)$$

$$X1 = 2 \cdot L1 \cdot \tan\varpi = \frac{2 \cdot \tan\varpi}{\frac{1}{f} - \frac{1}{Li}} \quad (12)$$

Among the variables and constants in equations (11) and (12), f is fixed when the second HOE 107 is designed, and w can be set as desired by the photographer, and corresponds to the distance (that is, the distance determined by distance measurement) that allows the distance Li to the virtual image to coincide with the distance to the subject. Accordingly, by substituting these values into equation (11), the position L1 of the LCD 104 that allows the virtual image to be displayed at a distance equal to the distance to the subject can be determined. By further substituting the above values into equation (12), the size X1 of the photographic frame displayed on the LCD 104 that allows the visual angle of the photographic frame to coincide with the photographic field angle can be determined.

FIG. 32 illustrates an example of the configuration in which the LCD 104 is driven in the optical axis direction by an actuator 162, which serves as virtual-image distance adjusting element. In this example, as the actuator 162, a known actuator, such as an electromagnetic motor, an ultra sonic motor (USM), or an electrostatic actuator, is used for changing the distance L1. The LCD 104 is disposed so that it can be moved in the optical axis direction of the condenser lens 103, and a rack 161, which serves as virtual-image distance adjusting element, for displacing the LCD 104 in the optical axis direction, is provided on, for example, a frame member for supporting the LCD 104. A pinion gear 162a fixed to the rotational axis of the actuator 162 is meshed with the rack 161 so as to transmit a driving force. By rotating the actuator 162 by a desired amount, the LCD 104 can be shifted in the optical axis direction by a desired amount. With this configuration, the distance L1 is changed so that the distance Li to the virtual image VI can coincide with the distance to the subject. When the distance Li is changed by using this structure, the size of the photographic frame displayed on the LCD 104 has to be changed by the LCD driver 105, which serves as the visual-angle adjusting element, so that X1 expressed by equation (12) can be satisfied.

In the example shown in FIG. 32 and also in the example shown in FIG. 33, which is described below, in response to a change in the magnification (angle 2w of the subject) by changing the position of the virtual image, the size of an image displayed on the LCD 104 is corrected by using the LCD driver 105, which serves as visual-angle adjusting element, so that the magnification can be constant. More specifically, the size of the image displayed on the LCD 104 is corrected so that the ratio of the distance L1 from the position of the photographic frame 151 displayed on the LCD 104 to the second HOE 107 to the length X1 of the diagonal line of the photographic frame 151 displayed on the LCD 104 can be constant.

FIG. 33 illustrates an example of the configuration in which the image of the LCD 104 is linearly formed and the position of the linear image is changed in the optical axis direction. In this example, an image forming lens 163, which is an image optical system, is disposed on the optical path of light passing through the LCD 104. By the image forming lens 163, the image of the LCD 104 is formed linearly at a position 164 on the optical path between the image forming lens 163 and the second HOE 107. The image forming lens 163 is disposed so that it is movable in the optical axis direction, and a rack 165, which serves as virtual-image distance adjusting element, for displacing the image forming lens 163 in the optical axis direction is provided on, for example, a lens frame for supporting the image forming lens 163. As in the rack 161, a pinion gear 166a fixed to the rotational axis of the actuator 166, which serves as virtual-image distance adjusting element, is meshed with the rack 165 so as to transmit a driving force. By rotating the actuator 166 by a desired amount, the image forming lens 163 is moved in the optical axis direction so that the position 164 on the linear image forming plane can be shifted in the optical axis direction by a desired amount. By using this structure, the distance L1 is changed so that the distance Li to the virtual image VI can be equal to the distance to the subject. The distance L1 in the principle described with reference to FIG. 31 corresponds to the distance from the position 164 on the linear image forming plane to the second HOE 107 in FIG. 33. As stated above, the size of the photographic frame displayed on the LCD 104 is also changed.

In this example, the distance from the eye to the virtual image VI of the photographic frame is adjusted in accordance with the subject distance. In this case, however, the subject distance is changed every time the photographer changes his/her view to another subject, and the position of the photographic frame has to be changed every moment. Thus, unless the photographic frame is continuously adjusted with high precision, the photographer may feel visually awkward. Additionally, frequent adjustment of the photographic frame increases power consumption. Thus, the position of the photographic frame may be adjusted in several levels (for example, three levels) in a range from "very near" to "infinite".

Figure 34:
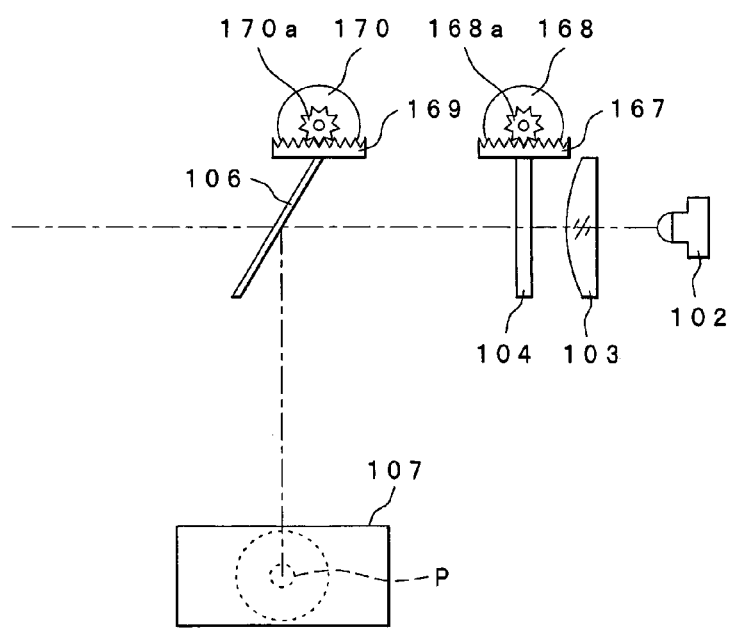
FIG. 34 illustrates an example of the configuration in which the position of a first HOE in the pupil-distance direction is changed by an actuator in the first embodiment.
Figure 35:
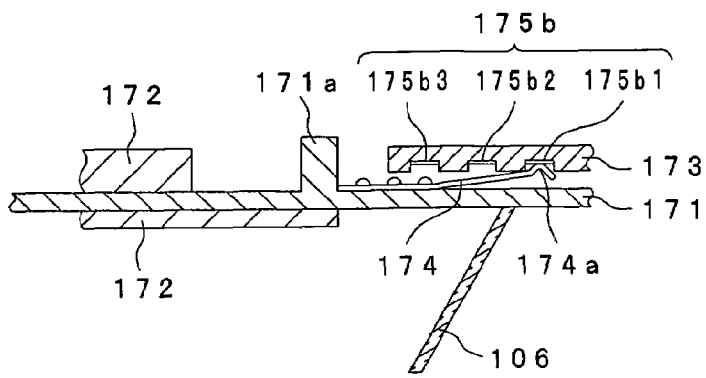
FIG. 35 illustrates an example of the configuration in which the position of the first HOE in the pupil-distance direction is changed mechanically in the first embodiment.
Figure 36:
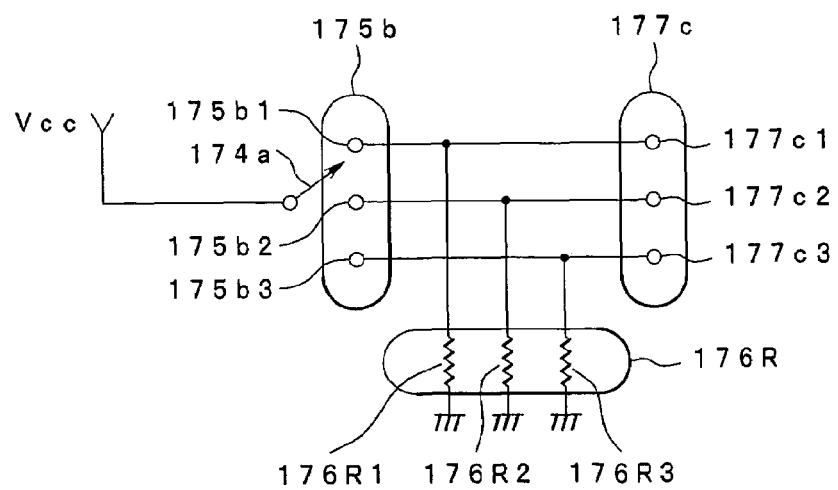
FIG. 36 is a circuit diagram illustrating the electrical configuration of the mechanical configuration shown in FIG. 35.

A description is now given, with reference to FIGS. 34 through 36, of the adjustment to the positions of the pupil and a virtual image observed via the second HOE 107 in the pupil-distance direction. FIG. 34 illustrates an example of the configuration in which the position of the first HOE 106 in the pupil-distance direction is changed by an actuator. FIG. 35 illustrates an example of the configuration in which the position of the first HOE 106 in the pupil-distance direction is changed mechanically. FIG. 36 is a circuit diagram illustrating the electrical configuration of the mechanical configuration shown in FIG. 35.

To allow the photographer to observe a virtual image displayed by the second HOE 107 at a correct position with respect to a subject, the positional relationship between the second HOE 107 and the pupil P should be adjusted. Since the position of the pupil varies depending on the individuals, a mechanism for allowing a photographer to make positional adjustments is useful. FIG. 34 illustrates an example of such a mechanism.

The first HOE 106, which is a reflective optical member, is attached to, for example, a rack 169, which forms pupil-distance adjusting element, provided with teeth in the pupil-distance direction (horizontal direction in parallel with the line connecting the two eyes). A pinion gear 170*a* fixed to the rotational axis of an actuator 170, which forms the pupil-distance adjusting element, is meshed with the rack 169 so as to transmit a driving force. By rotating the actuator 170 by a predetermined amount, the first HOE 106 can be moved in the pupil-distance direction.

Similarly, the LCD 104, which forms horizontal projection element, is attached to, for example, a rack 167, which forms the pupil-distance adjusting element, provided with teeth in the pupil-distance direction. A pinion gear 168*a* fixed to the rotational axis of an actuator 168, which forms the pupil-distance adjusting element, is meshed with the rack 167 so as to transmit a driving force. By rotating the actuator 168 by a desired amount, the LCD 104 can be moved in the pupil-distance direction.

If only the first HOE 106 is shifted in the pupil-distance direction, the distance L1 shown in FIG. 31 is changed. Thus, in the example shown in FIG. 34, in cooperation with the first HOE 106, the LCD 104 is also moved in the same direction by the same amount so that the distance L1 remains constant.

The second HOE 107 is formed longer than that shown in FIG. 14 in the pupil-distance direction so that it can cover the range in which the first HOE 106 is moved in the pupil-distance direction and that the image on the LCD 104 can be observed as a virtual image regardless of the position of the first HOE 106 (i.e., so that the image displayed on the LCD 104 can be projected on the pupil P).

As the actuator 168 or 170, a pulse motor, which is an electromagnetic motor, is used, and the amount by which the first HOE 106 or the LCD 104 is driven can be determined by counting drive pulses from a predetermined reference position. Alternatively, a known encoder may be used for detecting the driving amount. For example, a plate member provided with many slits at regular intervals in the direction in which the first HOE 106 or the LCD 104 is moved is disposed so that it can be moved integrally with the first HOE 106 or the LCD 104. Across this plate member, an LED is provided on one surface and a light-receiving device for receiving light from the LED via the slits is provided on the other surface so as to count the number of pulses output from the light-receiving device, thereby detecting the distance by which the first HOE 106 or the LCD 104 is moved.

The position of the see-through image display optical system with respect to the pupil P can be adjusted by driving the actuator 168 or 170 by the operation on an electrical switch. Alternatively, a sensor for detecting the position of the pupil P may be provided, and the second CPU 112 or the first CPU 111 controls the actuator 168 or 170 according to the output of the sensor, thereby automatically adjusting the position of the see-through image display optical system.

FIG. 35 illustrates an example of the configuration in which the position of the first HOE 106 in the pupil-distance direction is mechanically changed so as to adjust the relative position of the second HOE 107 with respect to the pupil.

The first HOE 106 is fixed to a slider 171, which is a support member, and the slider 171 is supported by guide members 172 fixed to the frame 13 so that it is movable in the pupil-distance direction within a predetermined range. The slider 171 is provided with a knob 171*a* that allows the photographer to move the slider 171 in the pupil-distance direction.

An electrical segment 174 is attached to the slider 171, and the distal end of the electrical segment 174 is a projecting contact 174*a*. The contact 174*a* has elasticity in the direction in which it is away from the slider 171. Accordingly, when a force is not applied, the contact 174*a* is positioned away from the slider 171, and when a force is applied, the contact 174*a* is moved to be close to the slider 171 with elasticity.

A substrate 173 is fixed to the frame 13 such that it faces the contact 174*a*. The substrate 173 is provided with a plurality of recesses disposed along the movement of the slider 171 at regular intervals on the bottom surface facing the slider 171, and electrical contacts 175*b* (in FIG. 35, three contracts 175*b*1, 175*b*2, and 175*b*3 are shown) are provided on the bottom surfaces of the recesses.

When the contact 174*a* is engaged with one of the recesses, it touches the contact 175*b* provided on the bottom of the corresponding recess and is electrically connected to the contact 175*b*. In this case, a clicking feeling is generated by the engagement of the contact 174*a* and the recess so that the photographer is informed that the slider 171 is moved to a predetermined position. Then, the position of the first HOE 106 in the pupil-distance direction can be detected according to with which one of the contacts 175*b*1, 175*b*2, and 175*b*3 the contact 174*a* is electrically connected.

The configuration of an electrical detection circuit including the contacts 174*a* and 175*b* is described below with reference to FIG. 36.

The contact 174*a* is connected to a power source Vcc and can be electrically connected to one of the plurality of contacts 175*b*1, 175*b*2, and 175*b*3 (which are collectively referred to as the "contacts 175*b*"). The contacts 175*b*1, 175*b*2, and 175*b*3 are grounded via resistors 176R1, 176R2, and 176R3 (which are collectively referred to as the "resistors 176R"), respectively, and are electrically connected to other terminals 177*c*1, 177*c*2, and 177*c*3 (which are collectively referred to as the "terminals 177*c*"), respectively.

With this configuration, the potential of the terminal 177*c* electrically connected to the terminal 175*b* which touches the contact 174*a* becomes the supply voltage Vcc, and the potentials of the other terminals 177*c* become equal to the ground potential. Accordingly, by detecting the potential of the terminals 177*c*, the position of the first HOE 106 can be detected.

Based on the detected position of the first HOE 106, the position of the LCD 104 (for example, see FIG. 34) or the position of the linear image forming plane of the LCD 104 can be corrected, thereby maintaining the virtual image in the photographic frame at a fixed position.

In the above-described example, by relatively moving the contact 174*a* with respect to the contacts 175*b*, which are separately disposed, the position of the first HOE 106 is adjusted and detected in a stepwise manner. However, the position of the first HOE 106 may be continuously adjusted and detected. To achieve this modification, the following configuration may be considered. The position of the slider 171 is continuously changed with respect to the guide members 172, and a thin-film resistor is printed on the substrate 173 along the sliding direction of the slider 171, and also, the contact 174*a* slides on the thin-film resistor while maintaining electrical contact therewith. In this case, by detecting the resistance between the contact 174*a* and one of the terminals of the thin-film resistor, the position of the first HOE 106 which is continuously changing can be detected.

As stated above, the mechanical adjustment of the position of the first HOE 106 in the pupil-distance direction is manually performed by using the knob 171*a*. This eliminates a high level control and simplifies the configuration. It is sufficient to adjust the position of the first HOE 106 only once unless the photographer is changed.

With this configuration, the relative position between the pupil and the principal ray from the second HOE 107 can be adjusted without changing the external appearance of the camera 1, thereby making it possible to precisely project the photographic frame on the photographer's pupil.

Figure 37:
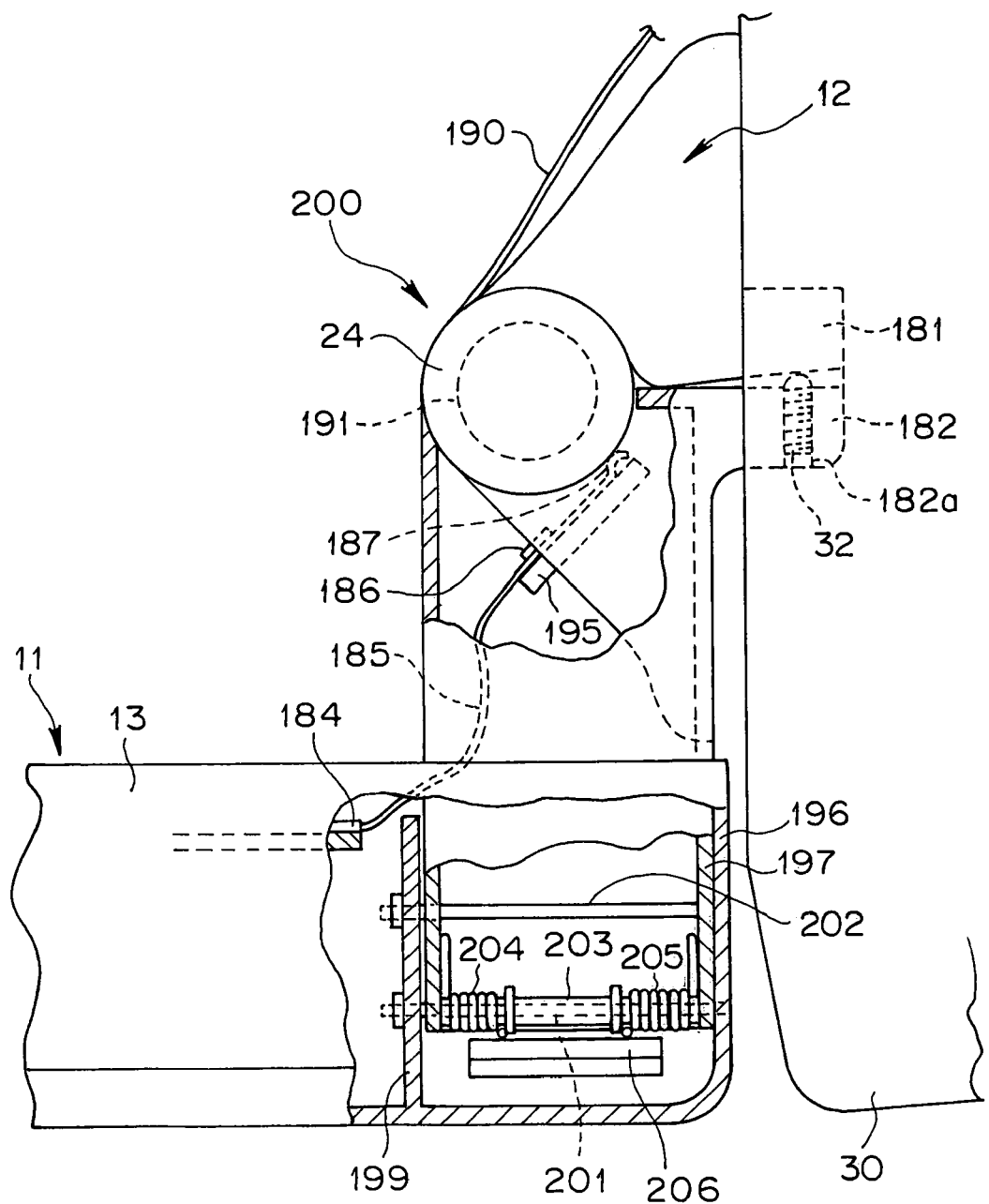
FIG. 37 is a plan view, partially in section, illustrating the structure of a connecting portion including the front portion, a hinge unit, and the temple in the first embodiment.
Figure 38:
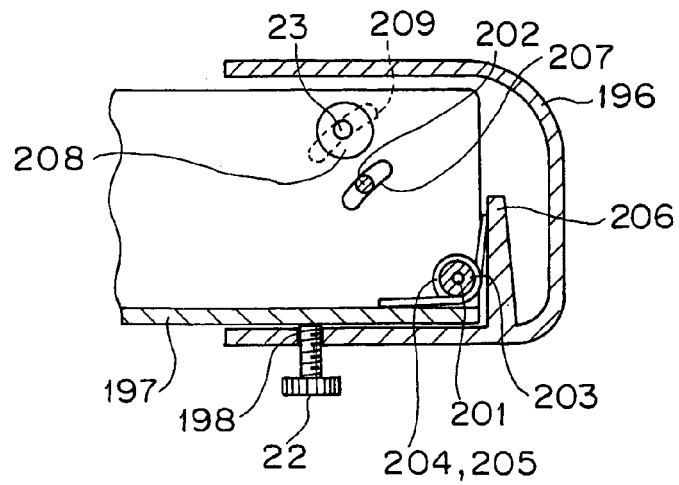
FIG. 38 is a vertical sectional view illustrating the connecting portion between the front portion and the hinge unit when viewed from the left side of FIG. 37 in the first embodiment.
Figure 39:
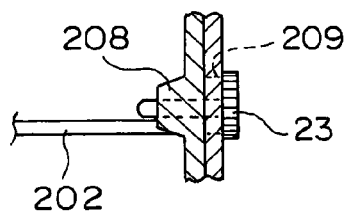
FIG. 39 is a sectional view illustrating a fixed portion formed of the front portion, the hinge unit, and the screw in the first embodiment.
Figure 40:
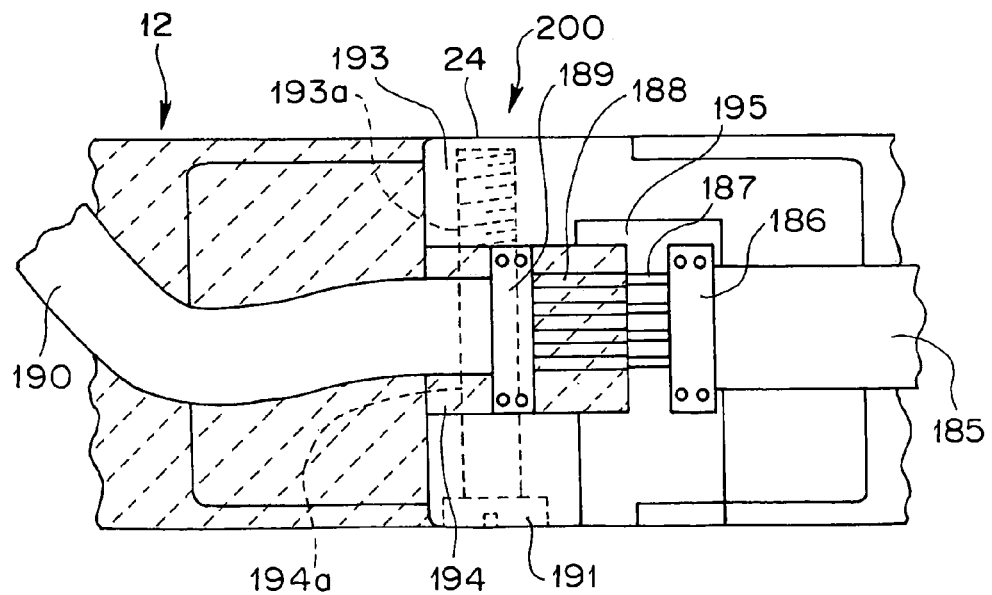
FIG. 40 illustrates the connecting portion between the hinge unit and the temple when viewed from the left side to substantially the right side of FIG. 37 in the first embodiment.
Figure 41:
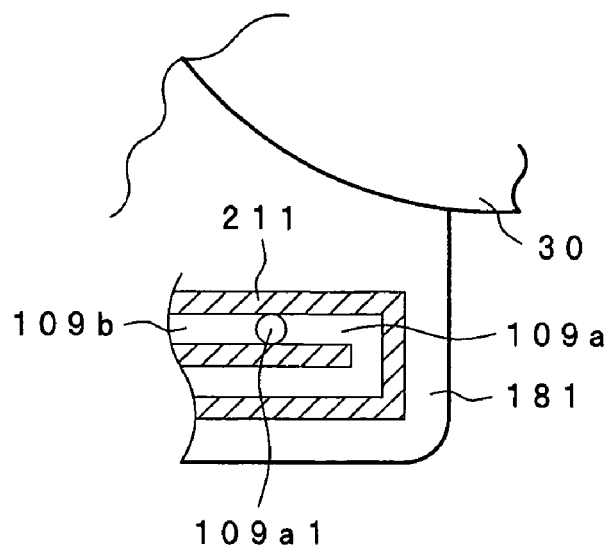
FIG. 41 is a front view illustrating an electrical contact provided on a projection of the temple in the first embodiment.
Figure 42:
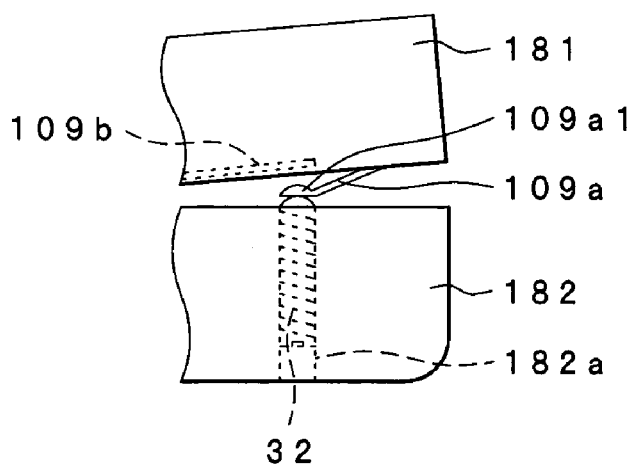
FIG. 42 is a plan view illustrating the electrical contact provided on the projection of the temple in the first embodiment.

A first example of the configuration of and near a hinge unit 200 is described below with reference to FIGS. 37 through 42. FIG. 37 is a plan view, partially in section, illustrating the structure of a connecting portion including the front portion 11, the hinge unit 200, and the temple 12. FIG. 38 is a vertical sectional view illustrating the connecting portion between the front portion 11 and the hinge unit 200 when viewed from the left side of FIG. 37. FIG. 39 is a sectional view illustrating a fixed portion formed of the front portion 11, the hinge unit 200, and the screw 23. FIG. 40 illustrates the connecting portion between the hinge unit 200 and the temple 12 when viewed from the left side to substantially the right side of FIG. 37. FIGS. 41 and 42 are a front view and a plan view, respectively, illustrating an electrical contact provided on a projection 181 of the temple 12.

The hinge unit 200 includes the hinge 24 and connects the temple 12 and the front portion 11 (or frame 13).

In the camera 1, as stated above, the photographer specifies a photographic frame indicating the photographic range, and performs a photographing operation with a field angle corresponding to the visual angle of the specified photographic frame, and thus, the parallax correction is necessary. The parallax is caused by a horizontal positional deviation between the visual axis of the photographer and the optical axis or by an angular deviation between the visual axis and the optical axis. Between the two deviations, the influence of the angular deviation is much larger, and thus, an adjusting mechanism (adjusting element) for precisely correcting the angular deviation is provided.

Figure 2:
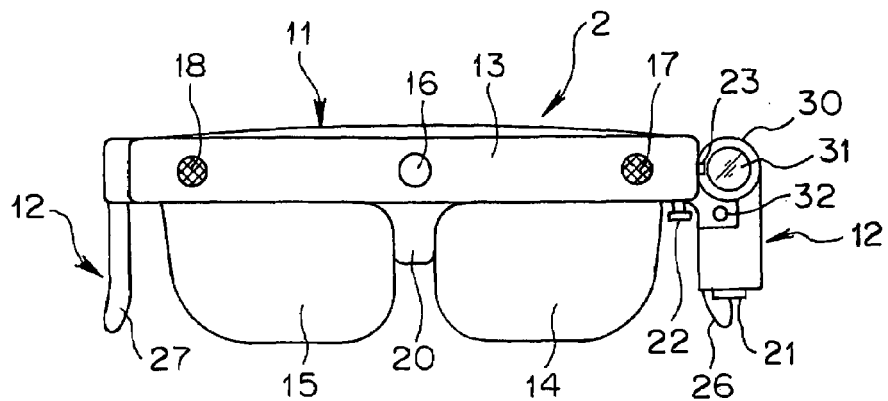
FIG. 2 is a front view illustrating the head-mounted camera of the first embodiment.
Figure 3:
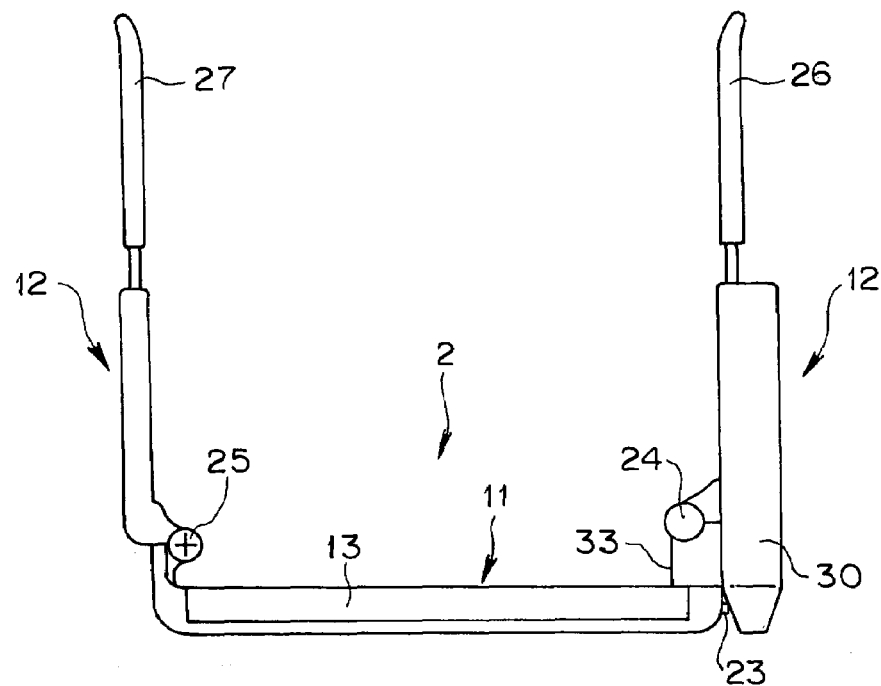
FIG. 3 is a plan view illustrating the head-mounted camera of the first embodiment.

In the camera 1, as shown in FIG. 3, the left and right temples 12 are substantially perpendicular to the front portion 11 when the head-mounted unit 2 is in use, and when the head-mounted unit 2 is not in use, the temples 12 are foldable inward toward the front portion 11 via the hinges 24 and 25. In the example shown in FIGS. 37 through 42, the hinge unit 200 including the right hinge 24 when the first image pickup device 30 is attached to the right temple 12, as shown in FIGS. 2 through 5, is described.

In the state in which the temple 12 is opened at the maximum angle (i.e., substantially perpendicularly) with respect to the front portion 11, the maximum opening angle (substantially 90°) between the see-through image display portion 6 and the first image pickup device 30 of the front portion 11 can be relatively adjusted (finely adjusted) in the pitch (vertical) direction and the yaw (horizontal direction). Accordingly, the optical axis of the first photographing optical system 31 of the first image pickup device 30 attached to the temple 12 can be adjusted to be in parallel with the visual axis.

The hinge 24 of the hinge unit 200 is formed as a knee joint and is configured as follows, as shown in FIG. 40. An angular U-shaped bearing 193 with a cylindrical screw hole 193*a* disposed at the front portion 11 is combined with a bearing 194 provided with a cylindrical hole 194*a* disposed at the temple 12 such that the screw hole 193*a* and the hole 194*a* pass through each other. A shaft 191, which serves as a connecting pin, is inserted into the holes 193*a* and 194*a*. In FIG. 40, the portion corresponding to the temple 12 is hatched.

As shown in FIG. 37, the temple 12 in the hinge unit 200 includes the projection 181, which serves as adjusting element, at the right side of FIG. 37, and the front portion 11 in the hinge unit 200 includes a projection 182, which serves as the adjusting element, at the right side of FIG. 37 such that the abutting surfaces of the projections 181 and 182 face each other. In the projection 182 of the hinge unit 200, a screw hole 182*a* substantially parallel with the optical axis of the first photographing optical system 31 when the camera 1 is in use is punched, and the bis 32 is screwed into the screw hole 182*a*. When the bis 32 is screwed until it is extended from the screw hole 182*a* of the projection 182, and the extended end of the bis 32 abuts against the projection 181 of the temple 12. With this configuration, the maximum opening angle of the temple 12 when the head-mounted unit 2 is in use is restricted, and the optical axis of the first photographing optical system 31 attached to the temple 12 can be finely adjusted in the yaw direction.

Such a fine and precise adjustment is performed when the temple 12 is disposed at a predetermined position (in this case, when it is opened at the maximum angle). Accordingly, the temple 12 should not be used when it is not sufficiently opened with respect to the front portion 11. Accordingly, element for detecting whether the temple 12 is opened at the maximum angle is provided, as shown in FIGS. 41 and 42, and if the temple 12 is not opened at the maximum angle, the alarm information 156 shown in FIG. 23 is given.

More specifically, as shown in FIGS. 41 and 42, an insulator 211 is disposed on the surface of the projection 181 facing the projection 182, and a linear electrical contact 109*b* and an angular U-shaped electrical contact 109*a* disposed in parallel with the contact 109*b* across the insulator 211 are embedded in the insulator 211. A distal end 109*a*1, which is a U-shaped portion, of the contact 109*a* floats from the surface of the projection 181 (surface of the insulator 211) with elasticity, and when an urging force is applied to the surface of the projection 181, the distal end 109*a*1 of the contact 109*a* touches the contact 109*b*, thereby establishing an electrical connection therebetween.

With this configuration, when the temple 12 is opened, the end of the bis 32 touches the distal end 109*a*1 of the contact 109*a*. When the temple 12 is opened at the maximum angle, the contact 109*a* touches the contact 109*b* by being pressed against the end of the bis 32. When the temple 12 is not opened at the maximum angle, the contact 109*a* is away and insulated from the contact 109*b*. In this manner, it can be determined whether the temple 12 is opened at the maximum angle.

Figure 4:
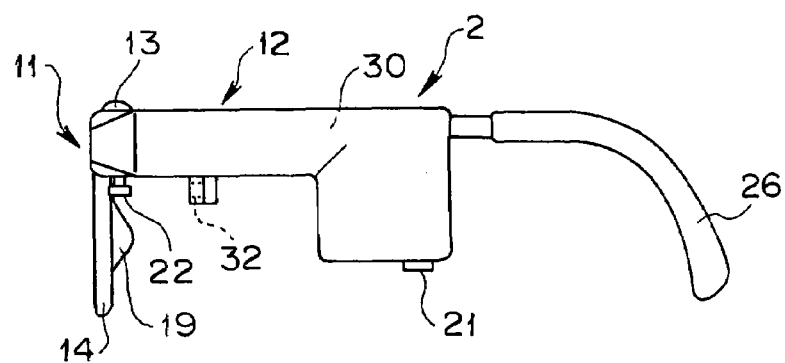
FIG. 4 is a right side view illustrating the head-mounted camera of the first embodiment.
Figure 5:
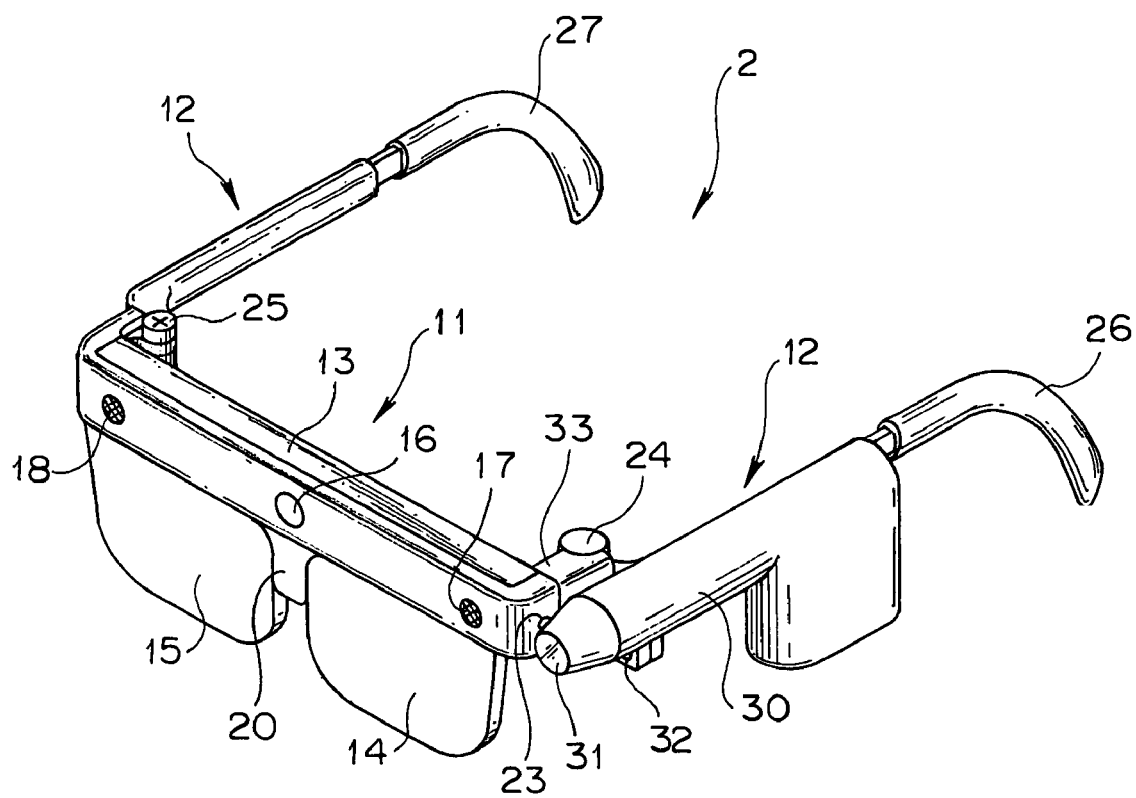
FIG. 5 is a perspective view illustrating the head-mounted camera of the first embodiment.

The contacts 109*a* and 109*b* is connected to the second CPU 112 provided in the controller/recorder 4, as shown in FIG. 12, via the cable connecting terminal 12 shown in FIG. 2 or 4.

Referring back to FIG. 37, a mechanism for adjusting (rotation adjustment) the front portion 11 in the pitch direction with respect to the hinge unit 200 is described below.

The front portion 11 is configured such that an exterior member 196 corresponding to the right side end of FIG. 37 is formed in an angular U shape in the vertical section shown in FIG. 38 along the line parallel with the optical axis of the first photographing optical system 31 when the camera 1 is in use. The upper portion of the exterior member 196 in FIG. 37 is opened. Inside the exterior member 196, a wall 199 shown in FIG. 37 and a wall-shaped spring support member 206 raised from the inner bottom surface of the exterior member 196 shown in FIG. 38 are provided. Then, the end of the hinge unit 200 is inserted into a space formed by the exterior member 196 and the wall 199 from the opening of the U-shaped exterior member 196.

The hinge unit 200 has an exterior member 197, which is a structural member having a space inside, and two shafts 201 and 202 forming adjusting element are fixed to the exterior member 196 so that the end of the hinge unit 200 inserted into the space of the front portion 11 passes through the exterior member 197 in the pupil-distance direction.

The shaft 201 is fixed at both ends to the exterior member 196 of the front portion 11 such that it is inserted into a cylindrical sheath 203 forming the adjusting element. The sheath 203 is fixed at both ends to the exterior member 197 of the hinge unit 200. With this arrangement, the shaft 201 can be relatively rotated with respect to the sheath 203 while being in coaxial with the sheath 203.

Coil springs 204 and 205, which form a part of adjusting element, for generating an urging force to unwind the springs, are attached around the sheath 203. One end of each of the springs 204 and 205 is supported by the spring support member 206, and the other ends of the springs 204 and 205 are supported by the bottom surface of the exterior member 197 of the hinge unit 200. With this arrangement, a rotating force toward the bottom surface of the exterior member 196 of the front portion 11 is applied to the bottom surface of the exterior member 197 of the hinge unit 200 around the shaft 201.

The shaft 202 is fixed at both ends to the exterior member 196 of the front portion 11 and is slidably inserted into a guide hole 207, which forms a part of the adjusting element, punched in the exterior member 197 of the hinge unit 200. The guide hole 207 is formed as an arc-like elongated hole.

The screw 23 is fixed to the outer side of the exterior member 197 of the hinge unit 200 around the shaft 201 via a boss 208. A guide hole 209, which forms a part of the adjusting element, formed as an arc-like elongated hole around the shaft 201 is punched in the exterior member 196 of the front portion 11. The screw 23 is tightly screwed into the boss 208 from the external side of the right surface of the front portion 11 so that it passes through the guide hole 209. The screw 23 is used for fixing the relative rotational position between the front portion 11 and the hinge unit 200.

A screw hole 198 is formed on the bottom surface of the exterior member 196 of the front portion 11, and the screw 22 is screwed into the screw hole 198. The end of the screw 22 abuts against the bottom surface of the exterior member 197 of the hinge unit 200 such that it presses against the exterior member 197.

The operation for adjusting the front portion 11 in the pitch direction with respect to the hinge unit 200, i.e., with respect to the first image pickup device 30 attached to the hinge unit 200 is as follows.

The screw 23 is unscrewed to a degree such that the front portion 11 and the hinge unit 200 can be relatively rotated.

Then, when the screw 22 is screwed, the bottom surface of the hinge unit 200 is rotated upward around the shaft 201 against the urging force of the springs 204 and 205. When the screw 22 is unscrewed, the bottom surface of the hinge unit 200 is rotated downward around the shaft 201 by the urging force of the springs 204 and 205. By rotating the screw 22 in this manner, the position of the front portion 11 in the pitch direction is adjusted to a desired position.

Then, the screw 23 is tightly screwed so that the adjusted position of the front portion 11 can be fixed.

The operation for adjusting the relative tilt between the see-through image display portion 6 and the first image pickup device 30 by using the above-described adjusting mechanism (adjusting element) can be performed in a factory when the camera 1 is manufactured or by the photographer himself/herself using the camera 1. In either case, the adjustment can be conducted in the same manner.

When the adjustment is conducted when the camera 1 is manufactured, it can be performed in the following manner. A bright point light source, for example, is disposed at a position at infinity, and this point light source is photographed by the first image pickup device 30 and is displayed by the see-through image display portion 6 in a see-through manner. Then, the adjustment in the pitch direction is conducted by using the screws 22 and 23 or the adjustment in the yaw direction is conducted by using the bis 32 as described above so that the image of the point light source substantially directly incident on the pupil is overlapped with the electronic image of the point light source observed by the pupil via the second HOE 107. This adjustment may be performed by directly observing the image by a human. Alternatively, a monitor camera may be disposed at the position of the pupil, and the adjustment can be performed based on an image picked up by the monitor camera.

If the photographer himself/herself conducts the adjustment, a suitable subject at a distance can be used for performing the adjustment in a manner similar to the above-described manner.

The subject used for adjustment does not have to be positioned at infinity, and it may be positioned substantially at infinity where the influence of errors can be ignored.

The configuration in which the electrical components of the front portion 11 are electrically connected to the electrical components of the temple 12 (first image pickup device 30) is described with reference to FIGS. 37 through 40.

As shown in FIG. 37, an electrical circuit board 184 disposed on the front portion 11 is electrically connected to one end of a flexible printed board 185. The flexible printed board 185 is disposed from the inside of the front portion 11 to the inside of the hinge unit 200, and the other end of the flexible printed board 185 is connected to a plurality of contacts 187 shown in FIG. 40. The contacts 187 are provided on a wall 195 which is set in the hinge unit 200, and are connected with the flexible printed board 185 by a connecting portion 186.

The bearing 194 provided for the temple 12, which is relatively rotated with respect to the bearing 193 of the front portion 11, is provided with a plurality of conductors 188, which are arc-like coaxial contacts along the peripheral surface in the axial direction. The conductors 188, which are associated with the corresponding contacts 187, are embedded in an insulator, and the surface exposed from the insulator is, for example, gold-plated. The conductors 188 may be gold-plated on the entire surface.

With this configuration, even if the front portion 11 and the temple 12 are relatively rotated, an electrical connection between the contacts 187 and the conductors 188 can be maintained.

The contacts 187 are connected on the peripheral surface of the bearing 194 to one end of a flexible printed board 190 via a connecting portion 189. The other end of the flexible printed board 190 is connected to an electrical circuit board (not shown) within the first image pickup device 30 attached to the temple 12, and is electrically connected to the controller/recorder 4 via the cable 3.

With this configuration, signals for driving the LED drivers 101 and 108 and the LCD driver 105 of the see-through image display portion 6 disposed on the frame 13 are transmitted from the second CPU 112 of the controller/recorder 4, and conversely, audio signals collected from the first microphone 17 and the second microphone 18 of the frame 13 are transmitted to the second CPU 112.

A description is now given, with reference to FIGS. 43A, 43B, and 44, of a second example of the configuration in which the first image pickup device 30 is attached to the side surface of the frame 13 so that the angle of the first image pickup device 30 is adjustable in the pitch direction and in the yaw direction. FIGS. 43A and 43B are a plan view and a right side view, respectively, illustrating the configuration in which the first image pickup device 30 is attached to the frame 30. FIG. 44 is a right side view illustrating the configuration of holes formed in the frame 13 for attaching the first image pickup device 30.

The frame 13 and the temple 12 are connected to each other via a hinge 24A, as shown in FIG. 43A, so that the temple 12 is foldable with respect to the frame 13. The hinge 24A is disposed via a somewhat long joint portion 229 extended from the frame 13 at a position slightly farther away from the front portion 11 than the above-described hinge 24. Unlike the hinge 24, the hinge 24A is not provided with electrical contacts or a flexible printed board.

A base 220, which serves as the adjusting element, formed generally in an L shape when viewed from the front is connected to the side surface of the joint portion 229. The base 220 includes a portion 220a along the side surface of the joint portion 229 and a portion 220b raised from the side surface of the joint portion 229 substantially at right angles.

In the joint portion 229, as shown in FIG. 44, a hole 223, which forms pitch-direction adjusting element, is punched in the forward and an arch-like elongated hole 224, which forms the pitch-direction adjusting element, is punched in the backward. Bises 221 and 222, which form the pitch-direction adjusting element, are screwed into the portion 220a of the base 220 via the holes 223 and 224, respectively, thereby fixing the base 220 to the joint portion 229.

In the portion 220b of the base 220, as shown in FIG. 43A, a hole 227, which forms yaw-direction adjusting element, is punched in the forward, and an arc-like elongated hole 228, which forms the yaw-direction adjusting element, is punched in the backward. As shown in FIG. 43B, bises 225 and 226, which form the yaw-direction adjusting element, are screwed into the bottom surface of the first image pickup device 30 via the holes 227 and 228, respectively, thereby fixing the first image pickup device 30 to the base 220. A cable 230, which is extended from the rear surface of the first image pickup device 30, is folded toward the subject and is connected to the electrical circuits within the frame 13.

With this configuration, the bises 221 and 222 are slightly unscrewed, and in this state, the position of the bis 222 in the elongated hole 224 is changed. Then, the base 220 is rotated around the bis 221, and the angle of the base 220 in the pitch direction and also the angle of the first image pickup device 30 attached to the base 220 in the pitch direction can be adjusted. After adjusting the base 220 and the first image pickup device 30 to desired positions, the bises 221 and 222 are screwed tight.

Similarly, the bises 225 and 226 are slightly unscrewed, and in this state, the position of the bis 226 in the elongated hole 228 is changed. Then, the base 220 is rotated around the bis 225, and the angle of the base 220 in the yaw direction and also the angle of the first image pickup device 30 connected to the base 220 in the yaw direction can be adjusted. After adjusting the base 220 and the first image pickup device 30 to desired positions, the bises 225 and 226 are screwed tight.

According to the second example of the configuration, the angle adjustment in the pitch direction and in the yaw direction between the see-through image display portion 6 and the first image pickup device 30 can be performed. Additionally, since the first image pickup device 30 is fixed to the front portion 11 via the base 220, the image pickup device 30 is not folded with respect to the front portion 11 even if the temple 12 is folded. Thus, the generation of an angular deviation between the first image pickup device 30 and the see-through image display portion 6 is smaller than that in the first example of the configuration shown in FIGS. 37 through 39. Additionally, the adjusting mechanism is simpler than that of the first example, and can be formed less expensively.

In the above-described second example, the relative angle in the yaw direction between the first image pickup device 30 and the base 220 is adjusted, and the relative angle in the pitch direction between the joint portion 229 on the side surface of the frame 13 and the base 220 is adjusted. Conversely, by changing the mounting position of the first image pickup device 30 on the base 220, the relative angle in the pitch direction between the first image pickup device 30 and the base 220 may be adjusted, and by changing the mounting position of the frame 13 on the base 220, the relative angle in the yaw direction between the joint portion 229 on the side surface of the frame 13 and the base 220 may be adjusted.

The operation of the above-described camera 1 is described below with reference to FIGS. 45 and 46. A combination of the flowcharts of FIGS. 45 and 46 indicates the entire operation of the camera 1.

When the camera 1 is powered on or when the system is reset, in step S1, the photographic frame indicating the photographic range corresponding to the standard lens (having a field angle of 50°) is displayed, as shown in FIG. 17, in a see-through manner by the see-through image display portion 6.

Then, in step S2, it is determined whether the temple 12 is opened at the maximum angle by checking whether the contacts 109a and 109b provided on the projection 181 of the temple 12 are closed.

If it is determined in step S2 that the contacts 109a and 109b are not closed, the process proceeds to step S3 in which the alarm information 156 is indicated by the see-through image display portion 6.

If it is determined in step S2 that the contacts 109a and 109b are closed, or after the alarm information 156 is indicated in step S3, the process proceeds to step S4. In step S4, the timer contained in the first CPU 111 is checked to determine whether a predetermined time has elapsed.

If the outcome of step S4 is YES, the process proceeds to step S5 in which the input statuses of various switches, such as the first operation switch 113 shown in FIG. 12 or the second operation switch 131 shown in FIG. 11 are monitored.

The timer used in step S4 restarts counting when the process proceeds to step S5 after the lapse of the predetermined time. In this manner, by checking the input statuses of the switches at regular time intervals while checking the timer, the load on the first CPU 111 can be reduced, and also, the erroneous operations of the switches caused by the chattering can be prevented. The timers used in steps S11, S18, and S23, which are described below, serve the function similar to the function of the timer in step S4.

If it is determined in step S4 that the predetermined time has not elapsed or after step S5, it is determined in step S6 whether the exposure correction has been performed.

If the exposure correction has been performed, the process proceeds to step S7 in which the corrected exposure amount is indicated as the information 152, as shown in FIG. 19.

If it is determined in step S6 that the exposure correction has not been performed or after step S7, the process proceeds to step S8. In step S8, it is determined whether the camera 1 is set in the view mode (V) in which the camera 1 displays the image picked up by the image pickup device 30 in a see-through manner or in the frame mode (F) in which only the photographic frame indicating the photographic range is displayed. The setting of this mode can be performed by the operation of the FIV switch 72, as stated above.

When it is determined in step S8 that the camera 1 is set in the frame mode (F), it is determined in step S9 whether the camera 1 is set in the auto mode (A) or the manual mode (M). The setting of this mode can be performed by the operation of the A/M switch 71, as stated above.

In the auto mode (A), when the focal distance of the first photographing optical system 31 reaches a predetermined value, the image picked up by the image pickup device 30 is automatically enlarged and is displayed in a see-through manner even if the camera 1 is set in the frame mode (F). With this arrangement, in a telephotographing operation, details of a subject can be easily checked without a troublesome operation, and also, when the focal distance is a regular value (less than the above-described predetermined value), only a photographic frame indicating the photographic range is displayed, thereby making the photographer comfortable to perform a photographing operation even for a long time.

In the manual mode (M), a determination as to whether the image is displayed in a see-through manner is manually performed, and normally, only the photographic frames are displayed in the manual mode (M).

If it is determined in step S9 that the manual mode (M) is selected, the process proceeds to step S10 in which the information 155 "MANU" is indicated, as shown in FIG. 22.

Then, in step S11, the timer is checked to determine whether a predetermined time has elapsed.

If the outcome of step S11 is YES, the process proceeds to step S12 in which the distance measurement is conducted to measure the distance from the camera 1 to the subject based on the principle shown in FIG. 27.

Then, in step S13, a value for correcting the parallax caused by a deviation between the range observed by the photographer and the photographic range observed by the image pickup device 30 is calculated based on the subject distance obtained in step S12.

Then, in step S14, the display of the photographic frame is updated based on the corrected parallax calculated in step S13 so that the photographic frame can be displayed at a correct position. According to this process, even when the subject distance is changed, the photographic range can be displayed precisely.

If it is determined in step S9 that the camera 1 is set in the auto mode (A), it is determined in step S15 whether the focal distance is greater than a predetermined value a, i.e., whether the camera 1 is set in the tele mode (T).

If the focal distance is found to be smaller than or equal to the predetermined value a, the process proceeds to step S11. If the focal distance is found to be greater than the predetermined value a, or if it is determined in step S8 that the camera 1 is set in the view mode (V), the process proceeds to step S16. In step S16, the electronic image picked up by the first image pickup device 30 is superimposed on the subject in a see-through manner by the see-through image display portion 6.

After step S16 or step S14, or if it is determined in step S11 that the predetermined time has not elapsed, it is determined in step S17 whether the photographic frame is increased by operating the wide switch 75b of the remote controller 5, and more precisely, whether the visual angle of the photographic frame when viewed from the photographer is increased (when the distance to a virtual image is increased even if the photographic frame displayed as the virtual image is increased, the visual angle does not always become greater, and when the position of the virtual image remains the same, it can be safely said that "the photographic frame is increased").

If it is determined in step S17 that the photographic frame is increased, it is determined in step S18 by checking the timer whether a predetermined time has elapsed.

If it is found in step S18 that the predetermined time has elapsed, it is determined in step S19 whether the focal distance f of the first photographing optical system 31 is further to be decreased even though it has reached the adjustable lower limit k1.

If the outcome of step S19 is YES, the process proceeds to step S20 in which the alarm information 157 is indicated, as shown in FIG. 24.

If the focal distance f has not reached the lower limit k1, the process proceeds to step S21 in which the variator lens 82 of the first photographing optical system 31 is driven to decrease the focal distance f so that the photographic range set by the photographer can be implemented.

If it is determined in step S17 that the photographic frame is not increased, it is determined in step S22 whether the photographic frame is decreased, and more precisely, whether the visual angle of the photographic frame when viewed from the photographer is decreased.

If the result of step S22 is YES, it is determined in step S23 by checking the timer whether a predetermined time has elapsed.

If the predetermined time has elapsed, it is determined in step S24 whether the focal distance f of the first photographing optical system 31 is further to be increased even though it has reached the adjustable upper limit k2.

If the focal distance f has not reached the upper limit k2, the process proceeds to step S25 in which the variator lens 82 of the first photographing optical system 31 is driven to increase the focal distance f so that the photographic range set by the photographer can be implemented. If it is found in step S24 that the focal distance f is further to be increased, the process proceeds to step S26 in which the alarm information 158 is indicated, as shown in FIG. 25.

If it is determined in step S22 that the photographic frame is not decreased, or if it is determined in step S18 or S23 that the predetermined time has not elapsed, or after step S20, S21, S25, or S26, it is determined in step S27 whether the record mode is set by operating the record switch 74 contained in the second operation switch 131 of the remote controller 5 (or the first operation switch 113).

If the record mode is set, the process proceeds to step S28 in which the information 154 "REC" is indicated in a see-through manner, as shown in FIG. 21, and in step S29, the recording operation is started.

After step S29 or if it is determined in step S27 that the record mode is not set, it is determined in step S30 whether a still-image photographing operation is performed by the release switch 73 contained in the second operation switch 131 of the remote controller 5 (or the first operation switch 113).

If the outcome of step S30 is YES, the process proceeds to step S31 in which a still image is recorded. Then, in step S32, the information 159 "REL" indicating that a still image has been recorded is displayed in a see-through manner, as shown in FIG. 26.

After step S32 or if it is found in step S30 that the still-image photographing operation by using the release switch 73 is not performed, the process returns to step S4, and the above-described operation is repeated.

Figure 45:
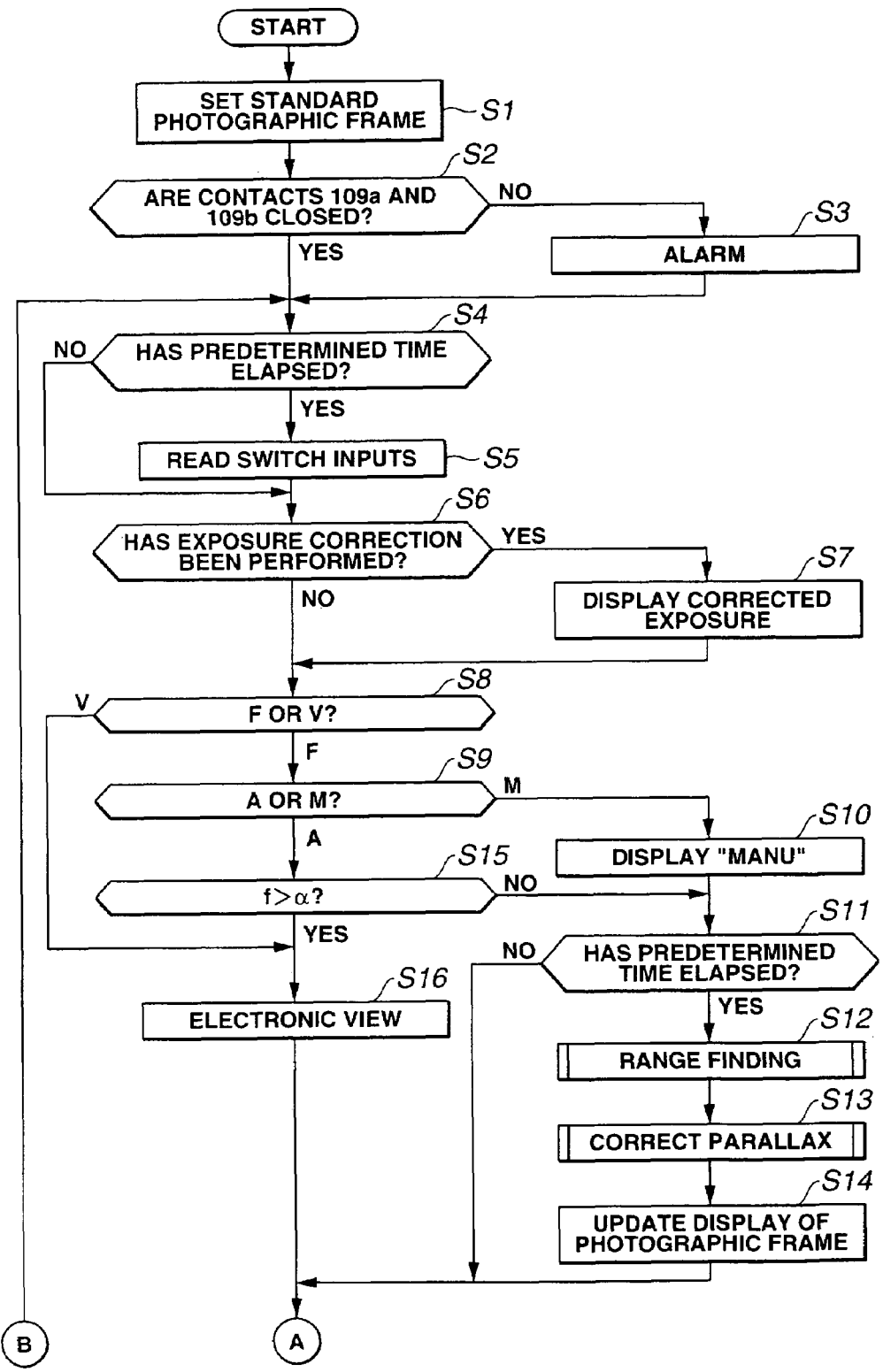
FIGS. 45 and 46 are flowcharts illustrating a part and another part of the operation of the camera of the first embodiment.
Figure 46:
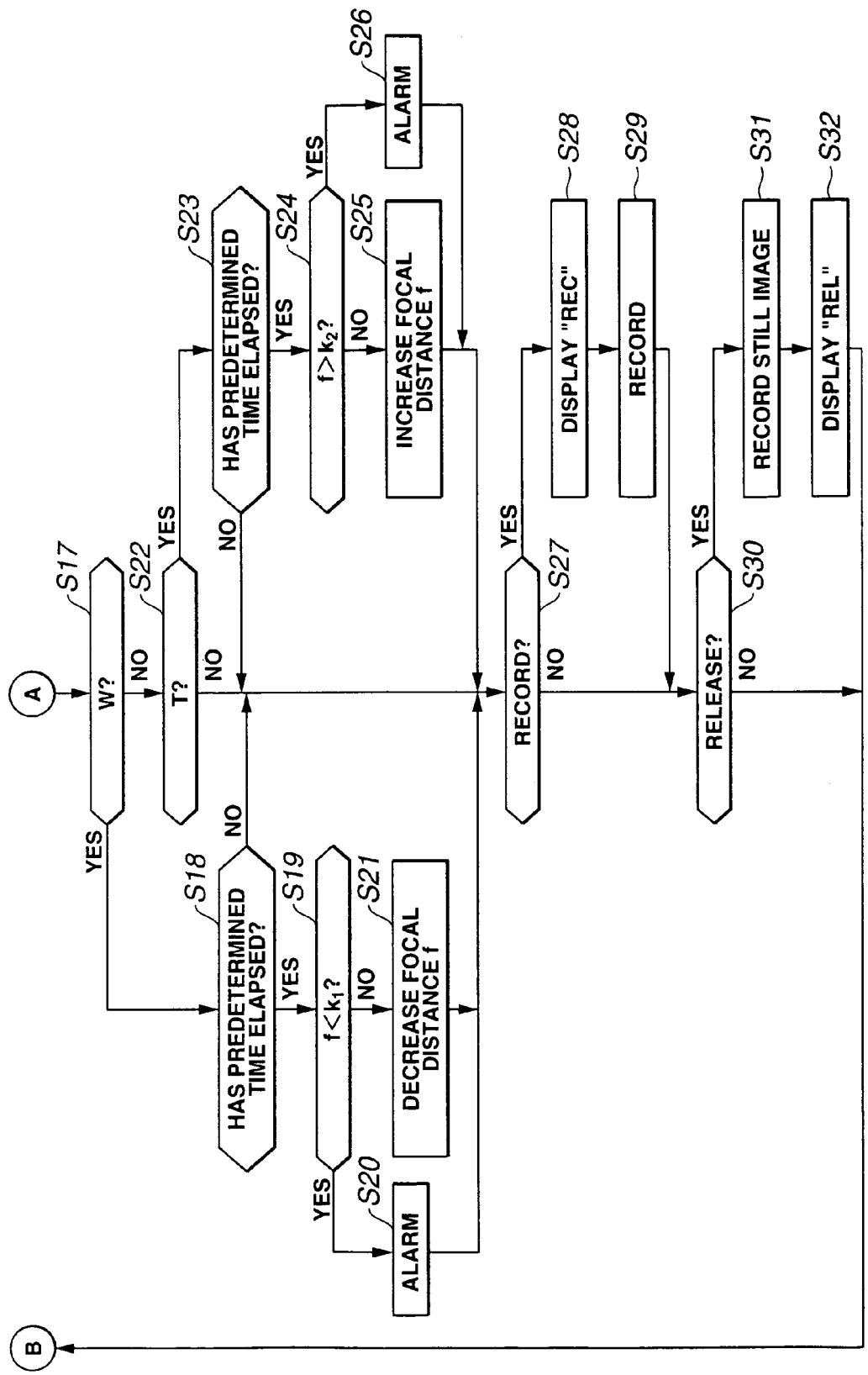

If the position of the virtual image is changed as described with reference to FIGS. 31 and 32, the flowcharts of FIGS. 45 and 46 are changed as follows.

That is, in this case, before displaying a photographic frame, three steps (1) through (3) are executed, which are not contained in the flowcharts of FIGS. 45 and 46:

(1) measure (distance measurement) the distance Li to the subject;

(2) determine L1 and X1 by substituting the subject distance Li calculated in step (1) into equation (11) and equation (12), and drive the actuator 162 so that the photographic frame is set at the determined position Li; and (3) drive the LCD 104 by the LCD driver 105 to satisfy the diagonal line X1 calculated in step (2) and adjust the size of the photographic frame.

More specifically, steps (1) through (3) are executed before steps S1 and S14 of the flowchart in FIG. 45. For step S14, however, distance measurement is executed in step S12 before S14, and thus, the value calculated in step S12 can be used instead of executing distance measurement in step (1).

If the position of the virtual image is changed by the configuration shown in FIG. 33, processing similar to the above-described processing can be performed.

According to the first embodiment, even if the focal distance (zoom magnification) of the first photographing optical system is changed, the photographer can easily check the photographic range while substantially directly observing the subject to be photographed. Thus, the photographer can behave as naturally as other people without feeling bothered by the photographing operation.

The photographer can set the focal distance of the photographic lens after checking a photographic range and a pattern to be set while substantially directly observing the entire subject. This allows the photographer to set a pattern more easily compared to the related art in which the pattern should be checked while changing the focal distance. It is thus possible to provide an ergonomically new head-mounted camera which implements a photographing operation with a new concept, which is different from a known photographing operation in which a zoom operation and the field angle setting are performed at the same time.

Since the head-mounted unit, the remote controller, and the controller/recorder are separately provided, the head-mounted unit and the remote controller, which serve as a photographing operation unit, become lighter. This makes the photographer comfortable even over a long use of the camera. By using a HOE as display element, the head-mounted unit can further be lighter and smaller.

When the visual angle of the photographic frame is to be further increased even though it has reached the upper limit of the field angle of the first image pickup device and when the visual angle of the photographic frame is to be further decreased even though it has reached the lower limit of the field angle of the first image pickup device, alarm information is indicated. This allows the photographer to easily check the adjustable field angle, and the photographer does not have to repeat unnecessary operations by wrongly recognizing such situation as failures. Since the alarm information is indicated by the see-through image display portion, the provision of separate alarm element is not necessary, thereby reducing the cost and the size of the head-mounted unit.

The parallax caused by a deviation between the range within the photographic frame observed by the photographer and the photographic range picked up by the first image pickup device is corrected based on the distance to the subject measured by distance-measurement element. Thus, even if the subject distance is changed, in particular, even when close-up photographing is performed, the photographic range can be precisely identified.

Additionally, the frame mode in which the photographic frame is displayed as a virtual image or the view mode in which the photographed image is displayed as a virtual image can be switched. Accordingly, even if the photographic range becomes smaller during a telephotographing operation, details of a subject can be easily checked. In particular, in the auto mode, in a telephotographing operation having a focal distance exceeding a predetermined value, the photographed image is automatically displayed, and thus, the photographer can check details of the subject without a troublesome operation.

When the head-mounted unit is not in use, the temples can be folded along the front portion, and thus, the head-mounted unit can be stored easily.

In the configuration in which the first image pickup device can be folded together with the temples, the head-mounted unit can be more easily stored. When the temples are not opened at a predetermined angle, alarm information is given. This prevents the photographer from performing a photographing operation without realizing that the optical axis and the visual axis do not coincide with each other. In other words, the photographing operation can be performed such that the optical axis and the visual axis are exactly the same. Since the alarm information is given by the see-through image display portion, the provision of separate alarm element is not necessary, thereby reducing the cost and the size of the head-mounted unit.

In the configuration in which both the first image pickup device and the see-through image display portion are provided in the front portion, the optical axis of the first image pickup device is not changed by opening or closing the temples. Accordingly, once the optical axis and the visual axis are adjusted, a deviation therebetween is not generated.

When the first image pickup device is attached to the front portion via the base, the optical axis can be adjusted finely by using the base.

An image signal is digitized before being output from the first image pickup device, and thus, when the image signal is transmitted to the controller/recorder, which is separately disposed from the first image pickup device, the influence of external noise can be reduced.

Since an image signal output from the first image pickup device is raw image data, the provision of a digital signal processing circuit for the first image pickup device is not necessary, thereby making the head-mounted unit lighter and smaller.

An adjusting mechanism for finely adjusting the optical axis to coincide with the visual axis is provided. With this adjusting mechanism, individual units can be adjusted when they are manufactured, or the units can be adjusted by the individual users. Thus, the head-mounted unit can deal with wide usage modes. By providing this adjusting mechanism on the base, an inexpensive adjusting mechanism with very little deviation can be formed.

Adjustment can be performed independently in the pitch direction and in the yaw direction, thereby making it possible to adjust a positional deviation between the optical axis and the visual axis.

By changing the distance from the photographer's pupil to a virtual image, the virtual image can be superimposed on a subject, thereby allowing the photographer to clearly observe both the virtual image and the subject. In this case, even when the position of the virtual image is changed, the visual angle concerning the virtual image is adjusted to be constant. Thus, the photographic range and the photographic frame always coincide with each other.

Distance measurement is performed to measure the distance to a subject, and based on this distance, the position of the virtual image is automatically adjusted by using an actuator. Thus, the subject and the virtual image can be clearly observed at the same time without the need to perform an extra operation.

The central position of a virtual image to be projected can be adjusted in the pupil-distance direction. Thus, according to the different position of the pupil of each photographer, required information can be given to the photographer. To implement the adjustment in the pupil-distance direction, a reflective member for reflecting light to be output in the pupil-distance direction is moved in the pupil-distance direction. Accordingly, the adjustment can be conducted without changing the external appearance of the head-mounted unit. This adjustment can be automated by using an actuator, or fine-adjustment can be performed by counting pulses. If the adjustment is performed manually, the configuration is simplified and the cost can be reduced without causing a troublesome operation.

Second Embodiment

Figure 47:
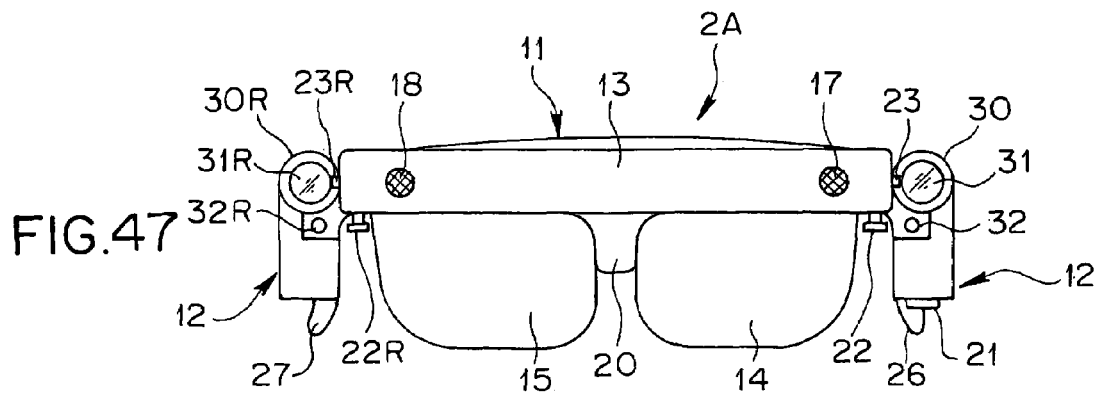
FIG. 47 is a front view illustrating a head-mounted unit of the camera constructed in accordance with a second embodiment of the present invention.
Figure 48:
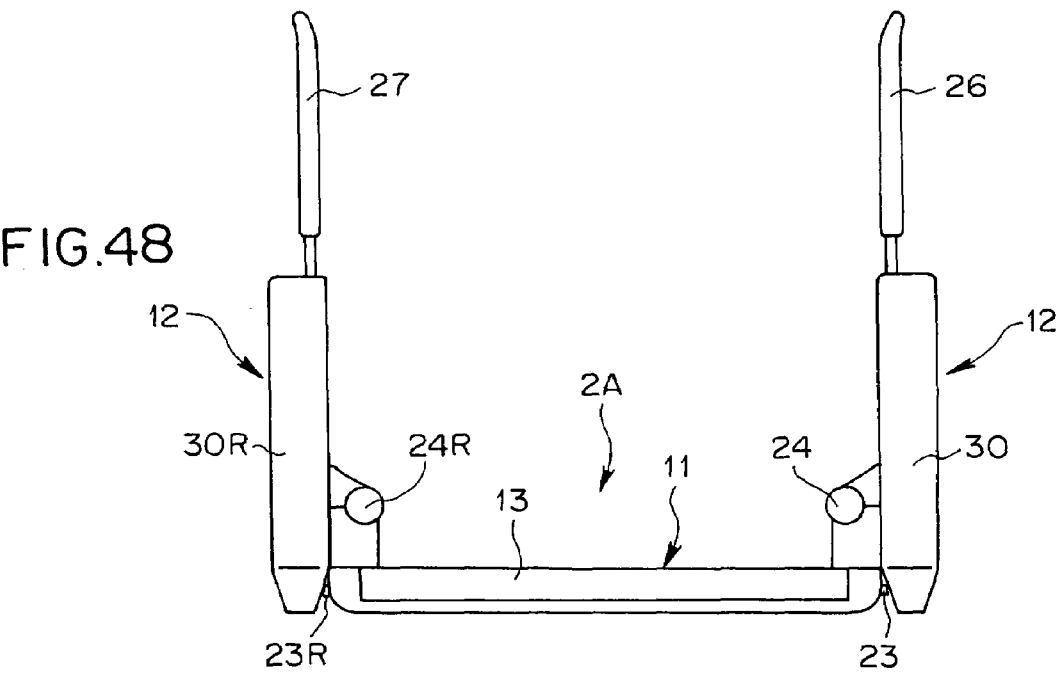
FIG. 48 is a plan view illustrating the head-mounted unit of the camera of the second embodiment.
Figure 49:
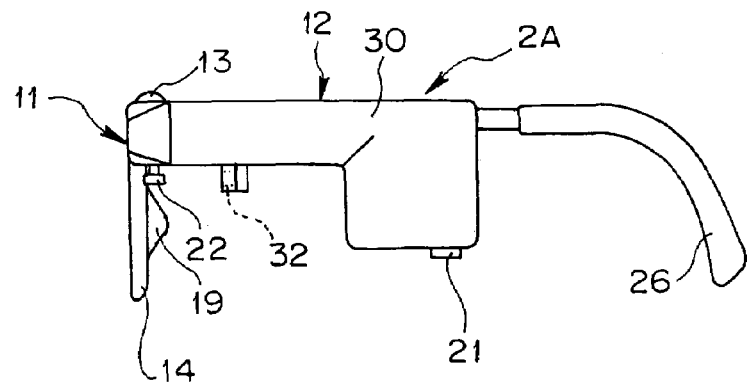
FIG. 49 is a right side view illustrating the head-mounted unit of the camera of the second embodiment.
Figure 50:
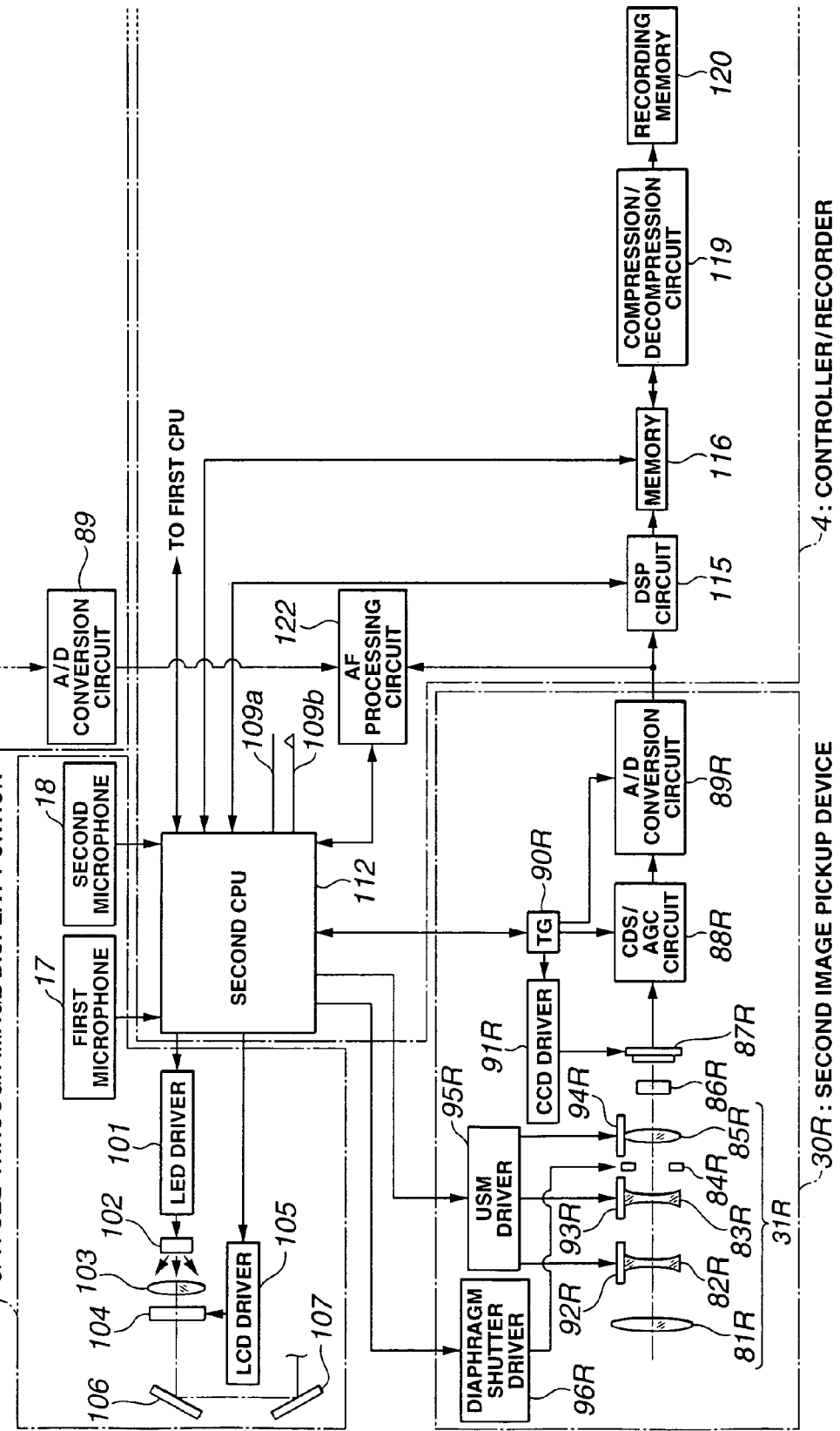
FIG. 50 is a block diagram illustrating the configuration of an electronic circuit of the head-mounted camera of the second embodiment, mainly the elements different from those shown in FIG. 12.

A second embodiment of the present invention is described below with reference to FIGS. 47 through 50. FIGS. 47, 48, and 49 are a front view, a plan view, and a right side view, respectively, illustrating a head-mounted unit 2A. FIG. 50 is a block diagram illustrating the configuration of an electronic circuit of the camera, mainly the elements different from those shown in FIG. 12.

In the second embodiment, elements similar to those described in the first embodiment are designated with the same reference numerals, and a detailed explanation is thus omitted.

In a head-mounted camera, the image pickup device is disposed on each of the left and right temples 12 so that a three-dimensional image observed with the two eyes can be picked up and recorded. In the first embodiment, the first image pickup device 30 is disposed on the left-eye temple 12. In the second embodiment, however, in addition to the first image pickup device 30, a second image pickup device 30R, which is configured similar to the first image pickup device 30, is disposed on the right-eye temple 12.

In the head-mounted unit 2A in the second embodiment, as shown in FIGS. 47 through 49, the second image pickup device 30R provided with a second photographing optical system 31R is disposed on the right-eye temple 12, and the temple 12 is foldable with respect to the front portion 11 by a hinge 24R, which is configured similarly to the hinge 24 at the left eye, except that the hinge 24R is horizontally symmetrical with the hinge 24. On the head-mounted unit 2A, an adjusting mechanism (adjusting element) for adjusting the angle in the pitch direction and in the yaw direction between the second image pickup device 30R and the see-through image display portion 6 is disposed. Screws 22R and 23R and a bis 32R contained in the angle adjusting mechanism are exposed, as shown in FIG. 47, so that they are adjustable.

In the camera using the head-mounted unit 2A, the subject distance is measured by triangular distance measurement performed using the left and right image pickup devices 30 and 30R, and thus, the projector light-emitting portion 16 disposed in the first embodiment is not provided.

The circuit within the second image pickup device 30R is connected to the circuit within the first image pickup device 30 via the frame 13, and the cable connecting terminal 21 to be connected to the head-mounted unit 2A is provided only for the first image pickup device 30. Accordingly, control signals transmitted from the controller/recorder 4 to the second image pickup device 30R and image signals transmitted from the second image pickup device 30R to the controller/recorder 4 are transmitted via the cable 3.

The configuration of the camera including the second image pickup device 30R is shown in FIG. 50.

The second image pickup device 30R includes the following elements. A second photographing optical system 31R forms an optical subject image. A low-pass filter 86R removes unnecessary high-frequency components from light passing through the second photographing optical system 31R. A CCD 87R converts the optical subject image formed by the second photographing optical system 31R via the low-pass filter 86R into an electric signal and outputs it. A CDS/AGC circuit 88R, which serves as signal processing element for performing processing, such as removing noise and amplification, on the signal output from the CCD 87R. An A/D conversion circuit 89R, which serves as signal processing element, converts the analog image signal output from the CDS/AGC circuit 88R into a digital image signal. A CCD driver 91R controls the driving of the CCD 87R. A timing generator 90R supplies timing control signals to the CDS/AGC circuit 88R, the A/D conversion circuit 89R, and the CCD driver 91R. A diaphragm shutter driver 96R, which serves as a drive circuit, controls the driving of a diaphragm shutter 84R, which is described below, contained in the second photographing optical system 31R. A USM driver 95R, which serves as a drive circuit, selectively drives USMs (Ultra Sonic Motor) 92R, 93R, and 94R, which are described below, contained in the second photographing optical system 31R.

More specifically, the second photographing optical system 31R includes a front lens 81R, a variator lens 82R for changing the focal distance, a compensator lens 83R for correcting a deviation of the focus position in accordance with a change in the focal distance, a diaphragm shutter 84R serving as both a diaphragm function and a shutter function, a focus lens 85R for adjusting the focus, and the USMs 92R, 93R, and 94R for driving the variator lens 82R, the compensator lens 83R, and the focus lens 85R, respectively.

The timing generator 90R, the USM driver 95R, and the diaphragm shutter driver 96R are controlled by the second CPU 112 of the controller/recorder 4.

The digital image data output from the A/D conversion circuit 89R of the second image pickup device 30R is input into the DSP circuit 115 of the controller/recorder 4 and is also input into the AF processing circuit 122 of the controller/recorder 4.

That is, the digital image data from the first image pickup device 30 and the digital image data from the second image pickup device 30R are input into the AF processing circuit 122. The AF processing circuit 122 calculates the distance to the subject based on the two image data having a parallax by using, for example, the known triangular distance measurement principle.

Accordingly, in a see-through image display portion 6A of this camera, the LED driver 108, the projector LED 16a, and the condenser lens 16b provided for the see-through image display portion 6 are not disposed.

The other features of the configuration, the operation, and the adjusting method are similar to those of the first embodiment, and an explanation thereof is thus omitted.

According to the second embodiment, advantages similar to those obtained by the first embodiment can be achieved. Additionally, the same subject can be picked up by the first image pickup device 30 and the second image pickup device 30R so that three-dimensional image can be recorded.

Third Embodiment

Figure 51:
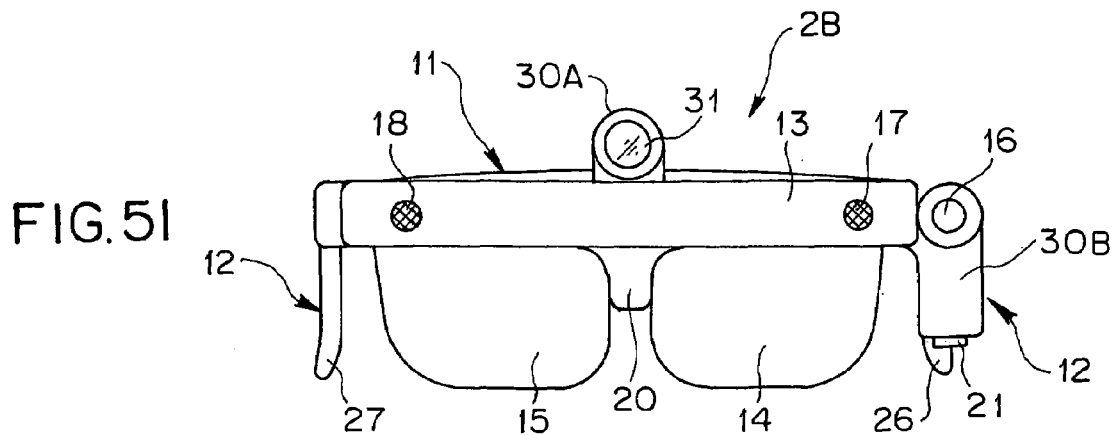
FIG. 51 is a front view illustrating a head-mounted unit of the camera constructed in accordance with a third embodiment of the present invention.
Figure 52:
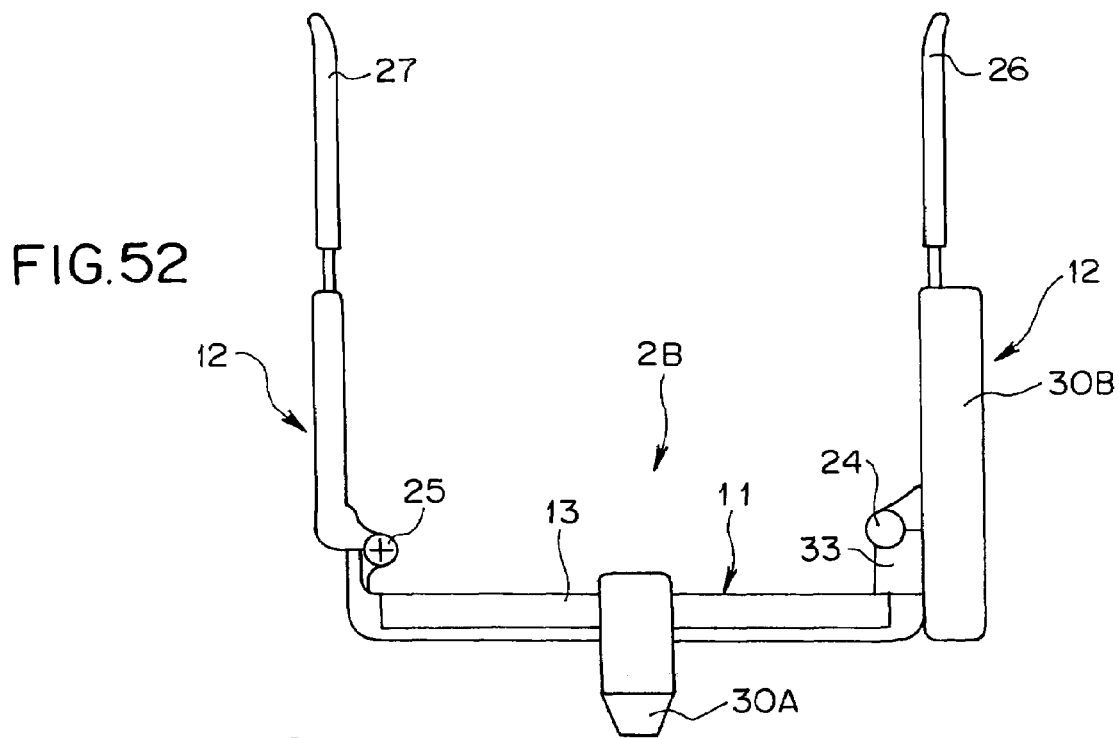
FIG. 52 is a plan view illustrating the head-mounted unit of the camera of the third embodiment.
Figure 53:
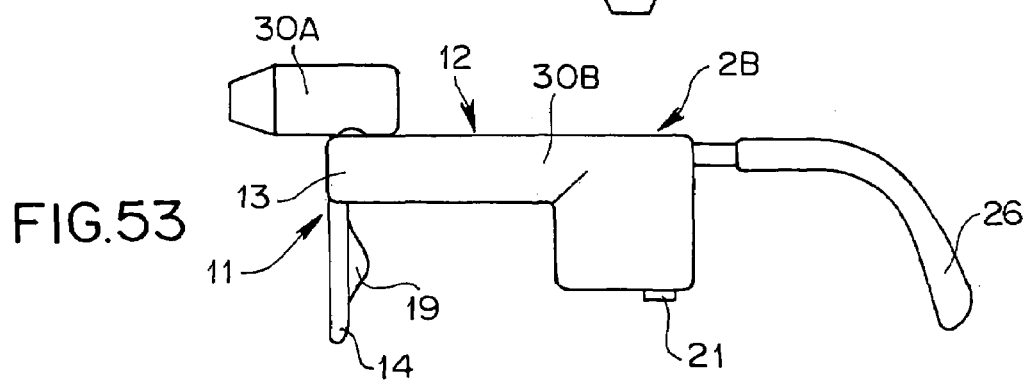
FIG. 53 is a right side view illustrating the head-mounted unit of the camera of the third embodiment.

A third embodiment of the present invention is described below in detail with reference to FIGS. 51 through 53. FIGS. 51 through 53 are a front view, a plan view, and a right side view, respectively, illustrating a head-mounted unit 2B. In the third embodiment, elements similar to those of the first and second embodiments are designated with the same reference numerals, and an explanation thereof is thus omitted.

In the head-mounted unit 2B of the camera of the third embodiment, the first image pickup device 30 is divided into a camera portion 30A and a camera circuit 30B, and the camera portion 30A is disposed at, for example, the central portion between the left and right eyes of the frame 13.

That is, in the upper central portion of the frame 13, elements required for generating an electronic image from an optical image, such as the first photographing optical system 31, the low-pass filter 86, and the CCD 87, are mounted.

In the left-eye temple 12, the camera circuit 30B, including elements, such as the CDS/AGC circuit 88, the A/D conversion circuit 89, the timing generator 90, the CCD driver 91, the USM driver 95, and the diaphragm shutter driver 96, for controlling the camera portion 30A or processing image signals output from the camera portion 30A are disposed.

In accordance with the provision of the camera portion 30A at the central portion of the frame 13, the projector light-emitting portion 16 used for measuring the subject distance by using the triangular distance measurement is provided in the camera circuit 30B at the side of the subject.

The other features of the configuration and the operation are similar to those of the first embodiment.

According to the third embodiment, advantages similar to those obtained by the first embodiment are achieved. Additionally, since the camera portion 30A including the photographing optical system is disposed at the central portion between the left and right eyes of the frame 13, the horizontal parallax between the observation range and the image pickup range can be significantly reduced. The see-through image display portion 6 and the camera portion 30A of the first image pickup device 30 can be integrally provided in the front portion 11. Thus, once the difference between the visual angle and the optical angle of the first photographing optical system 31 is adjusted, it is not generated.

Fourth Embodiment

Figure 54:
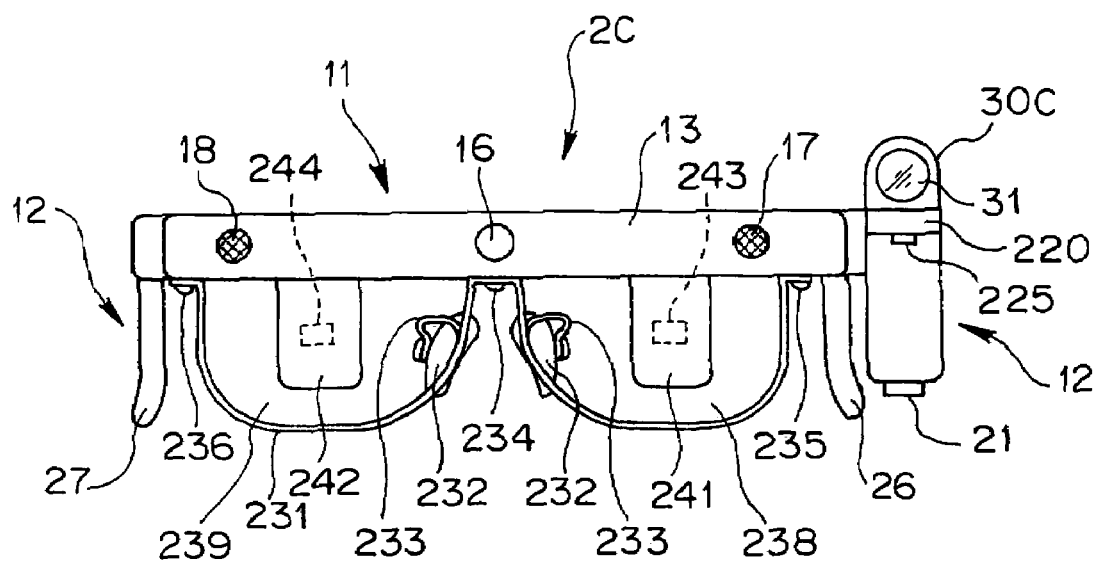
FIG. 54 is a front view illustrating a head-mounted unit of the camera constructed in accordance with a fourth embodiment of the present invention.
Figure 55:
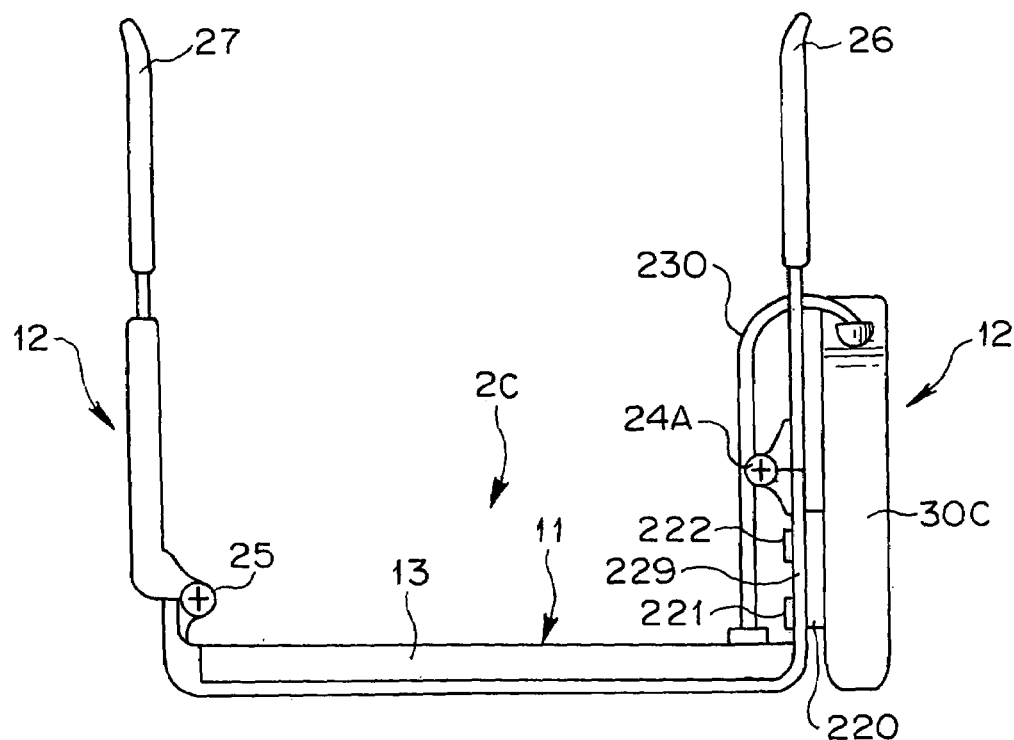
FIG. 55 is a plan view illustrating the head-mounted unit of the camera of the fourth embodiment.
Figure 56:
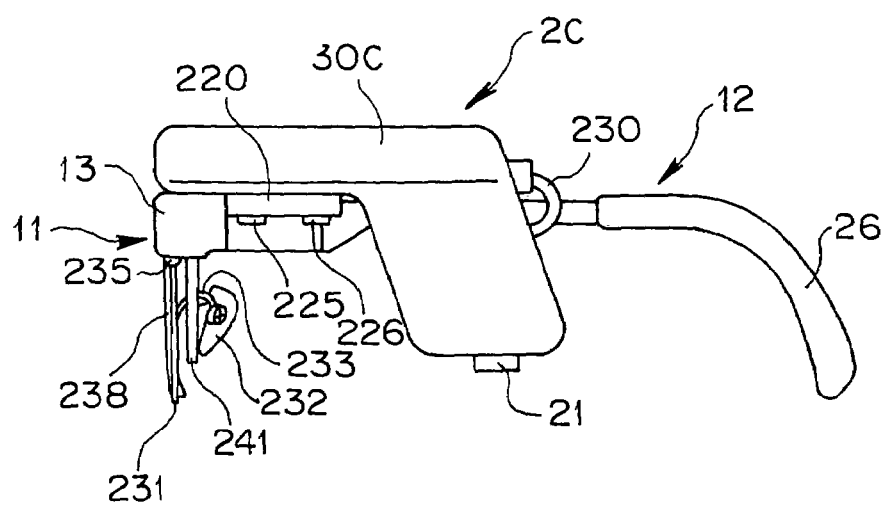
FIG. 56 is a right side view illustrating the head-mounted unit of the camera of the fourth embodiment.

A fourth embodiment of the present invention is described in detail below with reference to FIGS. 54 through 56. FIGS. 54, 55, and 56 are a front view, a plan view, and a right side view, respectively, illustrating a head-mounted unit. In the fourth embodiment, elements similar to those of the first, second, and third embodiments are designated with the same reference numerals, and an explanation thereof is thus omitted.

In the head-mounted unit 2C of the fourth embodiment, eyesight-correcting lenses are attached to the frame 13, which serves as support element. Also, a first image pickup device 30C, which serves as image pickup element, corresponding to the first image pickup device 30, is fixed on the frame 13 via the base 220, such as that shown in FIGS. 43A and 43B, so that it is adjustable. That is, the head-mounted camera 2C is a head-mounted camera with eyesight-correcting lens. In other words, the head-mounted camera 2C is a display device with eyesight-correcting lens in terms of an image display function.

Since the eyesight varies depending on the individuals, it is important to provide an eyesight-correcting function.

Accordingly, it is possible that an eyesight-correcting function is provided on the transparent optical members 14 and 15 for guiding light to the second HOE 107. In this configuration, however, since the transparent optical members 14 and 15 bend, the aberration is generated in images that can be observed by the second HOE 107. As stated above, since the eyesight varies depending on the individuals, it is impossible to correct all the aberration levels caused by the adjustment of the eyesight.

Then, in the fourth embodiment, as shown in FIG. 54, second HOEs 243 and 244 corresponding to the second HOE 107 and transparent optical members 241 and 242 corresponding to the transparent optical members 14 and 15 are formed to a minimal size. Additionally, an eyesight-correcting lens 238 is attached to the second HOE 243 and the transparent optical member 241 at the side of the subject, and an eyesight-correcting lens 239 is attached to the second HOE 244 and the transparent optical member 242 at the side of the subject. As the eyesight-correcting lenses 238 and 239, regular spectacle lenses may be used, and less expensive lenses may be formed.

A rim 231, which is fixing element for fixing the lenses 238 and 239, is attached to the frame 13 with a bis 234 at the central portion, a bis 235 at the left-eye side, and a bis 236 at the right-eye side.

A pair of nose pads 232 for supporting the ridge of the nose is provided for the rim 231 via a pair of cringles 233.

With this configuration, the bises 234, 235, and 236 can be unscrewed to easily remove the rim 231 and the lenses 238 and 239. The lenses 238 and 239 can be replaced by a new pair having different eyesight, and the new pair can be fixed.

The first image pickup device 30C of the fourth embodiment is attached to the joint portion 229 on the side surface of the frame 13 via the base 220 similar to that shown in FIGS. 43A and 43B (and FIG. 44). In this case, the relative position in the pitch direction and in the yaw direction between the first image pickup device 30C and the see-through image display portion 6 can be adjusted.

As in the first image pickup device 30 shown in FIG. 43A, the cable 230 is extended at the rear surface of the first image pickup device 30C, and is embedded in the left-eye temple 12 and is further connected to the circuit substrate in the frame 13.

Although in this embodiment the eyesight-correcting lenses 238 and 239 are disposed on the transparent optical members 241 and 242 at the side of the subject, they may be disposed on the rear surface (at the side of the eyes) of the transparent optical members 241 and 242.

If the rim 231 is formed of a material having a predetermined level of elasticity, only the left-eye lens 238 can be selectively (independently) detached by unscrewing or loosening the bis 235. Similarly, the right-eye lens 239 can be selectively (independently) detached by unscrewing or loosening the bis 236.

According to the fourth embodiment, advantages similar to those obtained by the first through third embodiments can be achieved. Additionally, since the eyesight-correcting lenses are disposed on the front surfaces of the transparent optical members, photographers having different eyesight levels can observe a predetermined image superimposed on a subject which is substantially directly observed (in this case, observed via the eyesight-correcting lenses).

A natural spectacle-type camera having aesthetically pleasant-looking appearance can be formed with a simple configuration.

Since the eyesight-correcting lenses can be easily removed separately from the transparent optical members, the eyesight correction can be easily performed depending on the user. Even if the eyesight of the left eye is different from the eyesight of the right eye, lenses having different eyesight can be fixed.

Additionally, the transparent optical members and the first image pickup device are integrally held by the frame. Accordingly, even if eyesight-correcting lenses are replaced by a new pair, the angle adjustment between the transparent optical member and the first image pickup device is not required. It is thus possible to provide an easy-to-use head-mounted camera with eyesight-correcting lenses.

In the foregoing embodiments, the technical concept of the present invention is applied to head-mounted cameras (image pickup devices). However, the technical concept of the present invention can be applied to head-mounted display devices displaying multi-purpose information.

Although in the foregoing embodiments HOEs are used as optical elements, convex lenses, concave lenses, half mirrors, and free-form optical elements formed of glass or plastics, or a combination thereof may be used.

As the projection element, the LED 102, the condenser lens 103, and the LCD 104 are used. However, other display devices, such as an electro-luminescence (EL) panel or a self-luminous plasma display, may be used.

When the visual angle of the photographic frame is changed, the focal distance of the photographing optical system is changed. However, instead of the optical zoom, an electronic zoom may be used, or a combination of the optical zoom and the electronic zoom may be used.

In the foregoing embodiment, as display examples, the photographic frames and the photographed images are used. Instead, the present invention may be used in an information display device (monitor) for, for example, a personal computer, and characters can be displayed on the monitor. In this case, the PC connecting terminal 51 is connected to a PC, and information or images from the PC can be displayed. In the above-described embodiments, the AV/S connecting terminal 50 for outputting signals to television sets is provided. Alternatively, an input terminal for inputting video signals from a video player or a DVD player may be disposed so that video images can be viewed. As described above, the head-mounted camera can serve as a head-mounted display device in terms of the image display function. This head-mounted display device is used, not only as a finder in an image pickup device, but also as a device for viewing video images or as a portable multi-purpose information display device.

[Appended Portions]

According to the foregoing embodiments of the present invention, the following configurations can be implemented.

[Appended Portion A1]

A head-mounted camera comprising:

image pickup element including a photographing optical system in which a focal distance is changeable and an image pickup element for converting an optical subject image formed by the photographing optical system into an electric image signal;

display element for displaying a photographic frame indicating a photographic range as a virtual image so that the photographic frame is superimposed on a subject substantially directly observed by a photographer;

photographic-frame setting element for setting a visual angle of the photographic frame displayed by the display element as the virtual image and observed from the photographer; and focal-distance setting element for setting the focal distance of the photographing optical system so that the visual angle of the photographic frame set by the photographic-frame setting element coincides with a field angle of the image pickup element.

[Appended Portion A2]

The head-mounted camera according to appended portion A1, further comprising:

alarm element for giving an alarm at least one of occasions when the visual angle of the photographic frame set by the photographic-frame setting element is to be further increased even though the field angle of the image pickup element has reached a maximum value and when the visual angle of the photographic frame is to be further decreased even though the field angle of the image pickup element has reached a minimum value.

[Appended Portion A3]

The head-mounted camera according to appended portion A2, wherein the alarm element gives an alarm by displaying information concerning the alarm on the display element.

[Appended Portion A4]

The head-mounted camera according to appended portion A1, wherein the display element comprises a holographic optical element disposed on a visual axis when the photographer observes a subject, and projection element for projecting the photographic frame on the holographic optical element.

[Appended Portion A5]

The head-mounted camera according to appended portion A1, further comprising:

distance-measurement element for finding a distance to the subject, wherein the display element comprises correction element for correcting a parallax, which is a deviation between the range within the photographic frame observed by the photographer and a photographing range observed by the image pickup element, based on the distance to the subject found by the distance-measurement element.

[Appended Portion A6]

The head-mounted camera according to appended portion A1, further comprising:

switching element for switching between the photographic frame and a photographed image corresponding to the electric image signal obtained by the image pickup element so that the selected photographic frame or the photographed image is displayed by the display element as a virtual image.

[Appended Portion A7]

The head-mounted camera according to appended portion A6, wherein the switching element automatically controls the photographed image to be displayed as a virtual image when the focal distance of the photographing optical system is greater than or equal to a predetermined value.

[Appended Portion A8]

The head-mounted camera according to appended portion A1, further comprising:

a head-mounted unit to be mounted on the head of the photographer, including a front portion positioned at the front side of the head and temples positioned at the lateral sides of the head, wherein the display element is disposed on the front portion.

[Appended Portion A9]

The head-mounted camera according to appended portion A8, wherein the temples are foldable with respect to the front portion, and the temples are folded along the front portion when the head-mounted unit is not in use.

[Appended Portion A10]
The head-mounted camera according to appended portion A8, wherein the image pickup element is disposed on the front portion.

[Appended Portion A11]
The head-mounted camera according to appended portion A10, wherein the image pickup element is disposed on the front portion at a position corresponding to a portion between the left and right eyes of the photographer.

[Appended Portion A12]
The head-mounted camera according to appended portion A8, wherein the image pickup element is disposed on at least one of the temples.

[Appended Portion A13]
The head-mounted camera according to appended portion A12, wherein the temples are foldable with respect to the front portion, and the temples are folded along the front portion when the head-mounted unit is not in use.

[Appended Portion A14]
The head-mounted camera according to appended portion A13, further comprising:
alarm element for giving an alarm when the temples are not located at a predetermined foldable position when the head-mounted unit is in use.

[Appended Portion A15]
The head-mounted camera according to appended portion A14, wherein the alarm element gives an alarm by displaying information concerning the alarm on the display element.

[Appended Portion A16]
The head-mounted camera according to appended portion A8, wherein the head-mounted unit comprises the image pickup element, the head-mounted camera further comprising:
a remote controller, separately disposed from the head-mounted unit, for communicating with the head-mounted unit to control an operation of the head-mounted unit; and
a main body, separately disposed from the head-mounted unit, for communicating with the head-mounted unit to receive an image picked up by the image pickup element, the main body including recording element for recording the received image.

[Appended Portion B1]
A head-mounted camera comprising:
a head-mounted unit being mounted on a head, including image pickup element for performing image capturing to generate an analog image signal, and display element for displaying information; and
a controller/recorder for controlling the display element and the image pickup element and also for recording the image signal generated by the image pickup element; and
connecting element for electrically connecting the head-mounted unit and the controller/recorder,
wherein the head-mounted unit comprises signal processing element for processing the analog image signal generated by the image pickup element and also for converting the analog image signal into a digital image signal, and
the digital image signal output from the signal processing element is transmitted to the controller/recorder via the connecting element.

[Appended Portion B2]
The head-mounted camera according to appended portion B1, wherein the digital image signal output from the signal processing element and transmitted to the controller/recorder via the connecting element is raw image data which is not subjected to other signal processing after being converted from the analog image signal to the digital image signal by the signal processing element.

[Appended Portion B3]
The head-mounted camera according to appended portion B1, wherein the display element displays a photographic frame indicating a photographic range so that the photographic frame is superimposed on a subject substantially directly observed by a photographer, and
the image pickup element includes a photographing optical system in which a focal distance is changeable and an image pickup element for converting a subject image formed by the photographing optical system into the analog image signal, the image pickup element performing photographing after automatically setting the focal distance of the photographing optical system so that a field angle of the image pickup element coincides with a visual angle of the photographic frame displayed by the display element and viewed from the photographer.

[Appended Portion C1]
An adjusting device for a head-mounted camera, comprising:
image pickup element for picking up an image of a subject;
display element being integrally formed with the image pickup element, for displaying a photographic frame indicating a photographic range so that the photographic frame is superimposed on a subject substantially directly observed by a photographer; and
adjusting element for adjusting a relative angle between the image pickup element and the display element so that an optical axis of the image pickup element and a visual axis passing through the center of the photographic frame displayed by the display element are parallel with each other.

[Appended Portion C2]
The adjusting device for the head-mounted camera according to appended portion C1, wherein the adjusting element comprises yaw-direction adjusting element for adjusting a relative deviation in the yaw direction between the optical axis of the image pickup element and the visual axis passing through the center of the photographic frame displayed by the display element, and pitch-direction adjusting element for adjusting a relative deviation in the pitch direction between the optical axis of the image pickup element and the visual axis passing through the center of the photographic frame displayed by the display element.

[Appended Portion C3]
The adjusting device for the head-mounted camera according to appended portion C2, further comprising:
a head-mounted unit being mounted on the head of the photographer, including a front portion positioned at the front side of the head to which the display element and the image pickup element are attached, and temples positioned at the lateral sides of the head; and
a base for mounting the image pickup element on the front portion so that the direction of the image pickup element with respect to the front portion is adjustable, the base serving as at least one of the yaw-direction adjusting element and the pitch-direction adjusting element by adjusting a relative mounting angle between the base and the front portion and serving as the other one of the yaw-direction adjusting element and the pitch-direction adjusting element by adjusting a relative mounting angle between the base and the image pickup element.

[Appended Portion C4]

The adjusting device for the head-mounted camera according to appended portion C2, further comprising:

a head-mounted unit being mounted on the head of the photographer, including a front portion positioned at the front side of the head, to which the display element is attached, temples positioned at the lateral sides of the head, to which the image pickup element is attached, and a hinge unit for allowing the temples to be foldable with respect to the front portion and the temples to be folded along the front portion when the head-mounted unit is not in use, wherein the yaw-direction adjusting element adjusts a relative deviation in the yaw direction by restricting an opening angle of the temples with respect to the front portion when the head-mounted unit is in use, and the pitch-direction adjusting element adjusts a relative deviation in the pitch direction by adjusting a mounting angle of the hinge unit with respect to the front portion.

[Appended Portion C5]

An adjusting method for a head-mounted camera which comprises: image pickup element for picking up an image of a subject; display element for displaying a photographic frame indicating a photographic range so that the photographic frame is superimposed on a subject substantially directly observed by a photographer, wherein the adjusting method adjusts a relative angle between the image pickup element and the display element so that an optical axis of the image pickup element and a visual axis passing through the center of the photographic frame displayed by the display element are parallel with each other.

[Appended Portion C6]

The adjusting method for the head-mounted camera according to appended portion C5, wherein, in the adjusting step, a relative deviation in the yaw direction between the image pickup element and the display element and a relative deviation in the pitch direction between the image pickup element and the display element are adjusted.

[Appended Portion D1]

A head-mounted camera with eyesight-correcting lenses, comprising:

image pickup element for performing image capturing of a subject; and display element for displaying a predetermined image of the subject subjected to the image capturing performed by the image pickup element, the display element comprising:

optical elements disposed in front of the eyes of a photographer, for displaying the predetermined image so that the predetermined image is superimposed on the subject substantially directly observed by the photographer; and projection element for projecting the predetermined image on the optical elements, the head-mounted camera further comprising:

support element for integrally supporting the image pickup element and the display element;

the eyesight-correcting lenses separately formed from the optical elements; and attaching element for detachably attaching the eyesight-correcting lenses to the support element so that the eyesight-correcting lenses are disposed on a line of sight of the photographer observing via the optical elements.

[Appended Portion D2]

The head-mounted camera according to appended portion D1, wherein the eyesight-correcting lenses comprises a right-eye lens and a left-eye lens, which are separately formed, and the attaching element detachably attaches the right-eye lens and the left-eye lens independently.

[Appended Portion D3]

The head-mounted camera according to appended portion D1, wherein the eyesight-correcting lenses are eyesight-correcting lenses for a pair of spectacles.

[Appended Portion D4]

The head-mounted camera according to appended portion D1, wherein the predetermined image projected on the optical elements is a photographic frame indicating a photographic range of the image pickup element.

[Appended Portion E1]

A display device comprising:

an optical element for displaying an image containing predetermined information as a virtual image so that the image is superimposed on a subject substantially directly observed by an observer;

projection element for projecting the image displayed by the optical element on the optical element;

virtual-image distance adjusting element for adjusting a distance from the optical element to the virtual image displayed by the optical element; and visual-angle adjusting element for maintaining the visual angle concerning the virtual image to be constant regardless of the distance from the optical element to the virtual image.

[Appended Portion E2]

The display device according to appended portion E1, wherein the virtual-image distance adjusting element adjusts the distance from the optical element to the virtual image so that the distance becomes substantially equal to a distance from the optical element to the subject.

[Appended Portion E3]

The display device according to appended portion E2, further comprising:

distance-measurement element for finding the distance from the optical element to the subject, wherein the virtual-image distance adjusting element adjusts the distance from the optical element to the virtual image by using the distance from the optical element to the subject found by the distance-measurement element.

[Appended Portion E4]

The display device according to appended portion E1, wherein the projection element comprises a display element for generating the image containing the predetermined information, and the virtual-image distance adjusting element adjusts the distance from the optical element to the virtual image by adjusting the distance between the optical element and the display element.

[Appended Portion E5]

The display device according to appended portion E1, wherein the projection element comprises a display element for generating the image containing the predetermined information, and an image-forming optical system for forming the image generated by the display element on an optical path between the display element and the optical element, and the virtual-image distance adjusting element adjusts the distance from the optical element to the virtual image by adjusting a position at which the image is formed by the image-forming optical system.

[Appended Portion E6a]

The display device according to appended portion E4, wherein the visual-angle adjusting element adjusts the visual angle concerning the virtual image to be constant by adjusting the size of the image generated on the display element.

[Appended Portion E6b]

The display device according to appended portion E5, wherein the visual-angle adjusting element adjusts the visual angle concerning the virtual image to be constant by adjusting the size of the image generated on the display element.

[Appended Portion E7]

An image pickup device comprising:

display element for displaying a photographic frame indicating a photographic range as a virtual image so that the photographic frame is superimposed on a subject substantially directly observed by a photographer;

distance-measurement element for finding a distance to the subject;

virtual-image distance adjusting element for adjusting a distance from the display element to the virtual image displayed by the display element so that the distance becomes substantially equal to the distance to the subject found by the distance-measurement element;

a photographing optical system for forming an optical image of the subject;

an image pickup element for picking up the optical image of the subject formed by the photographing optical system within the photographic range corresponding to the photographic frame so as to generate image data; and recording element for recording the image data generated by the image pickup element.

[Appended Portion E8]

The image pickup device according to appended portion E7, further comprising:

visual-angle adjusting element for adjusting the visual angle concerning the virtual image so that the visual angle becomes constant regardless of the distance from the display element to the virtual image.

[Appended Portion E9]

The image pickup device according to appended portion E7, wherein the display element is used by being mounted on the head of the photographer.

[Appended Portion F1]

A head-mounted display device comprising:

an optical element for displaying an image as a virtual image so that the image is superimposed on a subject substantially directly observed by an observer;

projection element for projecting the image displayed by the optical element on the optical element; and pupil-distance adjusting element for adjusting, in a pupil-distance direction of the observer, a relative position of the image projected on the optical element by the projection element with respect to a pupil of the observer.

[Appended Portion F2]

A head-mounted camera comprising:

an optical element for displaying a photographic frame indicating a photographic range as a virtual image so that the photographic frame is superimposed on a subject substantially directly observed by a photographer;

projection element for projecting the photographic frame displayed by the optical element on the optical element;

pupil-distance adjusting element for adjusting, in a pupil-distance direction of the photographer, a relative position of the photographic frame projected on the optical element by the projection element with respect to a pupil of the photographer; and image pickup element for picking up an image of the subject within the photographic range indicated by the photographic frame.

[Appended Portion F3]

The head-mounted camera according to appended portion F2, wherein the projection element comprises horizontal projection element for projecting light concerning the photographic frame in the pupil-distance direction, and a reflective optical member for reflecting the light projected by the horizontal projection element in a vertical direction orthogonal to the pupil-distance direction so as to project the light on the optical element, and the pupil-distance adjusting element moves the reflective optical member in the pupil-distance direction so as to adjust, in the pupil-distance direction of the photographer, a relative position of the photographic frame projected on the optical element by the projection element with respect to the pupil of the photographer.

[Appended Portion F4]

The head-mounted camera according to appended portion F3, wherein the pupil-distance adjusting element comprises an actuator for moving the reflective optical member in the pupil-distance direction.

[Appended Portion F5]

The head-mounted camera according to appended portion F3, wherein the pupil-distance adjusting element further comprises a support member for supporting the reflective optical member so that the reflective optical member is movable in the pupil-distance direction, and the reflective optical member is moved in the pupil-distance direction by manually moving the support member.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A camera comprising:
an image pickup element including a photographing optical system in which a focal distance is changeable and an image pickup device for converting an optical subject image formed by the photographing optical system into an electric image signal;
an operation section for inputting information that indicates a photographic range;
a display element for displaying a photographic frame indicating the photographic range as a virtual image so that the photographic frame is superimposed on a subject substantially directly observed by a photographer;
a focal-distance setting element for setting the focal distance of the photographing optical system so that the visual angle of the photographic frame coincides with a field angle of the image pickup element; and
a switching element for switching between the photographic frame and a photographed image corresponding to the image signal obtained by the image pickup element so that the selected photographic frame or the photographed image is displayed by the display element as a virtual image, and
wherein the switching element automatically controls the photographed image to be displayed as a virtual image when the focal distance of the photographing optical system is greater than or equal to a predetermined value.

2. The camera according to claim 1, further comprising:
an alarm element for giving an alarm at least one of occasions when the visual angle of the photographic frame is to be further increased even though the field angle of the image pickup element has reached a maximum value and when the visual angle of the photographic frame is to be further decreased even though the field angle of the image pickup element has reached a minimum value.

3. The camera according to claim 2, wherein the alarm element gives an alarm by displaying information concerning the alarm on the display element.

4. The camera according to claim 1, wherein the display element comprises a holographic optical element disposed on a visual axis when the photographer observes a subject, and projection means for projecting the photographic frame on the holographic optical element.

5. The camera according to claim 1, further comprising:
a distance-measurement element for finding a distance to the subject,
wherein the display element comprises a correction element for correcting a parallax, which is a deviation between the range within the photographic frame observed by the photographer and a photographing range observed by the image pickup element, based on the distance to the subject found by the distance-measurement element.

6. The camera according to claim 1, further comprising:
a head-mounted unit to be mounted on the head of the photographer, including a front portion positioned at the front side of the head and temples positioned at the lateral sides of the head,
wherein the display element is disposed on the front portion.

7. The camera according to claim 6, wherein the temples are foldable with respect to the front portion, and the temples are folded along the front portion when the head-mounted unit is not in use.

8. The camera according to claim 6, wherein the image pickup element is disposed on the front portion.

9. The camera according to claim 8, wherein the image pickup element is disposed on the front portion at a position corresponding to a portion between the left and right eyes of the photographer.

10. The camera according to claim 6, wherein the image pickup element is disposed on at least one of the temples.

11. The camera according to claim 10, wherein the temples are foldable with respect to the front portion, and the temples are folded along the front portion when the head-mounted unit is not in use.

12. The camera according to claim 11, further comprising:
an alarm element for giving an alarm when the temples are not located at a predetermined foldable position when the head-mounted unit is in use.

13. The camera according to claim 12, wherein the alarm element gives an alarm by displaying information concerning the alarm on the display element.

14. The camera according to claim 6, wherein the head-mounted unit comprises the image pickup element, the head-mounted camera further comprising:
a remote controller, separately disposed from the head-mounted unit, for communicating with the head-mounted unit to control an operation of the head-mounted unit; and
a main body, separately disposed from the head-mounted unit, for communicating with the head-mounted unit to receive an image picked up by the image pickup element, the main body including a recording element for recording the received image.

15. A photographing method comprising:
a step of converting an optical subject image formed by a photographing optical system in which a focal distance is changeable into an electric image signal;
a step of reading information that indicates a photographic range inputted by a photographer's operation;
a step of displaying a photographic frame indicating the photographic range as a virtual image so that the photographic frame is superimposed on a subject substantially directly observed by a photographer;
a step of setting the focal distance of the photographing optical system so that a visual angle of the photographic frame coincides with a field angle of an image pickup element; and
a step of switching between the photographic frame and a photograph image corresponding to the image signal obtained by the image pickup element so that the selected photographic frame or the photographic image is displayed by a display element as a virtual image with the switching step being performed to automatically control the photographed image to be displayed as a virtual image when the focal distance of the photographic optical system is greater than or equal to a predetermined value.

16. A head-mounted camera comprising:
an image pickup element including a photographing optical system in which a focal distance is changeable and an image pickup device for converting an optical subject image formed by the photographing optical system into an electric image signal;
a display element for displaying a photographic frame indicating a photographic range as a virtual image so that the photographic frame is superimposed on a subject substantially directly observed by a photographer;
a photographic-frame setting element for setting a visual angle of the photographic frame displayed by the display element as the virtual image and observed from the photographer;
a focal-distance setting element for setting the focal distance of the photographing optical system so that the visual angle of the photographic frame set by the photographic-frame setting element coincides with a field angle of the image pickup element; and
a switching element for switching between the photographic frame and a photographed image corresponding to the image signal obtained by the image pickup element so that the selected photographic frame or the photographed image is displayed by the display element as a virtual image,
wherein the switching element automatically controls the photographed image to be displayed as a virtual image when the focal distance of the photographing optical system is greater than or equal to a predetermined value.

* * * * *

UNITED STATES PATENT AND TRADEMARK OFFICE
CERTIFICATE OF CORRECTION

PATENT NO.      : 7,573,525 B2
APPLICATION NO. : 11/052729
DATED           : August 11, 2009
INVENTOR(S)     : Masafumi Yamasaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1222 days.

Signed and Sealed this

Seventh Day of September, 2010

David J. Kappos
*Director of the United States Patent and Trademark Office*